(12) United States Patent
de Jong

(10) Patent No.: US 7,165,246 B2
(45) Date of Patent: Jan. 16, 2007

(54) OPTIMIZED REPRESENTATION OF DATA TYPE INFORMATION IN PROGRAM VERIFICATION

(75) Inventor: Eduard de Jong, Amsterdam (NL)

(73) Assignee: Sun Microsystems, Inc., Santa Clara, CA (US)

( * ) Notice: Subject to any disclaimer, the term of this patent is extended or adjusted under 35 U.S.C. 154(b) by 610 days.

(21) Appl. No.: 10/346,227

(22) Filed: Jan. 16, 2003

(65) Prior Publication Data

US 2004/0143820 A1    Jul. 22, 2004

(51) Int. Cl.
*G06F 9/44*    (2006.01)

(52) U.S. Cl. .................................... 717/166

(58) Field of Classification Search ........ 717/165–167, 717/177–178, 116, 118; 365/200; 711/206; 726/20; 707/1, 10; 709/203, 229; 705/75
See application file for complete search history.

(56) References Cited

U.S. PATENT DOCUMENTS

| | | | |
|---|---|---|---|
| 5,421,016 A | 5/1995 | Conner et al. ............... 395/700 |
| 5,721,781 A | 2/1998 | Deo et al. ..................... 380/25 |
| 5,761,513 A | 6/1998 | Yellin et al. ................. 395/705 |
| 5,778,234 A | 7/1998 | Hecht et al. ................. 395/712 |
| 5,781,723 A | 7/1998 | Yee et al. .................... 395/186 |
| 5,802,519 A | 9/1998 | De Jong ...................... 707/100 |
| 5,812,662 A | 9/1998 | Hsu et al. ....................... 380/4 |
| 5,889,999 A | 3/1999 | Breternitz, Jr. et al. ..... 395/709 |
| 5,930,509 A | 7/1999 | Yates et al. .................. 395/707 |
| 5,950,009 A | 9/1999 | Bortnikov et al. ........... 395/709 |
| 5,991,774 A | 11/1999 | Tate et al. .................... 707/203 |
| 5,999,731 A | 12/1999 | Yellin et al. ................. 395/704 |
| 5,999,732 A | 12/1999 | Bak et al. .................... 395/705 |
| 6,005,942 A | 12/1999 | Chan et al. .................... 380/25 |
| 6,006,033 A | 12/1999 | Heisch ......................... 395/709 |
| 6,032,137 A * | 2/2000 | Ballard ........................... 705/75 |
| 6,052,690 A | 4/2000 | de Jong ....................... 707/101 |
| 6,081,800 A * | 6/2000 | Ozbutun et al. ................ 707/3 |
| 6,092,147 A | 7/2000 | Levy et al. ..................... 711/6 |
| 6,094,656 A | 7/2000 | De Jong ...................... 707/100 |
| 6,131,159 A | 10/2000 | Hecht et al. ................... 713/1 |
| 6,141,681 A | 10/2000 | Kyle ............................ 709/206 |

(Continued)

FOREIGN PATENT DOCUMENTS

EP    0 751 459    1/1997

(Continued)

OTHER PUBLICATIONS

Ross Anderson et al., "*A New Family of Authentication Protocols*", pp. 1-13.

(Continued)

*Primary Examiner*—Wei Zhen
*Assistant Examiner*—Anna Deng
(74) *Attorney, Agent, or Firm*—Gunnison, McKay & Hodgson, L.L.P.; Forrest Gunnison

(57) ABSTRACT

A method for program verification comprises receiving a program unit, determining data types used by the program unit, creating a first mapping for the data types and using the first mapping to represent type information in verification information for the program unit. The verification information comprises the data type of entries on an operand stack or in a register file during simulated execution of the program unit.

42 Claims, 44 Drawing Sheets

U.S. PATENT DOCUMENTS

| | | | |
|---|---|---|---|
| 6,202,060 B1 * | 3/2001 | Tran | 707/3 |
| 6,205,465 B1 | 3/2001 | Schoening et al. | 709/102 |
| 6,223,340 B1 | 4/2001 | Detlefs | 717/5 |
| 6,233,683 B1 | 5/2001 | Chan et al. | 713/172 |
| 6,233,733 B1 | 5/2001 | Ghosh | 717/7 |
| 6,272,674 B1 | 8/2001 | Holiday, Jr. | |
| 6,308,317 B1 | 10/2001 | Wilkinson et al. | 717/5 |
| 6,314,562 B1 | 11/2001 | Biggerstaff | 717/9 |
| 6,367,012 B1 | 4/2002 | Atkinson et al. | |
| 6,463,581 B1 | 10/2002 | Bacon et al. | |
| 6,481,632 B1 | 11/2002 | Wentker et al. | 235/492 |
| 6,487,714 B1 | 11/2002 | Azagury et al. | 717/116 |
| 6,526,571 B1 | 2/2003 | Aizikowitz et al. | |
| 6,574,618 B1 * | 6/2003 | Eylon et al. | 707/1 |
| 6,604,114 B1 | 8/2003 | Toong et al. | 707/104.1 |
| 6,643,652 B1 * | 11/2003 | Helgeson et al. | 707/10 |
| 6,648,821 B1 | 11/2003 | Lebel et al. | 600/300 |
| 6,792,536 B1 | 9/2004 | Teppler | 713/178 |
| 6,807,561 B1 * | 10/2004 | Lagosanto et al. | 709/203 |
| 6,836,884 B1 | 12/2004 | Evans et al. | 717/140 |
| 6,880,155 B1 | 4/2005 | Schwabe et al. | 717/162 |
| 6,895,581 B1 | 5/2005 | Chkodrov et al. | 717/159 |
| 6,931,635 B1 | 8/2005 | Inagaki et al. | 717/157 |
| 6,948,070 B1 | 9/2005 | Ginter et al. | 713/193 |
| 6,961,587 B1 * | 11/2005 | Vilppula et al. | 455/558 |
| 6,961,664 B1 * | 11/2005 | Selifonov et al. | 702/19 |
| 6,981,212 B1 | 12/2005 | Claussen et al. | 715/513 |
| 6,985,956 B1 * | 1/2006 | Luke et al. | 709/229 |
| 2002/0010679 A1 * | 1/2002 | Felsher | 705/51 |
| 2002/0040936 A1 | 4/2002 | Wentker et al. | |
| 2002/0093856 A1 * | 7/2002 | Baentsch et al. | 365/200 |
| 2002/0144243 A1 | 10/2002 | Alexander, III et al. | 717/140 |
| 2002/0165961 A1 | 11/2002 | Everdell et al. | |
| 2002/0174071 A1 | 11/2002 | Boudou et al. | 705/41 |
| 2003/0028742 A1 | 2/2003 | Hameau et al. | 711/172 |
| 2003/0028811 A1 | 2/2003 | Walker et al. | 713/202 |
| 2003/0062202 A1 | 4/2003 | Parry | 178/18.01 |
| 2003/0095690 A1 | 5/2003 | Su et al. | 382/124 |
| 2003/0229769 A1 * | 12/2003 | Montemayor | 711/206 |
| 2004/0083469 A1 | 4/2004 | Chen et al. | 717/168 |
| 2004/0088562 A1 * | 5/2004 | Vassilev et al. | 713/200 |
| 2005/0097550 A1 | 5/2005 | Schwabe et al. | 717/178 |

FOREIGN PATENT DOCUMENTS

| | | |
|---|---|---|
| EP | 0 969 362 | 1/2000 |
| EP | 1 011 043 | 6/2000 |
| EP | 1 022 638 | 7/2000 |
| WO | 97/45817 | 12/1997 |
| WO | 98/19237 | 5/1998 |
| WO | WO 00/46667 | 8/2000 |
| WO | WO 01/50230 A2 | 7/2001 |
| WO | WO 02/062007 | 8/2002 |
| WO | WO 03/003694 | 1/2003 |

OTHER PUBLICATIONS

Zhiqun Chen, "Java Card Technology for Smart Cards", Jun. 2000, pp. 11-16.

Deianov Borislav, "Authentication-Lamport hash and biometrics", Jan. 9, 2002, pp. 1-3.

Naor et al., "Universal One-Way Hash Functions and their Cryptographic Applications", Mar. 13, 1995, pp. 1-14.

George C. Necula et al., "Proof-Carrying Code", Nov. 1996, pp. 1-60.

George C. Necula et al., "Safe Kernal Extensions Without Run-Time Checking", pp. 1-16.

Sun Microsystems, Inc., "Smart cards: A primer", Apr. 22, 200., pp. 1-13.

Bowles et al., "A Comparison of Commercial Reliability Prediction Programs", Proceedings Annual Reliability and Maintainability Symposium, IEEE, pp. 450-455.

Lindsay et al., "A Generic Model for Fine Grained Configuration Management Including Version Control and Traceability", Proceedings of the Australian Software Engineering Conference(ASWEC'97), IEEE Computer Society, pp. 27-36 (1997).

Zhao, Jianjun "Applying Program Dependence Analysis to Java Software" Fukuoka Kogyo Daigaku Kenkyu Ronshu (Research Bulletin of Fukuoka Institute of Technology), vol. 31, No. 1, pp. 29-41 1998.

Mark Russinovich, "Inside On-Access Virus Scanners," Windows IT PRO, Online! Sep. 1997, XP002298829.

Bauspiess, Fritz, et al., "Requirements for Cryptographic Hash Functions", Computer & Security, vol. 11, No. 5, pp. 427-437, Elsevier Science Publishers, Amsterdam, NL, Sep. 1, 1992. (XP000296996).

Zhiqun Chen, "Technology for Smart Cards: Architecture and Programmer's Guide", Addison Wesley, (Online) Jun. 6, 2000, (XP002305506).

Sundaresan, Vijay et al., "Practical Virtual Method Call Resolution for Java", OOPSLA 2000. Conference on Object-Oriented Programming Systems, Languages and Applications, pp. 264-280, Minneapolis, MN, Oct. 31, 2000. (XP002336235).

R. Rivest, "The MD4 Message Digest Algorithm", Request for Comments (RFC) 1320, MIT Laboratory for Computer Science and RSA Data Security, Inc., Apr. 1992, pp. 1-20.

R. Rivest, "The MD5 Message-Digest Algorithm", Request for Comments (RFC) 1321 MIT Laboratory for Computer Science and RSA Data Security, Inc., Apr. 1992.

"Secure Hash Standard", Federal Information Processing Standard Publication 180-1, Apr. 17, 1995.

"Smard Card Stage 1 Description", Version 1.1, CDMA Development Group-Smart Card Team Document, May 22, 1996.

"Digital Cellular Telecommunications Systems(Phase 2+); AT Command Set for GSM Mobile Equipment(ME)", ETSI TS 100 916 V7.4.0, 1998.

"Wireless Identity Module Pert: Security" Version 12, Wireless Application Protocol WAP-260-WIM-20010712-a, Jul. 2001.

"3rd Generation Partnership Project: Technical Specification Group Terminals; USIM and IC Card Requirements(Release 4)", 3GPP TS 21.111 V4.0.0, 2001.

"3rd Generation Partnership Project 2: Removable User Identity Module for Spread Spectum Systems" 3GPP2 C.S0023-A, Version 1.0, Sep. 13, 2002, pp. 1-1-5-2, A1-A4.

Baase, "Computer Algorithms, Introduction to Design and Analysis", 1988, Addison-Wesley Publishing Company, Second Edition, pp. 11-14.

Genet et al., "A Java Card CAP converter in PVS", Sep. 26, 2002, pp. 1-59.

* cited by examiner

OPTIMIZED REPRESENTATION OF DATA TYPE INFORMATION IN PROGRAM VERIFICATION

CROSS REFERENCE TO RELATED APPLICATIONS

This application is related to the following:

U.S. patent application Ser. No. 10/346,581, filed Jan. 16, 2003 in the name of inventor Eduard de Jong, entitled "System for Communicating Program Data Between a First Device and a Second Device", commonly assigned herewith.

U.S. patent application Ser. No. 10/346,230, filed Jan. 16, 2003 in the name of inventor Eduard de Jong, entitled "Signing Program Data Payload Sequence in Program Loading", commonly assigned herewith.

U.S. patent application Se. No. 10/346,238, filed Jan. 16, 2003 in the name of inventor Eduard de Jong, entitled "Using a Digital Fingerprint to Commit Loaded Data in a Device", commonly assigned herewith.

U.S. patent application Ser. No. 10/346,586, filed Jan. 16, 2003 in the name of inventor Eduard de Jong, entitled "Ordering Program Data for Loading on a Device", commonly assigned herewith.

U.S. patent application Ser. No. 10/346,243, filed Jan. 16, 2003 in the name of inventor Eduard de Jong, entitled "Run Time Code Integrity Checks", commonly assigned herewith.

U.S. patent application Ser. No. 10/346,579, filed Jan. 16, 2003 in the name of inventor Eduard de Jong, entitled "Linking of Virtual Methods", commonly assigned herewith.

FIELD OF THE INVENTION

The present invention relates to the field of computer science. More particularly, the present invention relates to optimized representation of data type information in program verification.

BACKGROUND OF THE INVENTION

FIG. 1 is a block diagram that illustrates a typical mechanism for communicating program data between a host computer and a smart card. Smart cards 110 typically communicate with other computers 100 via APDUs (Application Protocol Data Units). The APDU protocol is specified in International Standard ISO/IEC 7816-3. An APDU includes either a command 115 or a response 120 message. A smart card 110 receives a command APDU 115 from a host computer 100, executes the instruction specified in the command 115 and replies to the host computer 100 with a response APDU 120. Command APDUs 115 and response APDUs 120 are exchanged alternately between a card 110 and a host computer 100.

According to the APDU protocol, APDU messages comprise two structures. One structure is used by a host application on a loading terminal to send commands to the card. The other structure is used by the card to send responses back to the host application. The former is referred to as the command APDU (C-APDU) and the latter is referred to as the response APDU (R-APDU). Their structures are illustrated in FIGS. 2A and 2B, respectively. Some C-APDU components are optional.

Java Card™ technology enables programs written in the Java™ programming language to run on smart cards and other resource-constrained devices. Java Card™ technology is described in Z. Chen, Java Card™ Technology for Smart Cards (2000).

Turning now to FIG. 3, a block diagram that illustrates loading a converted applet (CAP) file is presented. The Java Card™ Virtual Machine (JCVM) comprises an on-card portion that includes the Java Card™ bytecode interpreter 345 and an off-card portion called a converter 310. Taken together, the interpreter 345 and the converter 310 implement all the virtual machine functions, including loading Java™ class files 300 and executing them with a particular set of semantics. The converter 310 loads and pre-processes the class files 300 that comprise a Java Card™ program that may be structured in one or more packages and produces a CAP (converted applet) file 350. The CAP file 350 is then loaded on a Java Card™ technology-enabled smart card 330 and executed by the interpreter 345. The CAP file 350 includes an executable binary representation of the classes in a Java™ package 350. The Java Card™ interpreter 345 provides runtime support of the Java™ language execution model.

In Java Card™ technology, the mechanisms to download and install a CAP file 350 are embodied in a unit called the installer 340. The Java Card™ installer 340 resides within the card 330. It cooperates with an off-card installation program 320. The off-card installation program 320 transmits the executable binary and possibly other data in a CAP file 350 to the installer 340 running on the card 330 via a loading terminal 325. The installer 340 writes the binary into the smart card memory, links it with the other classes that have already been placed on the card 330 and creates and initializes any data structures that are used internally by the Java Card™ runtime environment. An optional on-card verifier 335 performs bytecode verification of downloaded code before the downloaded code is interpreted by bytecode interpreter 345.

The APDU protocol limits the size of the payload or data field (reference numeral 240 of FIG. 2) to a small number of bytes (typically less than 128) determined by the restricted size of RAM. Data structures larger than the limitation must be split among the payload portion of multiple APDUs. This splitting is typically performed without regard to the data content. For example, a particular APDU may contain a portion of one data structure and a portion of another data structure. This is explained in more detail below, with reference to FIG. 4.

Turning now to FIG. 4, a flow diagram that illustrates loading a CAP file from the perspective of a loading terminal is presented. At 400, a CAP file is received. At 405, the CAP file and associated authentication data is split amongst multiple APDUs. At 410, the APDUs are transmitted to the target smart card according to the APDU protocol.

Turning now to FIG. 5, a flow diagram that illustrates loading a CAP file from the perspective of a smart card is presented. At 500, the CAP file is reassembled in the smart card. At 505, the reassembled CAP file is decrypted. At 510, the decrypted CAP file data is authenticated. In another solution, the CAP file is authenticated and then decrypted. In yet another solution, the CAP file is communicated without encryption. At 515, the content of the authenticated CAP file is installed on the smart card.

Turning now to FIG. 6, a flow diagram that illustrates reassembling a CAP file in a smart card is presented. At 600, an APDU is received. At 605, the APDU is stored in a persistent mutable memory such as an EEPROM (electrically erasable programmable read-only memory). Alternatively, the APDU payload is not stored in a persistent mutable memory. At 610, receipt of the APDU is acknowledged. At 615, a determination is made regarding whether another APDU needs to be processed. Additional APDUs are processed beginning at 600.

Turning now to FIG. 7, a block diagram that illustrates modifying a stored program having link data to resolve static references is presented. Card memory 700 represents card memory before using embedded link data (704, 712, 728) to link executable code segments (702, 706, 708, 710, 712, 716, 718, 720, 722, 724, 726, 728, 732). Card memory 750 represents card memory after the embedded link data (704, 712, 728) has been used to link executable code segments (702, 706, 708, 710, 712, 716, 718, 720, 722, 724, 726, 728, 732). Referring to card memory 700, method "A1A" code 702 calls method "A1C" 708, method "A2A" code 712 calls method "B1A" 720 and method "B2A" code 728 calls method "B1D" 726. Method "A1A" link data 704 comprises an indication of how to resolve the reference to method "A1C" 708. Method "A1A" link data 704 may additionally comprise an indication of how method "A1A" code 702 must be modified. Likewise, method "A2A" link data 714 comprises an indication of how to resolve the reference to method "B1A" 720. Method "A2A" link data 714 may additionally comprise an indication of how method "A2A" code 712 must be modified. Additionally, method "B2A" link data 730 comprises an indication of how to resolve the reference to method "B1D" 726. Method "B2A" link data 730 may additionally comprise an indication of how method "B2A" code 728 must be modified. Referring to card memory 750 of FIG. 7, symbolic references to called methods have been replaced with the addresses of the called methods and the link data is not stored.

Unfortunately, storing the re-created CAP file in a persistent mutable memory and then processing the CAP file contents to create linked executable code requires a significant amount of available memory and is time consuming.

Accordingly, a need exists in the prior art for a method and apparatus for communicating program data between a host computer and a smart card that is relatively efficient. A further need exists for such a solution that is relatively secure. Yet another need exists for such a solution that detects when program data has been tampered with.

SUMMARY OF THE INVENTION

A method for program verification comprises receiving a program unit, determining data types used by the program unit, creating a first mapping for the data types and using the first mapping to represent type information in verification information for the program unit. The verification information comprises the data type of entries on an operand stack or in a register file during simulated execution of the program unit.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
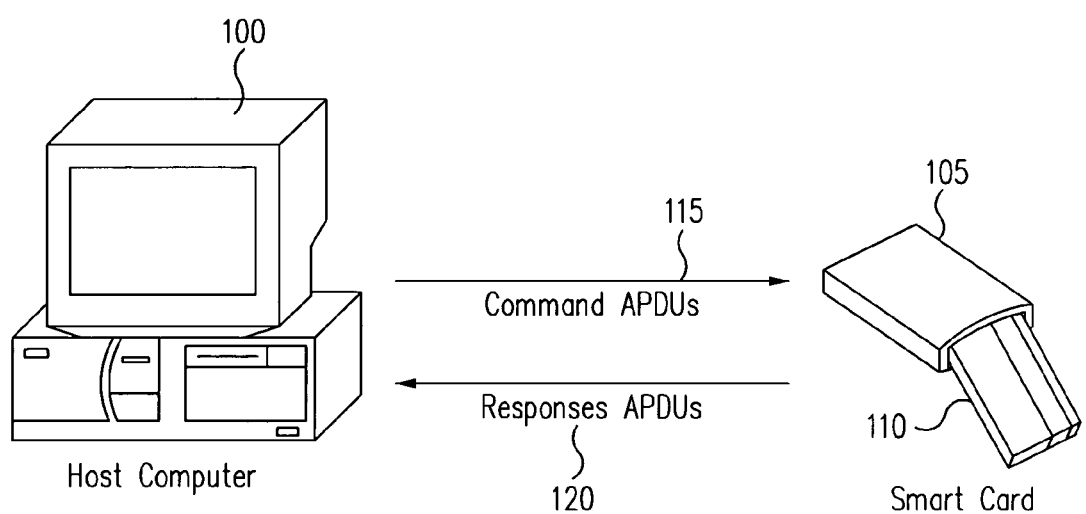
FIG. 1 is a block diagram that illustrates a typical mechanism for communicating program data between a host computer and a smart card.

Embodiments of the present invention are described herein in the context of optimized representation of data type information in program verification. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application—and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows® 2000, available from Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, a hash function h is commutative if h(x,y)=h(y,x) for all x and y. In other words, the result of the hash function is independent of the argument order.

In the context of the present invention, the term "fingerprint" is defined as the result of a function that identifies or detects one or more changes in a byte sequence. By way of example, a fingerprint may comprise a non-commutative hash of an arbitrary byte sequence or a noncommutative hash of a sequence of one or more byte sequences. As a further example, a fingerprint may comprise a CRC (cyclic redundancy code), a message digest, or the like. Such functions are described in Knuth, D. *The Art of Computer Programming*, Volume 2: Seminumerical Methods, Chapter 5. Addison Wesley, 1981.

In the context of the present invention, the term "authentication code" is defined as a digital signature, or a Message Authentication Code (MAC) using a block cipher. By way of example, an authentication code may be generated using the DES algorithm (Federal Information Processing Standards Publication 46-3, *Data Encryption Standard (DES)*, Oct. 25, 1999; Federal Information Processing Standards Publication 197, *Advanced Encryption Standard (AES)*, Nov. 26, 2001), the Rijndael algorithm (J. Daemen and V. Rijmen, *AES Proposal: Rijndael*, AES Algorithm Submission, Sep. 3, 1999), or the like. An authentication code produced as a result of a keyed hash function is an example of an authentication code that is also a fingerprint.

In the context of the present invention, a keyed hash-based message authentication code (HMAC) is defined as a MAC that uses a cryptographic key in conjunction with a hash function. A HMAC is both a fingerprint and a MAC.

In the context of the present invention, the term "authenticated fingerprint" is defined as an authentication code based at least in part on a fingerprint.

In the context of the present invention, the term "authentication fingerprint" is defined as a fingerprint used to create an authenticated fingerprint.

In the context of the present invention, the term "session" or "user session" is defined as a period that begins when a user inserts a secure portable device such as a smart card or the like into a communications device such as a loading terminal or card acceptance device (CAD), and ends when the secure portable device is removed from the communications device. A "session ID" is used to describe an identifier that uniquely identifies such a session. One or more session ID may be used to uniquely identify the same session.

In the context of the present invention, the term "package-structured data" is defined as executable code using Java™-like naming conventions for references to external program units. By way of example, the Java™ naming convention for an external class includes a package name followed by the class name.

Figure 2A:
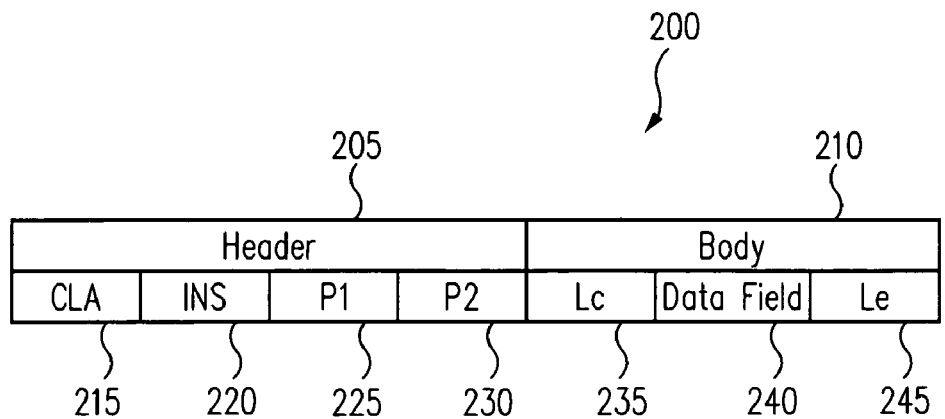
FIG. 2A is a block diagram that illustrates a typical Command Application Protocol Data Unit (C-APDU).
Figure 2B:
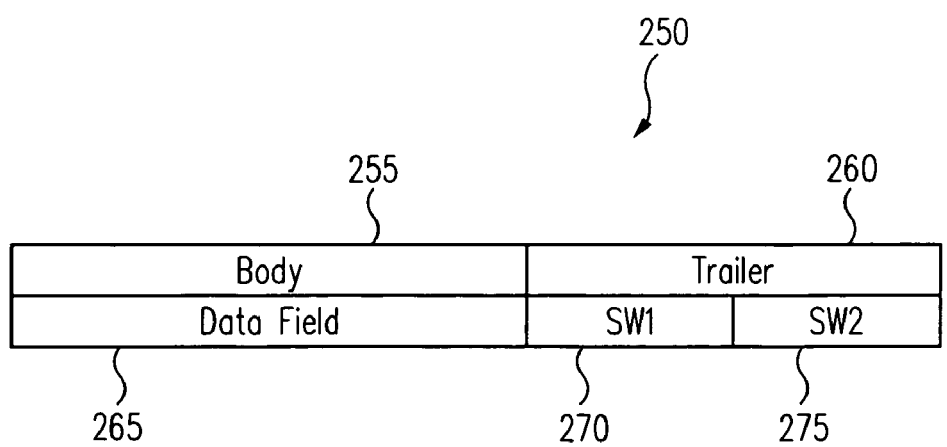
FIG. 2B is a block diagram that illustrates a typical Response Application Protocol Data Unit (RAPDU).
Figure 3:
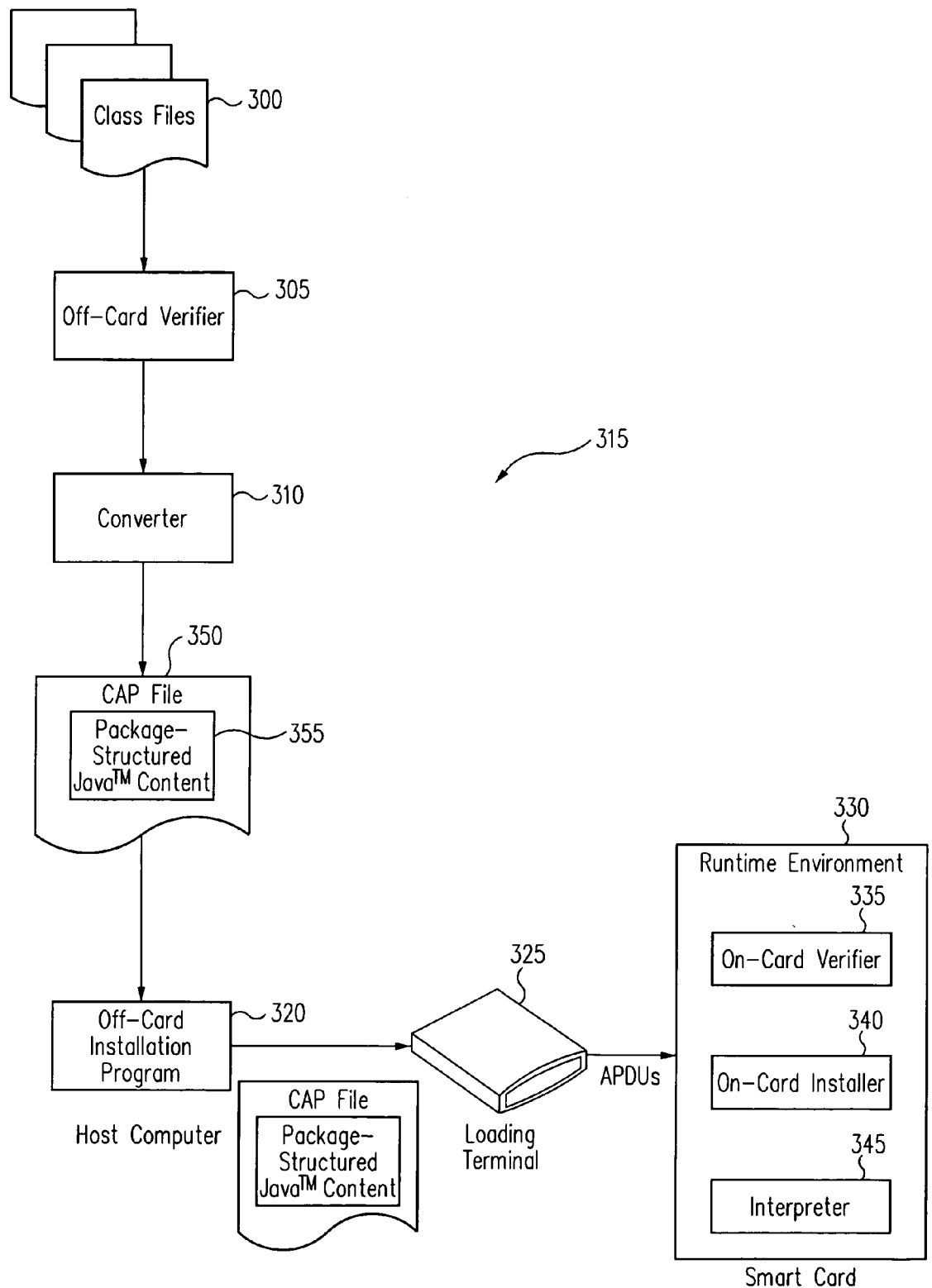
FIG. 3 is a block diagram that illustrates loading a converted applet (CAP) file.
Figure 4:
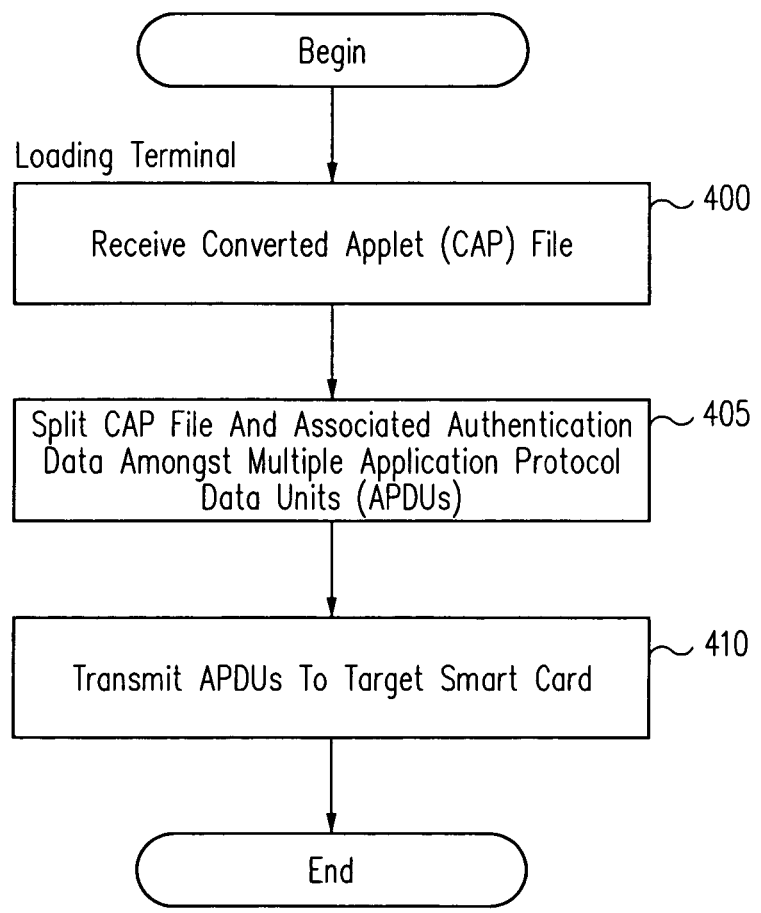
FIG. 4 is a flow diagram that illustrates loading a CAP file from the perspective of a loading terminal.
Figure 5:
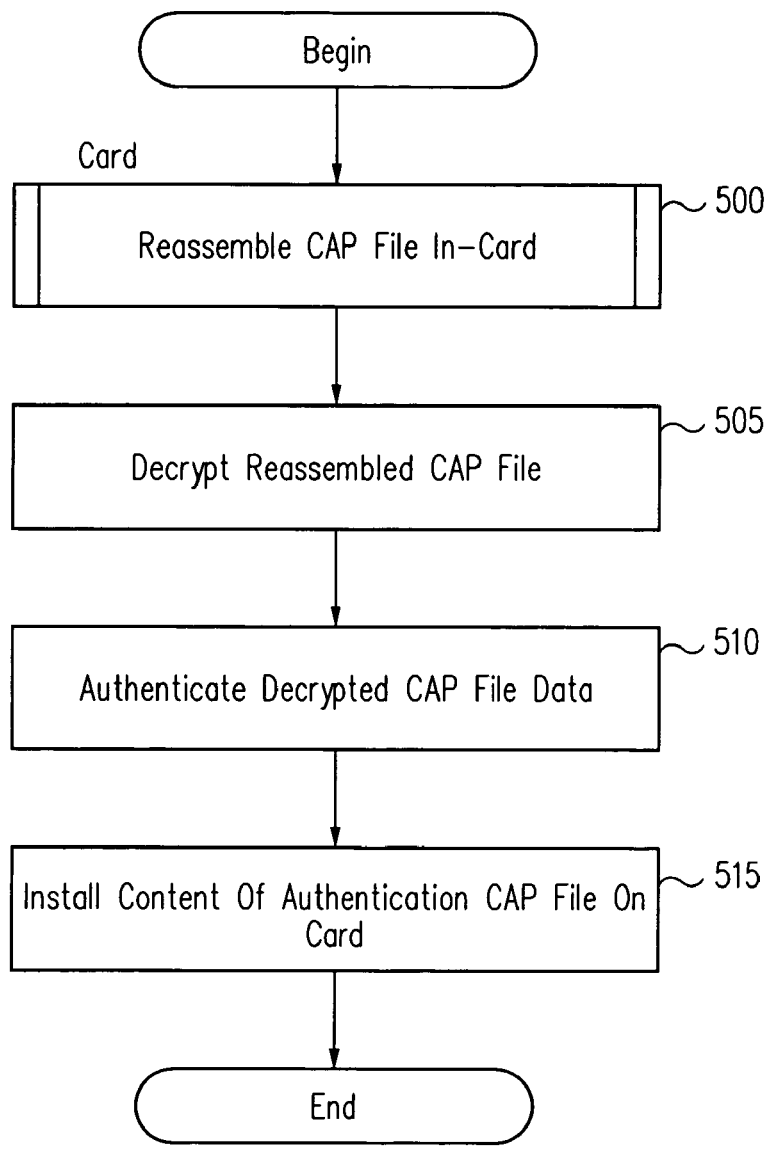
FIG. 5 is a flow diagram that illustrates loading a CAP file from the perspective of a smart card.
Figure 6:
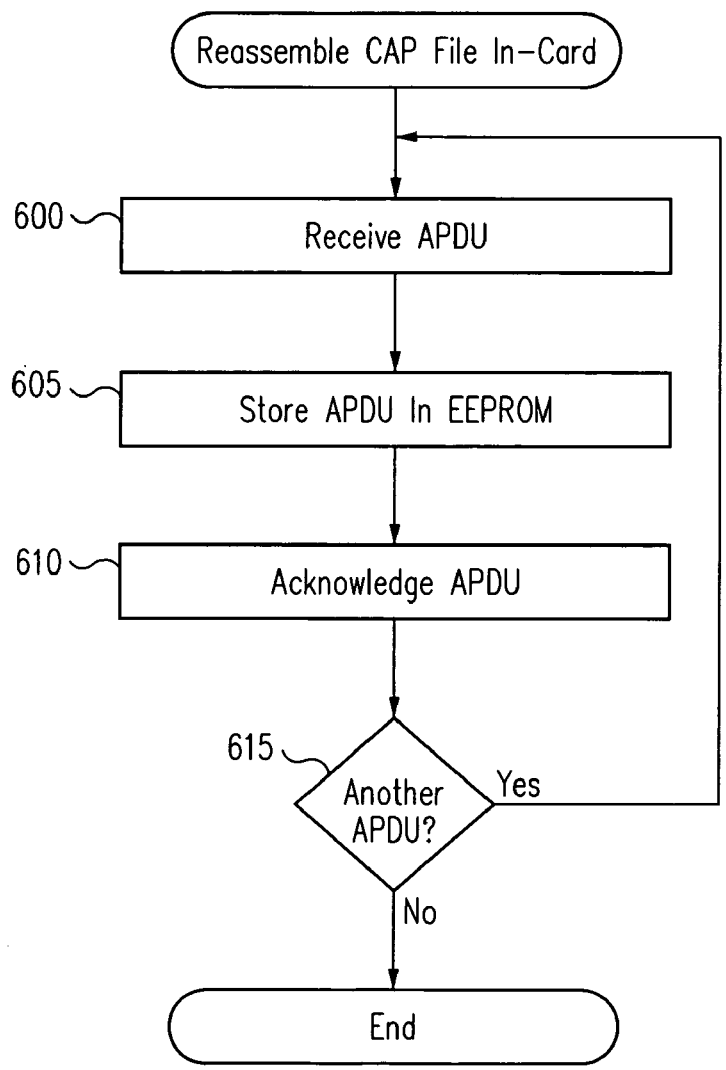
FIG. 6 is a flow diagram that illustrates reassembling a CAP file in a smart card.

In the context of the present invention, the term "verification APDU" is defined as an APDU comprising a command and verification data. The verification data is located within the data field (reference numeral 240 of FIG. 2) of the APDU.

In the context of the present invention, the term "link APDU" is defined as an APDU comprising a command and link data. The link data is located within the data field (reference numeral 240 of FIG. 2) of the APDU.

In the context of the present invention, the term "program unit" is defined as an identifiable unit of program behavior. A higher-level program unit may include one or more lower-level program units. For example, a Java™ class may include one or more method.

Figure 8:
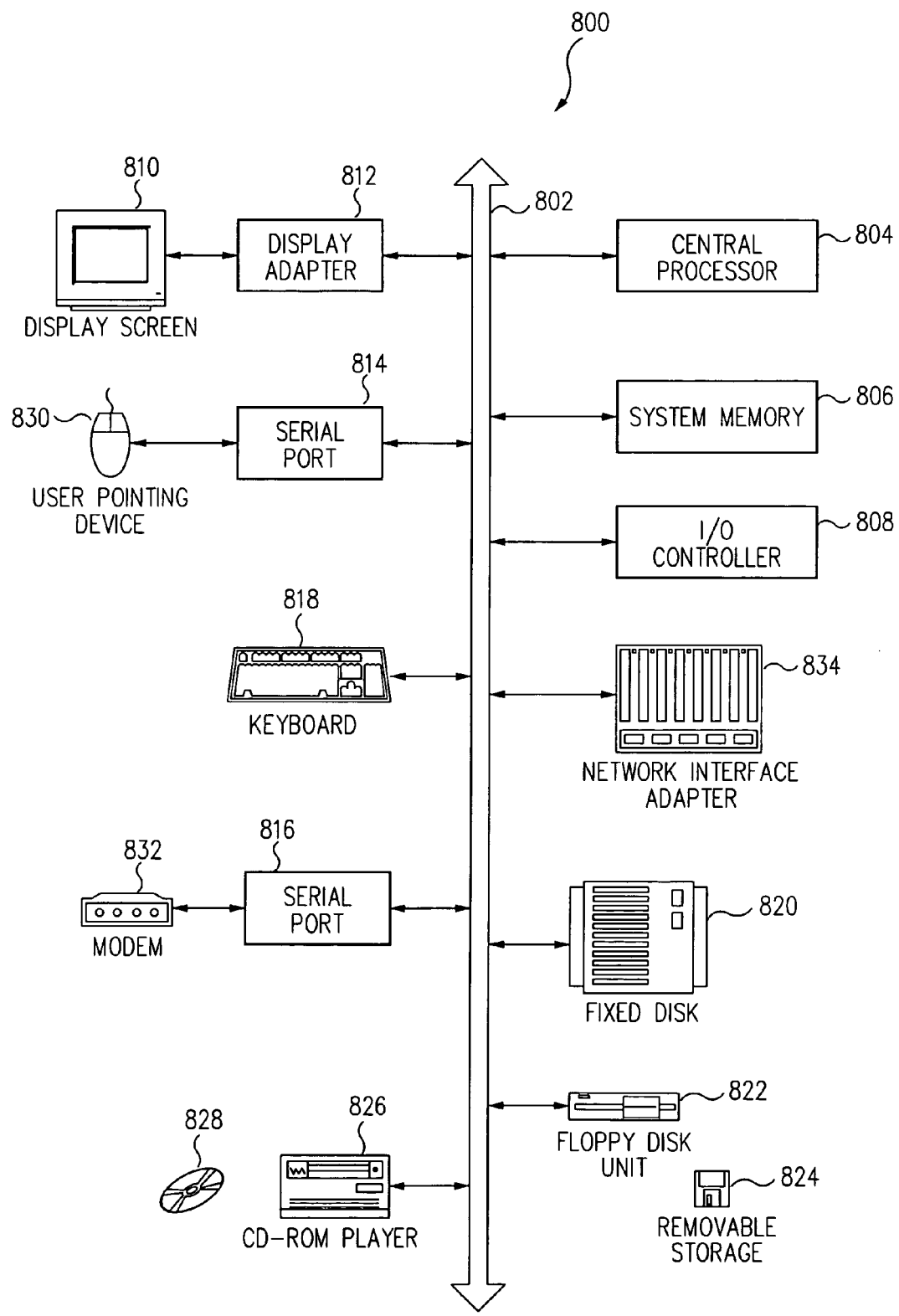
FIG. 8 is a block diagram of a computer system suitable for implementing aspects of the present invention.

FIG. 8 depicts a block diagram of a computer system 800 suitable for implementing aspects of the present invention. As shown in FIG. 8, computer system 800 includes a bus 802 which interconnects major subsystems such as a central processor 804, a system memory 806 (typically RAM), an input/output (I/O) controller 808, an external device such as a display screen 810 via display adapter 812, serial ports 814 and 816, a keyboard 818, a fixed disk drive 820, a floppy disk drive 822 operative to receive a floppy disk 824, and a CD-ROM player 826 operative to receive a CD-ROM 828. Many other devices can be connected, such as a pointing device 830 (e.g., a mouse) connected via serial port 814 and a modem 832 connected via serial port 816. Modem 832 may provide a direct connection to a server via a telephone link or to the Internet via a POP (point of presence). Alternatively, a network interface adapter 834 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 8 to be present to practice the present invention, as discussed below. Furthermore, the devices and subsystems may be interconnected in different ways from that shown in FIG. 8. The operation of a computer system such as that shown in FIG. 8 is readily known in the art and is not discussed in detail in this application, so as not to overcomplicate the present discussion. Code to implement the present invention may be operably disposed in system memory 806 or stored on storage media such as fixed disk 820, floppy disk 824 or CD-ROM 828.

Signature Protocol for Card Loading

Figure 9:
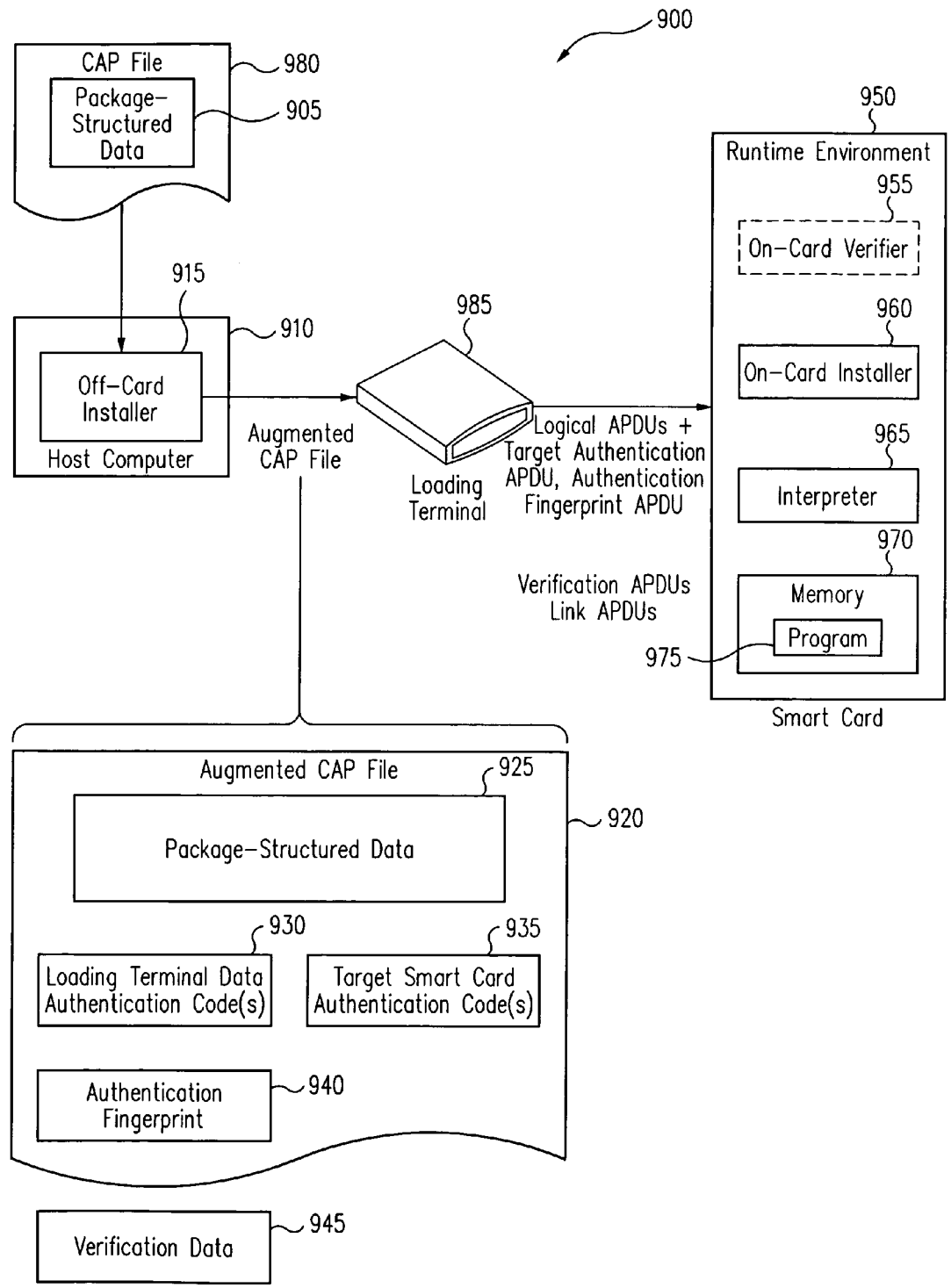
FIG. 9 is a block diagram that illustrates a system for communicating program data between a host computer and a smart card in accordance with one embodiment of the present invention.

Turning now to FIG. 9, a block diagram that illustrates a system for communicating program data between a host computer and a smart card in accordance with one embodiment of the present invention is presented. System 900 comprises a host computer 910, a loading terminal 985 and a smart card 950. Host computer 910 comprises an off-card installer 915 for augmenting a CAP file 980 comprising package-structured data 905 to create an augmented CAP file 920 comprising the package-structured data 925, an authentication fingerprint 940, one or more loading terminal authentication codes 930 and one or more target smart card authentication codes 935. Augmented CAP file 920 may also comprise verification data 945 that verifies CAP file content. Authentication fingerprint 940 is computed over the payload portion of logical APDUs derived from the package-structured data 925. Logical APDUs are illustrated in more detail below with reference to FIG. 13. As explained in more detail below, the similarity of the processes used by host computer 910, loading terminal 985 and target smart card 950 to compute an authentication fingerprint guarantees that if the APDU payload remains the same, the same authentication fingerprint will be generated regardless of the entity performing the computation. Conversely, if the APDU payload changes between when each entity performs the computation, a different fingerprint will be generated, signaling a change in the payload.

According to one embodiment of the present invention, one or more of loading terminal authentication codes 930 and target smart card authentication codes 935 are based at least in part on authentication fingerprint 940. According to another embodiment of the present invention, the authentication fingerprint 940 comprises a keyed hash-based message authentication code (HMAC). According to another embodiment of the present invention, one or more of loading terminal authentication codes 930 and target smart card authentication codes 935 comprise a digital signature computed over augmented CAP file 920, without regard to logical APDUs.

According to embodiments of the present invention, a logical program unit APDU may be followed and/or preceded by one or more APDUs that provide verification information (verification APDU) and/or linking information (link APDU). The verification data may be embedded in the CAP file. Alternatively, the verification data may be computed by the loading terminal. If verification data is included in the CAP file, it may be used to compute an authentication fingerprint. Linking data may also be computed by the loading terminal. Linking data may be based on data obtained from the card, data obtained from the Web, data in the CAP file, or any combination thereof.

Still referring to FIG. 9, loading terminal 985 is configured to receive the augmented CAP file 920, create one or more logical APDUs from package-structured data 925, authenticate the CAP file based at least in part on the loading terminal authentication code 930, create one or more APDUs comprising a selected target smart card authentication code 935 and the authentication fingerprint 940, and communicate the one or more APDUs to target smart card 950.

According to one embodiment of the present invention, host computer 910 communicates an augmented CAP file without verification data. According to another embodiment of the present invention, host computer 910 communicates an augmented CAP file having verification data.

According to one embodiment of the present invention, loading terminal 985 receives an augmented CAP file 920 without verification data, computes verification data and creates one or more verification APDUs. According to another embodiment of the present invention, loading terminal 985 receives an augmented CAP file 920 with verification data and creates one or more verification APDUs. According to another embodiment of the present invention, loading terminal 985 computes link data and creates one or more link APDUs.

According to one embodiment of the present invention, smart card 950 comprises a secure portable device such as a Java Card™ technology-enabled smart card, or the like.

According to one embodiment of the present invention, smart card 950 comprises a CDMA technology-enabled smart card. CDMA technology-enabled smart cards are described in *Smart Card Stage I Description*, Version 1.1, CDMA Development Group—Smart Card Team Document (May 22, 1996).

According to another embodiment of the present invention, smart card 950 comprises a SIM (Subscriber Identity Module card) card. The term "SIM card" describes the smart card used in GSM (Global System for Mobile Communications) mobile telephones. The SIM includes the subscriber's personal cryptographic identity key and other information such as the current location of the phone and an address book of frequently called numbers. The SIM is described in *Digital cellular telecommunications system (phase 2+); Specification of the Subscriber Identity Module—Mobile Equipment (SIM-ME) interface*, ETSI, GSM 11.11 version 7.4.0, Release 1998.

According to another embodiment of the present invention, smart card 950 comprises a WIM (Wireless Interface Module). A WIM is a smart card in a WAP (Wireless Application Protocol) phone. It is described in *Wireless Identity Module Part: Security*, WAP-260-WIM-20010712-a, Wireless Application Protocol Forum, Jul. 12, 2001.

According to another embodiment of the present invention, smart card 950 comprises a USIM (Universal Subscriber Identity Module). A USIM is a smart card for a 3GPP ($3^{rd}$ Generation Partnership Project) mobile phone. It is described in *3rd Generation Partnership Project; Technical Specification Terminals; USIM and IC card requirements*, Release 4, 3GPP TS 21.111 V4.0.0 (2001–03).

According to another embodiment of the present invention, smart card 950 comprises a UIM (User Identity Module). A UIM is a smart card for a 3GPP Project 2 (3GPP2) mobile phone. The term "R-UIM" is used when the smart card is removable. A UIM is a super set of the SIM and allows CDMA (Code Division Multiple Access)-based cellular subscribers to roam across geographic and device boundaries. The R-UIM is described in a specification issued by the 3rd Generation Partnership Project 2 (3GPP2) and entitled 3rd Generation Partnership Project 2; Removable User Identity Module (R-UIM) for cdma2000 Spread Spectrum Systems, 3GPP2 C.S0023-0, Jun. 9, 2000.

The above description regarding various mobile phone technologies is not intended to be limiting in any way. Those of ordinary skill in the art will recognize that other user devices may be used.

Figure 10:
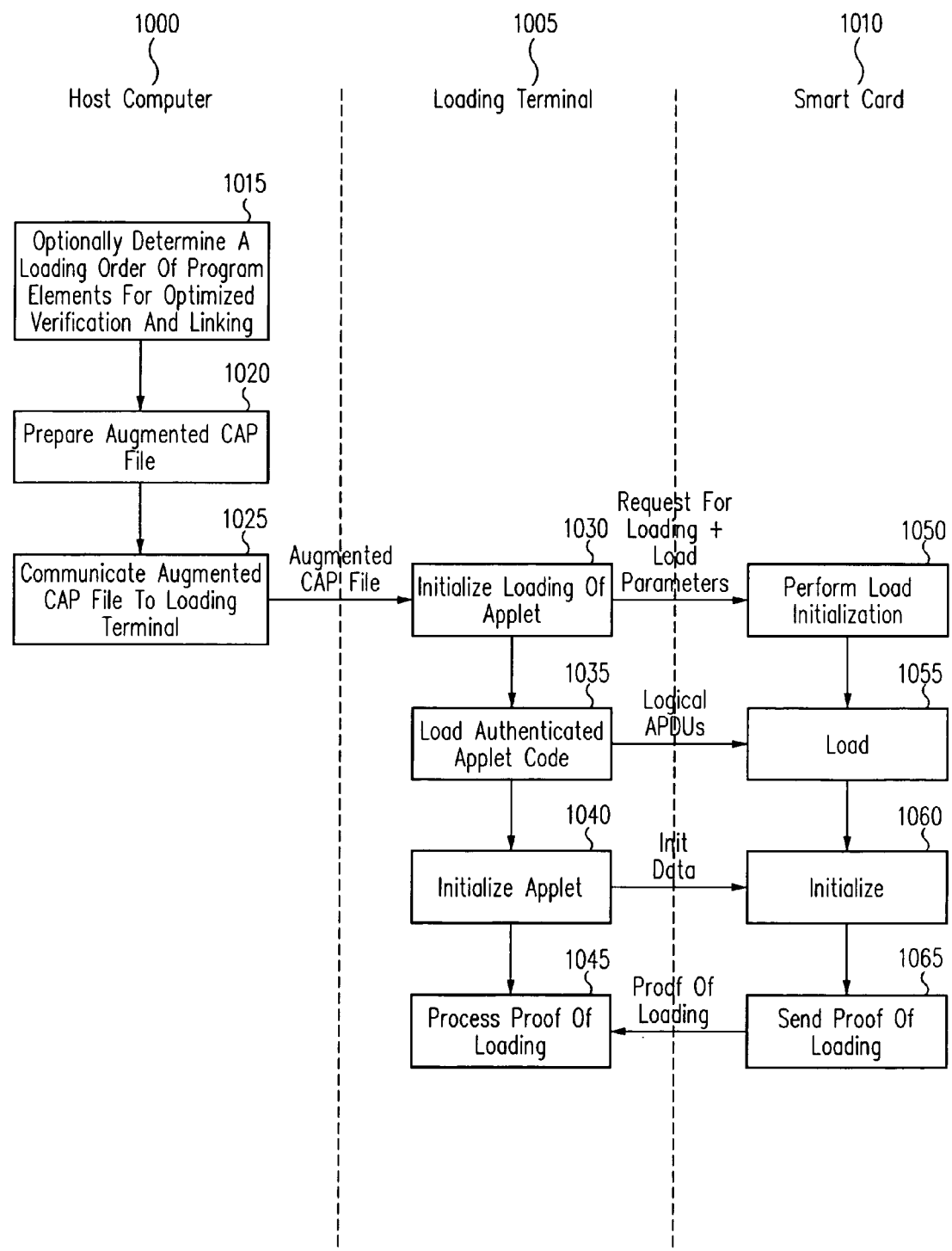
FIG. 10 is a high level flow diagram that illustrates communicating program data from a host computer to a smart card in accordance with one embodiment of the present invention.

Turning now to FIG. 10, a high level flow diagram that illustrates communicating program data from a host computer to a smart card in accordance with one embodiment of the present invention is presented. At 1020 an augmented CAP file is prepared. The augmented CAP file may comprise package-structured data and an authentication fingerprint computed over an APDU data stream comprising the package-structured data. Alternatively, the augmented CAP file may comprise package-structured data and at least one authentication code based at least in part on the authentication fingerprint.

According to one embodiment of the present invention, preparing an augmented CAP file (1020) is preceded by determining a loading order of program elements for optimized verification and linking (1015). The load order used in 1015 may be used in 1020 to determine the order of logical APDUs in the computation of the authentication fingerprint. In a Java™ environment, the loading order for one or more classes, methods in classes or fields in methods is determined. The program elements may be ordered based at least in part on a use graph of the program in the CAP file. The "use" of a method may comprise, by way of example, calling the method. The "use" of a field may comprise, by way of example, accessing the field. The program elements may also be ordered based at least in part on type map information defined for the program. Type maps are explained in more detail below with reference to FIG. 14. Ordering program elements is explained in more detail below with reference to FIGS. 15A–15C.

Still referring to FIG. 10, at 1025 the augmented CAP file is communicated to a loading terminal. At 1030, the loading terminal receives the augmented CAP file and initializes loading of an applet. At 1035, authenticated applet code is loaded on a target smart card. At 1040, applets are initialized. At 1045, a proof of loading received from the target smart card is processed to determine and record whether the load was successful.

Still referring to FIG. 10, smart card 1050 receives a load request from the loading terminal. At 1055, the smart card processes logical APDUs received from the loading terminal. The processing includes computing an authentication fingerprint over the APDU payload. At 1060, initialization data received from the loading terminal is used to initialize the smart card. At 1065, a proof of loading is sent to the loading terminal.

Figure 11:
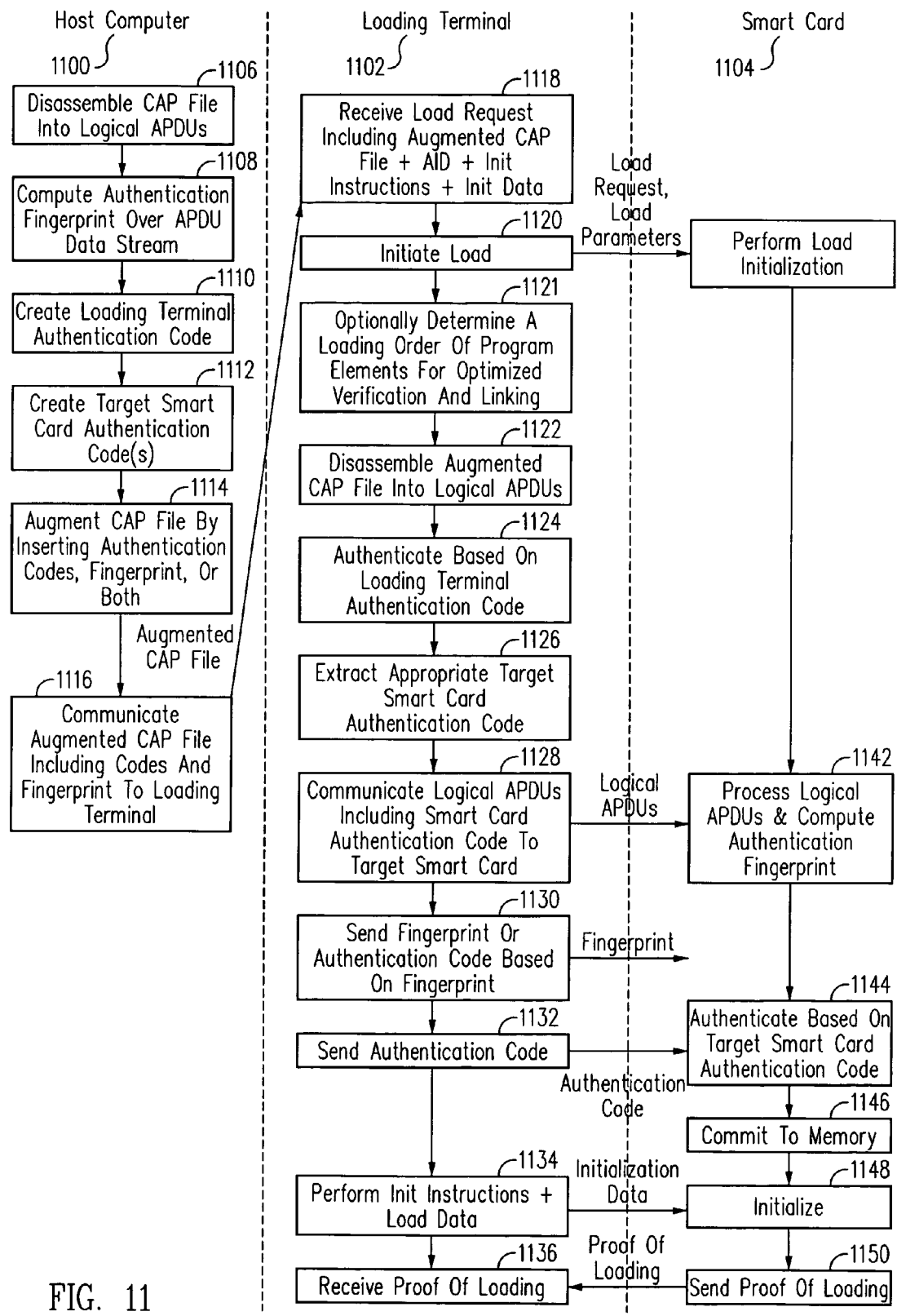
FIG. 11 is a low level flow diagram that illustrates communicating program data from a host computer to a smart card in accordance with one embodiment of the present invention.

Turning now to FIG. 11, a low level flow diagram that illustrates communicating program data from a host computer to a smart card in accordance with one embodiment of the present invention. FIG. 11 provides more detail for FIG. 10. More particularly, reference numerals 1106–1116, 1118–1136 and 1140–1150 of FIG. 11 correspond with reference numerals 1020–1025, 1030–1045 and 1050–1065 of FIG. 10, respectively. At 1106, a host computer disassembles a CAP file into logical data units, and the logical data units are partitioned into one or more APDUs. At 1108, an authentication fingerprint is computed over the APDU data stream, as described below with reference to FIGS. 20A and 20B. At 1110, one or more loading terminal authentication codes are created. At 1112, one or more target smart card authentication codes are created. At 1114, the CAP file is augmented with the authentication codes, fingerprint, or both. At 1116, the augmented CAP file is communicated to a loading terminal.

Still referring to FIG. 11, at 1118 the loading terminal receives a load request including the augmented CAP file, an applet ID (AID) or the like, initialization instructions and initialization data. The term "AID" is defined by International Standards Organization (ISO) Standard ISO-IEC 7816-3. At 1120, loading of the applet is initiated. The initiating may include separating any authentication codes and fingerprint from the augmented CAP file and obtaining linking information. Optionally, at 1121 a loading order of program elements for optimized verification and linking is determined. The loading order of program elements may be determined as described with respect to reference numeral 1015 of FIG. 10. Alternatively, the order may be determined from an indicator stored in an augmented CAP file. At 1122, the augmented CAP file is disassembled into one or more logical APDUs. At 1124, the augmented CAP file is authenticated based on a loading terminal authentication code. At 1126, a target authentication code is selected from the target smart card authentication codes in the augmented CAP file based upon the target smart card. At 1128, one or more logical APDUs are communicated to the target smart card. At 1130, the fingerprint or authentication code based on a fingerprint is sent to the smart card. At 1132, the target smart card authentication code is sent to the smart card. At 1134, initialization instructions and load data are sent to the target smart card. At 1136 a proof of loading is received from the target smart card.

According to embodiments of the present invention, processes 1122 and 1124 are performed before processes 1126, 1128 and 1130. However, the order of processes 1126, 1128 and 1130 with respect to one another may be changed.

Still referring to FIG. 11, at 1140 the target smart card receives a load request from the loading terminal and performs load initialization. The load initialization may include receiving the fingerprint or authentication code based on a fingerprint that was sent at 1130. At 1142, logical APDUs received from the loading terminal are processed. The processing includes computing an authentication fingerprint over the logical APDU payload. The processing may also include receiving the fingerprint or authentication code based on a fingerprint that was sent at 1130. At 1144, the received content is authenticated based on the target smart card authentication code. The authenticating may include receiving the fingerprint or authentication code based on a fingerprint that was sent at 1130. At 1146, the received content is committed to memory on the smart card if the received fingerprint and the computed fingerprint matches, and if the received content is properly authenticated. At 1148, initialization data received from the loading terminal is used to initialize the card. At 1150, a proof of loading is sent to the loading terminal.

Alternatively, the processes illustrated in FIGS. 10 and 11 may performed without using loading terminal authentication codes and/or target smart card authentication codes. The decision to use or not use authentication codes may be based at least in part on a level of trust in host computer 1100, loading terminal 1105 and/or smart card 1110. By way of example, if the loading terminal is trusted, the processes illustrated in FIGS. 10 and 11 may be performed without a loading terminal authentication code. Thus if a card issuer uses its own terminals to update a card, a terminal authentication code is not needed since the card issuer can trust terminals which the issuer controls. But if a third party terminal at a point of sale remote from the card issuer is used to update the card and the card has been in the possession of a user, a terminal authentication code may be needed because the card issuer may have little if any control over the terminal. Similarly, if the target smart card is trusted, the processes illustrated in FIGS. 10 and 11 may be performed without a target smart card authentication code.

Additionally, those of ordinary skill in the art will recognize that other mechanisms for creating a terminal authentication code may be used.

According to one embodiment of the present invention, the host computer 1100 and the loading terminal 1105 comprise the same device.

Host Computer

Figure 12:
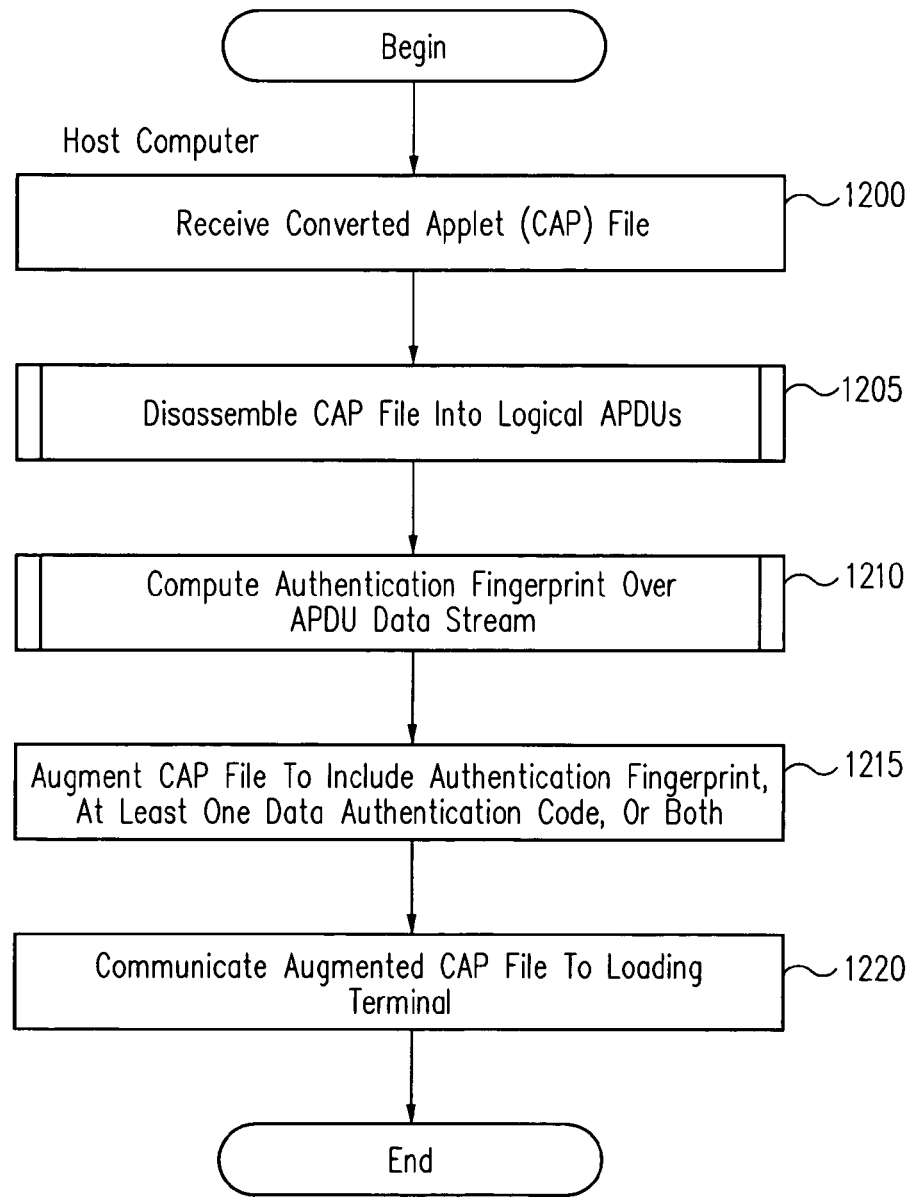
FIG. 12 is a flow diagram that illustrates a method for communicating program data from a host computer to a loading terminal from the perspective of a host computer in accordance with one embodiment of the present invention.

Turning now to FIG. 12, a flow diagram that illustrates a method for communicating program data from a host computer to a loading terminal from the perspective of a host computer in accordance with one embodiment of the present invention is presented. FIG. 12 provides more detail for reference numerals 1015–1025 of FIG. 10 and reference numerals 1106–1116 of FIG. 11. At 1200, a CAP file is received. At 1205, the CAP file is disassembled into one or more logical APDUs. At 1210, an authentication fingerprint is computed over the APDU data stream. Alternatively, the authentication fingerprint may be computed upon creation of a logical APDU (i.e. as part of the CAP file disassembly process 1205). At 1215, the CAP file is augmented to include the authentication fingerprint, at least one data authentication code based at least in part on the authentication fingerprint, or any combination thereof. At 1220, the augmented CAP file is communicated to a loading terminal.

Figure 13:
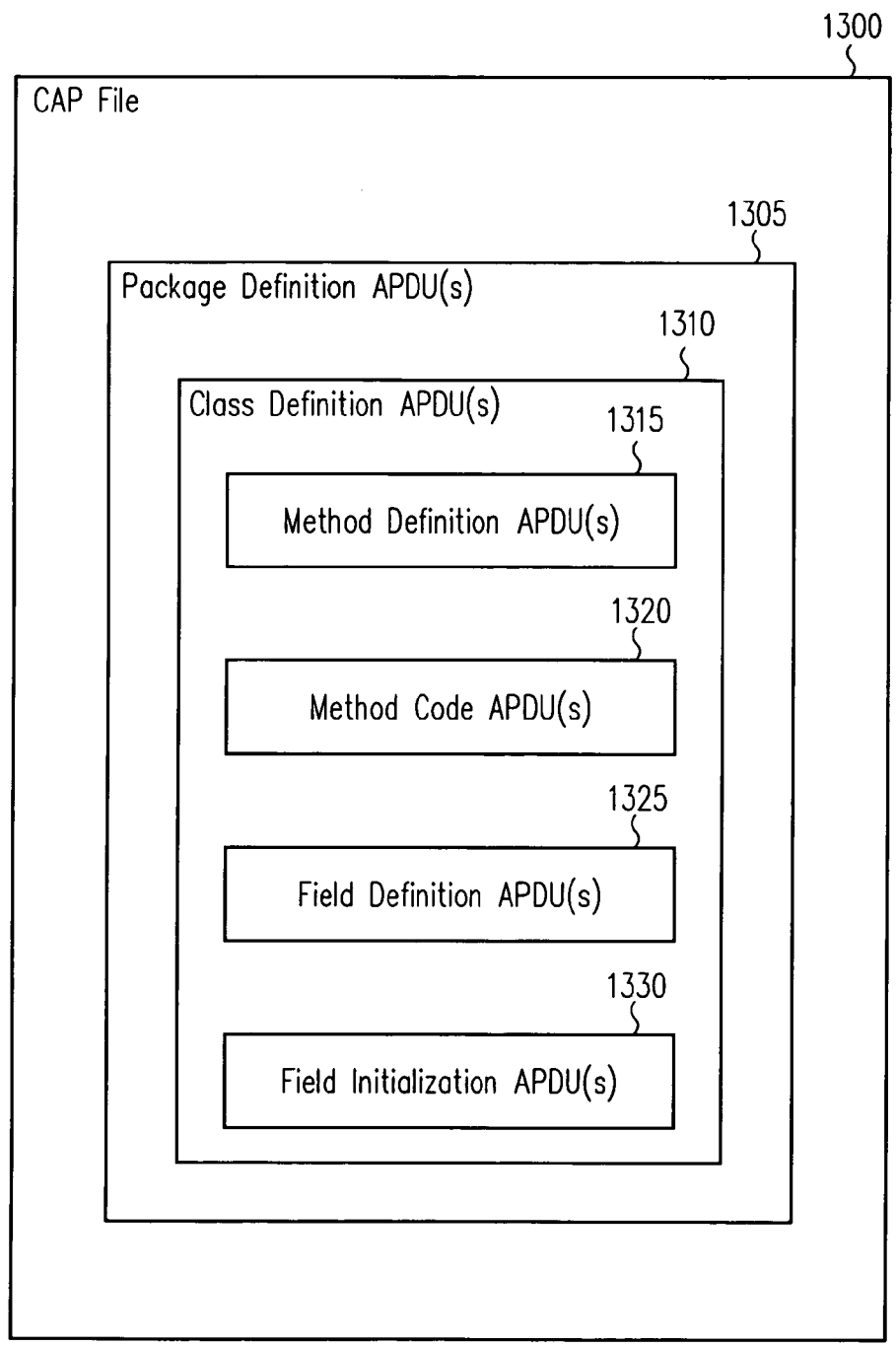
FIG. 13 is a block diagram that illustrates partitioning a CAP file into one or more logical APDUs in accordance with one embodiment of the present invention.

Turning now to FIG. 13, a block diagram that illustrates partitioning a CAP file into one or more logical APDUs in accordance with one embodiment of the present invention is presented. FIG. 13 provides more detail for reference numeral 1205 of FIG. 12. CAP file 1300 is partitioned into one or more APDUs comprising package definition data 1305 for any package in the CAP file. Package definition data may comprise a package identifier. A class within a package is partitioned into one or more APDUs comprising class definition data 1310 for any class in the package. Class definition data may comprise, by way of example, a class identifier, a base class identifier and one or more interface identifiers. For any method in a class, the method is partitioned into one or more APDUs comprising method definition data 1315 and one or more APDUs comprising method code data 1320. For any field in a class, the field is partitioned into one or more APDUs comprising field definition data 1325. For static fields, the fields are also partitioned into one or more APDUs comprising field initialization data 1330.

Method definition data 1315 may comprise, by way of example, a method identifier, a return type identifier, one or more parameter type identifiers and one or more throwable exception type identifiers. Method code data 1320 may comprise, by way of example, executable bytecodes. Field definition data 1325 may comprise, by way of example, a field count, and a field type identifier for each field included in the field count. Field initialization data 1330 may comprise, by way of example, data used to initialize constant data.

According to embodiments of the present invention, one or more APDUs comprising verification data may be associated with a program unit such a package, a class or a method, or the like. The verification information is computed off-card by a host computer or a loading terminal, and loaded onto the card for use at laod time, and possibly for use during programming. The one or more verification APDUs may be inserted in the APDU data stream before the corresponding logical program unit APDUs. The one or more verification APDUs may also be inserted in the APDU data stream after the corresponding logical program unit APDUs. The verification data includes information for use in predicting program behavior during execution. Verification data may include, by way of example, primitive data type information such as bounds on values belonging to a particular data type. Verification data may also include program stack state information, such as the data type of entries on the program stack during simulated execution of the associated method code. The program stack state information may also include one or more reference to classes which are composite data types.

According to one embodiment of the present invention, class verification APDUs supplement verification data in the method verification APDUs for methods in a particular class. Such class verification APDUs may be used, by way of example, when a particular load order results in incomplete verification information availability when performing a per-method verification.

According to another embodiment of the present invention, package verification APDUs supplement verification data in the class verification APDUs for classes in a particular package. Such package verification APDUs may be used, by way of example, when a particular load order results in incomplete verification information availability when performing a per-class verification.

Type Map Information

According to another embodiment of the present invention, verification information is condensed using one or more type maps. The one or more type maps refer to sets of types that are relevant to a particular program unit. The one or more type maps refer to the data type of entries on an operand stack or in a register file during simulated execution of the corresponding code. The type maps allow optimization of verification by using relatively smaller numbers to refer to predefined sets of types as the types used in the corresponding code. This provides a relatively condensed representation of the types that need to be checked during verification of a program unit. This is explained in more detail below, with reference to FIG. 14.

Figure 14:
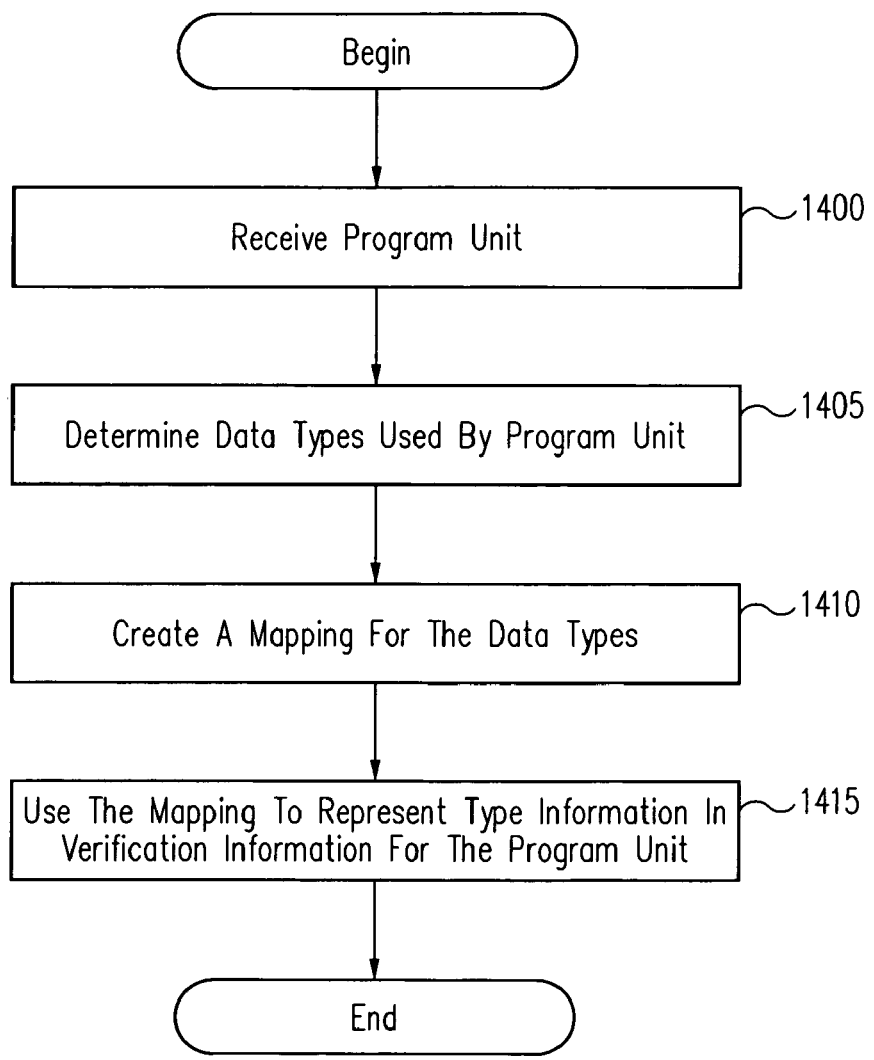
FIG. 14 is a flow diagram that illustrates a method for using program unit type map information in accordance with one embodiment of the present invention.

Turning now to FIG. 14, a flow diagram that illustrates a method for using program unit type map information in accordance with one embodiment of the present invention is presented. At 1400, a program unit is received. Using Java™ technology as an example, a method, class or package is received. At 1405, the types used by the program unit are determined. At 1410, a mapping for the types is created. At 1415, the program unit mapping information is used in verification information for the program unit.

According to one embodiment of the present invention, program unit type map information is used to represent all type information in a program unit. According to another embodiment of the present invention, program unit type map information is used to represent a subset of type information in a program unit. By way of example, a type map may be used to represent the most-used types in the program unit.

According to one embodiment of the present invention, a type map comprises a bitmap, each bit of the type map representing a particular data type. By way of example, a 16-bit type map may be used to represent 16 types.

According to another embodiment of the present invention, type map information for a lower-level program unit is cumulative with respect to type map information for a higher-level program unit. By way of example, a package-level 4-bit type map may be used to represent the 16 most-used types in a package. A class-level 4-bit type map may be used to represent the 16 most-used types in a class, exclusive of the 16 types represented by the package-level type map. As a further example, a bitmapped package-level 4-bit type map may be used to represent the 4 most-used types in a package. A bitmapped class-level 4-bit type map may be used to represent the 4 most-used types in a class, exclusive of the 4 types represented by the package level type map.

According to one embodiment of the present invention, a trailer APDU indicates the last APDU associated with a program unit. According to another embodiment of the present invention, a header APDU precedes one or more APDUs associated with a program unit and defines the expected sequence of logical program unit APDUs to follow.

Program Element Order

Figures 15A, 15C:
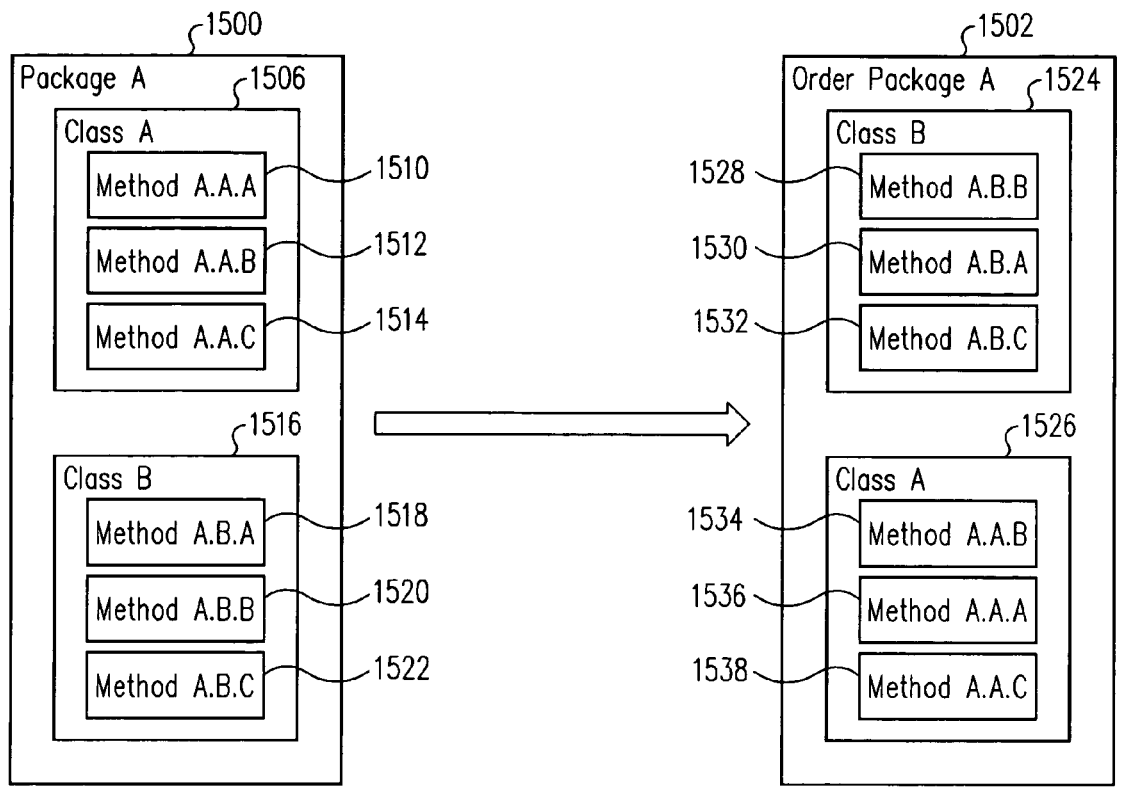
FIG. 15A is a block diagram that illustrates a CAP file comprising package-structured data.
FIG. 15C is a block diagram that illustrates the CAP file of FIG. 15A ordered based upon the use diagram of FIG. 15B in accordance with one embodiment of the present invention.
Figure 15B:
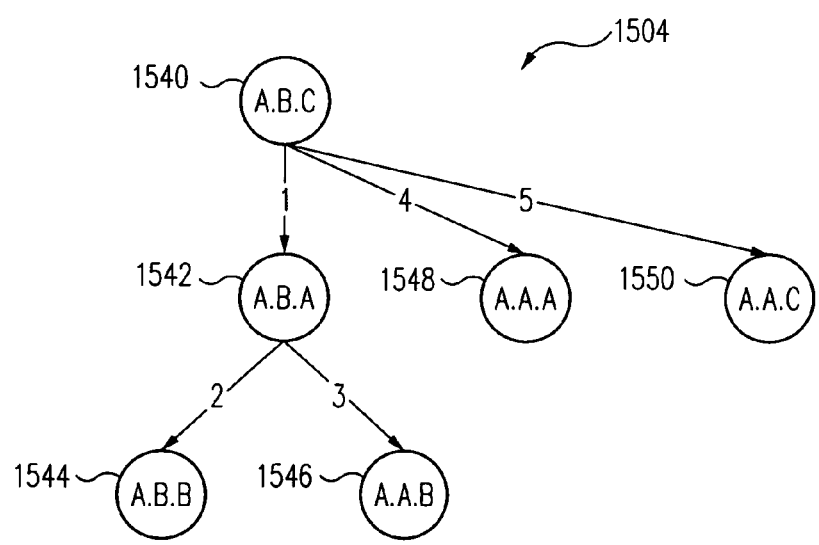
FIG. 15B is a use diagram corresponding to the program within the CAP file of FIG. 15A.

FIGS. 15A–17C illustrate determining the order of program elements in a CAP file in accordance with one embodiment of the present invention. FIGS. 15A–17C provide more detail for reference numeral 1015 of FIG. 10 and reference numeral 1121 of FIG. 11. FIG. 15A illustrates a CAP file before ordering, FIG. 15B illustrates a use graph of the program elements in the CAP file of FIG. 15A and FIG. 15C illustrates the ordering of program elements in the original CAP file based at least in part on the use graph of FIG. 15B. According to one embodiment of the present invention, the original CAP file is ordered based at least in part on the corresponding use graph. The ordered file is communicated to the target device. According to another embodiment of the present invention, the original CAP file is modified to include an order indicator that indicates the load order for the CAP file content. The modified CAP file is communicated to the target device. According to another embodiment of the present invention, the original CAP file and an order indicator that indicates the load order for the CAP file content are communicated to the target device.

Figure 16:
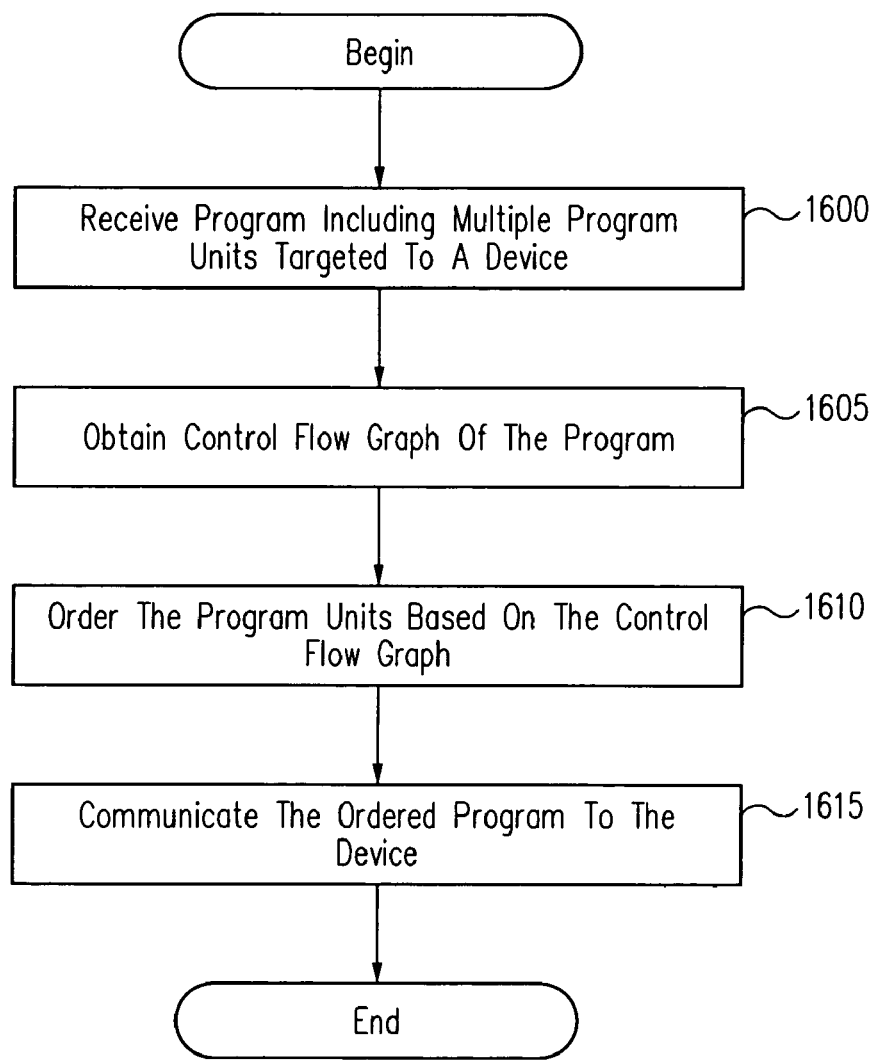
FIG. 16 is a flow diagram that illustrates a method for ordering program units for optimized verification and linking in accordance with one embodiment of the present invention.

Turning now to FIG. 16, a flow diagram that illustrates a method for ordering program units for optimized verification and linking in accordance with one embodiment of the present invention is presented. At 1600, a program including multiple program units targeted to a device such as a smart card or the like is received. At 1605, a use graph of the program is obtained. At 1610, the program units are ordered to create an ordered program. The ordering is based at least in part on the use graph obtained at 1605. At 1615, the ordered program is communicated to the device.

According to one embodiment of the present invention, a "depth-first" approach for ordering program elements is followed. Using FIGS. 15A–15C as an example, method A.B.C (1540) is the main method and it calls method A.B.A (1542). Method A.B.A (1542) calls method A.B.B (1544) first and method A.A.B (1546) second. Neither method A.B.B (1544) nor method A.A.B (1546) calls other methods. Method A.B.C (1540) also calls method A.A.A (1548), followed by method A.A.C (1550). Following the use graph of FIG. 15B, and proceeding in a depth-first, left-to-right manner, the resulting order is: A.B.B (1544), A.A.B (1546), A.B.A (1542), A.A.A (1548), A.A.C (1550), A.B.C (1540). This is the order reflected in the ordered package illustrated in FIG. 15C.

Figure 17A:
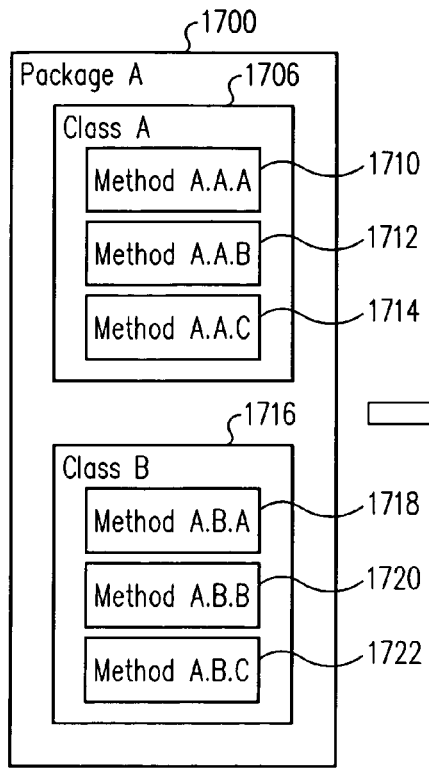
FIG. 17A is a block diagram that illustrates a CAP file comprising package-structured data.
Figure 17C:
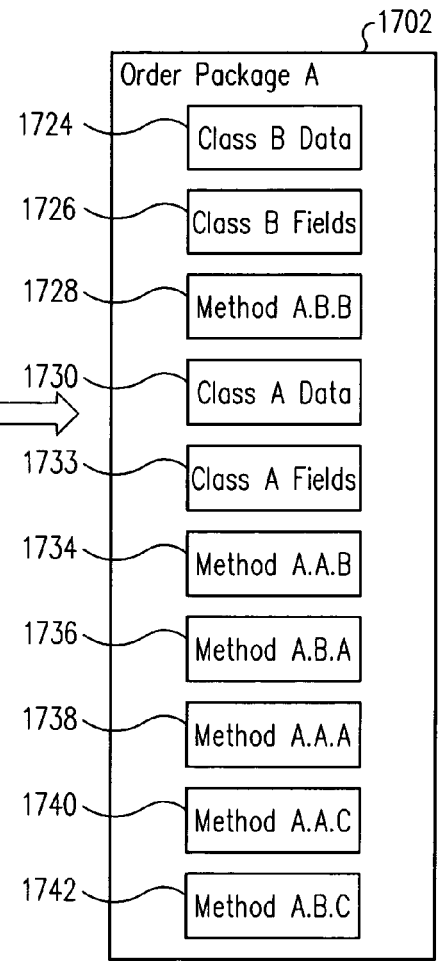
FIG. 17C is a block diagram that illustrates the CAP file of FIG. 17A ordered based upon the use diagram of FIG. 17B in accordance with one embodiment of the present invention.
Figure 17B:
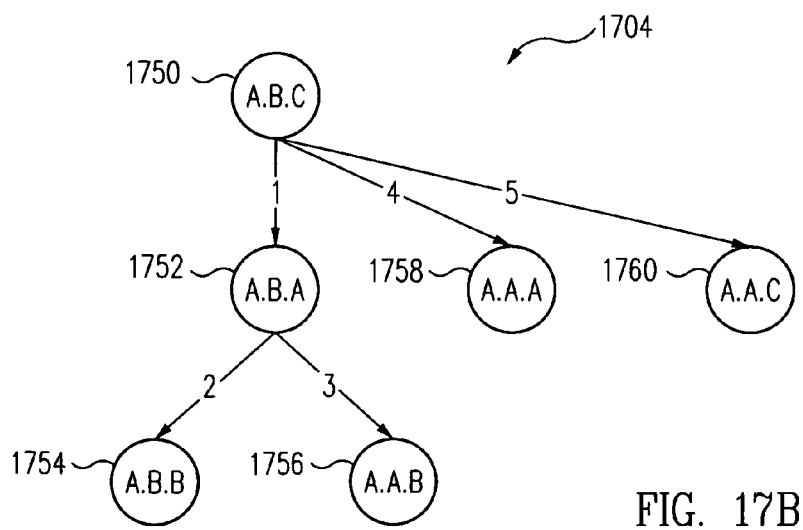
FIG. 17B is a use diagram corresponding to the program within the CAP file of FIG. 17A.

FIGS. 17A–17C illustrate determining the order CAP file content based on a use diagram to create a more flattened ordered CAP file. FIGS. 17A–17C are similar to FIGS. 15A–15C except that the ordered CAP file 1502 of FIG. 15C retains the class structure of the original CAP file 1500, whereas the ordered CAP file 1702 of FIG. 17C has been flattened and thus does not retain the original class structure in the CAP file 1700. FIG. 17A illustrates a CAP file comprising package-structured data. FIG. 17B illustrates a use diagram corresponding to the program within the CAP file of FIG. 17A. FIG. 17C illustrates the CAP file of FIG. 17A ordered based upon the use diagram of FIG. 17B in accordance with one embodiment of the present invention.

As shown in FIG. 17C, the first-used method is method A.B.B 1754. The use of method A.B.B 1754 requires class A.B data 1724 and class A.B fields 1726, so this information is placed before method A.B.B 1728 in the ordered CAP file 1702. The next-used method is method A.A.B 1756. The use of method A.A.B 1756 requires class A.A data 1730 and class A.A fields 1733. Since the required class and field data does not occur earlier in the ordered CAP file, the required class and field data is placed before method A.A.B 1734 in the ordered CAP file 1702. Placement of succeeding methods in the ordered CAP file 1702 proceeds according to the order of use, without regard to which class a method belongs to. In the present example, no further class or field data needs to be loaded because class and field data for the only two classes present in the original CAP file 1700 has already been placed in the ordered CAP file 1702.

The program elements and use graph shown in FIGS. 15A–17C are for purposes of illustration only. Those of ordinary skill in the art will recognize a use graph may be used to represent the use of other portions of a program. By way of example, a use graph may also represent the use of fields or other program constructs. Additionally, portions of a program from different packages may be ordered in a fashion similar to that shown in FIG. 17C, with package data for a particular package being positioned in the resulting file before any program units of the package. Also, those of ordinary skill in the art will recognize that many combinations of program elements and calling relationships between those program elements are possible.

According to another embodiment of the present invention, APDUs are arbitrarily ordered, with each APDU including context information. By way of example, an APDU may include information identifying the APDU contents as the fourth method of the second class. Including context information in an APDU facilitates loading all static data first (all the fields, classes and names) and then loading all the methods, ensuring information used by the methods for use in verification and linking is available first.

According to one embodiment of the present invention, a host computer inserts an ordering indicator in an augmented CAP file containing program data. A loading terminal uses the ordering indicator to determine the ordering of APDUs created as a result of the CAP file disassembly process. According to one embodiment of the present invention, the ordering indicator is based at least in part on a use graph of the program. By way of example, type map information may be loaded relatively late in the loading process, thus minimizing the amount of memory required. Alternatively, type map information may be loaded relatively early in the loading process, thus increasing the probability that the type information will be resident on the card when the types are referenced.

According to one embodiment of the present invention, one or more field definition APDUs 1325 and field initialization APDUs 1330 corresponding to a particular class are processed before any corresponding method definition APDU 1315 or method code APDU 1320 of the class.

CAP File Disassembly

Figure 18:
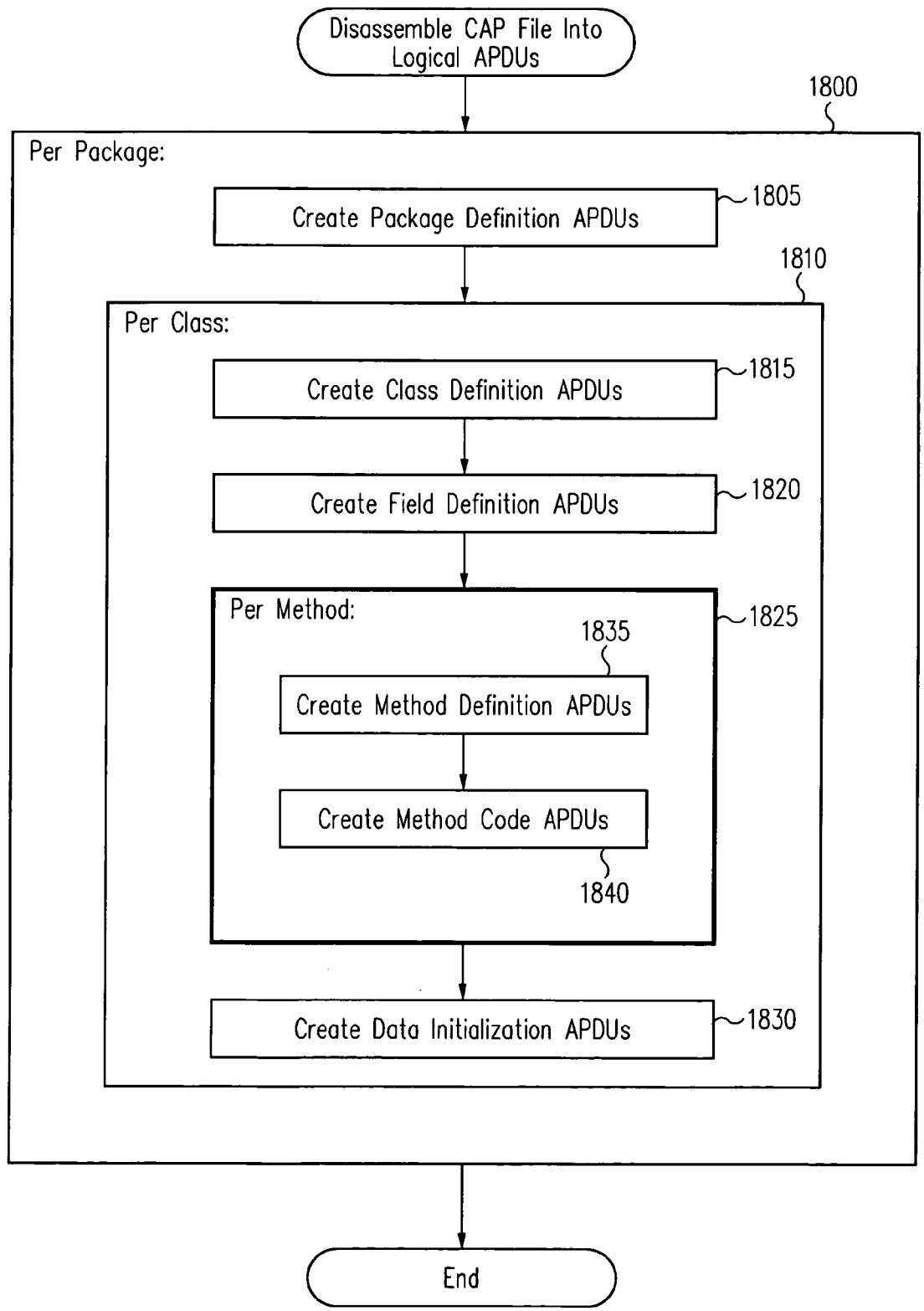
FIG. 18 is a flow diagram that illustrates a method for disassembling a CAP file into one or more logical APDUs in accordance with one embodiment of the present invention.
Figure 19:
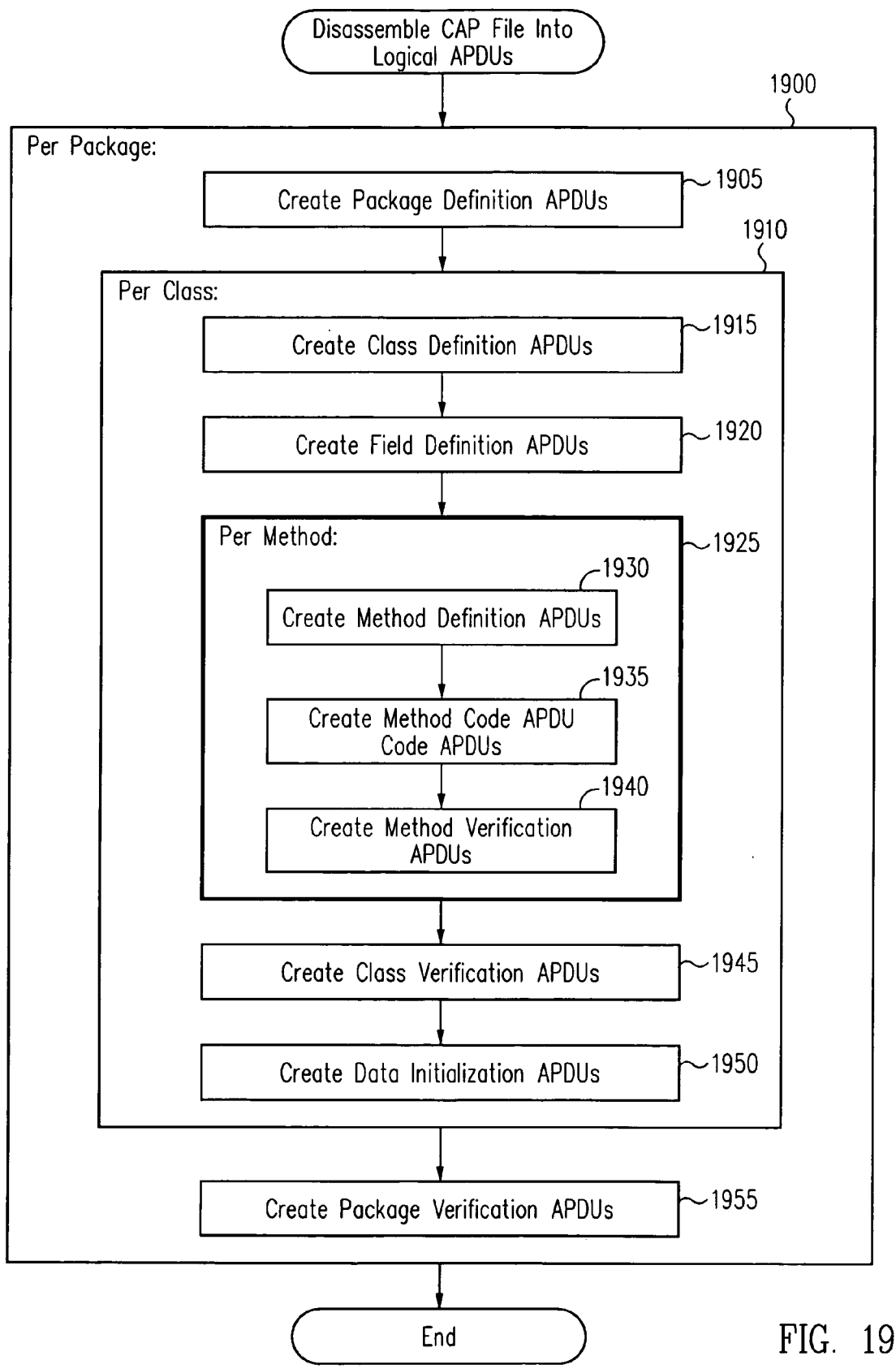
FIG. 19 is a flow diagram that illustrates a method for disassembling a CAP file into one or more logical APDUs including APDUs comprising verification data in accordance with one embodiment of the present invention.

FIGS. 18 and 19 are flow diagrams that illustrate disassembling a CAP file into logical APDUs from the perspective of a host computer in accordance with embodiments of the present invention. FIG. 18 illustrates disassembling a CAP file that does not include verification data and FIG. 19 illustrates disassembling a CAP file that includes verification data.

Turning now to FIG. 18, a flow diagram that illustrates a method for disassembling a CAP file into logical APDUs in accordance with one embodiment of the present invention is presented. The process illustrated within box 1800 is performed per package. At 1805, one or more package definition APDUs comprising package definition data are created for a package. The process illustrated within box 1810 is performed per class. At 1815, one or more class definition APDUs comprising class definition data are created for a class. At 1820, one or more field definition APDUs comprising field definition data are created for the class. The process illustrated within box 1825 is performed per method. At 1835, one or more method definition APDUs comprising method definition data are created for a method. At 1840, one or more code APDUs comprising the method code are created for the method. At 1830, one or more data initialization APDUs are created.

According to embodiments of the present invention, verification data may be created for program units. The verification data may be created for program units such as packages, classes, methods, or the like, or any combination thereof. As mentioned previously, the verification data for a program unit may be inserted in an APDU stream before the corresponding program unit code APDU or program unit definition APDU. In one embodiment, the verification data is inserted immediately before the corresponding program unit code APDU or program unit definition APDU. Alternatively, the verification data for a program unit may be inserted in an APDU stream after the corresponding program unit code APDU or program unit definition APDU. In one embodiment, the verification data is inserted immediately after the corresponding program unit code APDU or program unit definition APDU. This is explained in more detail below with reference to FIG. 19.

Turning now to FIG. 19, a flow diagram that illustrates a method for disassembling a CAP file into logical APDUs including APDUs comprising verification data in accordance with one embodiment of the present invention is presented. FIG. 19 is similar to FIG. 18, except that verification data is included in FIG. 19 at reference numerals 1940, 1945 and 1955. The process illustrated within box 1900 is performed per package. At 1905, one or more package definition APDUs comprising package definition data are created for a package. The process illustrated within box 1910 is performed per class. At 1915, one or more class definition APDUs comprising class definition data are created for a class. At 1920, one or more field definition APDUs comprising field definition data are created for the class. The process illustrated within box 1925 is performed per method. At 1930, one or more method definition APDUs comprising method definition data are created for a method. At 1935, one or more code APDUs comprising the method code are created for the method. At 1940, one or more method verification APDUs comprising method verification data are created for a method. At 1945, one or more class verification APDUs comprising class verification data are created for a class. At 1950, one or more data initialization APDUs are created. At 1955, one or more package verification APDUs comprising package verification data are created for a package.

According to embodiments of the present invention, one or more verification APDUs are inserted into the APDU stream before and/or after the corresponding one or more code or definition APDUs. Using FIG. 19 as an example, one or more package verification APDUs may be inserted into the APDU stream (1955) after inserting the corresponding one or more package definition APDUs (1905). Alternatively, one or more package verification APDUs may be inserted into the APDU stream before inserting the corresponding one or more package definition APDUs. Similarly, one or more class verification APDUs may be inserted into the APDU stream (1945) after inserting the corresponding one or more class definition APDUs (1915). Alternatively, one or more class verification APDUs may be inserted into the APDU stream before inserting the corresponding one or more class definition APDUs. As a further example, one or more method verification APDUs may be inserted into the APDU stream (1940) after inserting the corresponding one or more method definition APDUs (1930). Alternatively, one or more method verification APDUs may be inserted into the APDU stream before inserting the corresponding one or more method definition APDUs. A verification APDU that precedes or succeeds the corresponding one or more code or definition APDUs may comprise, by way of example, one or more type maps.

Figure 20A:
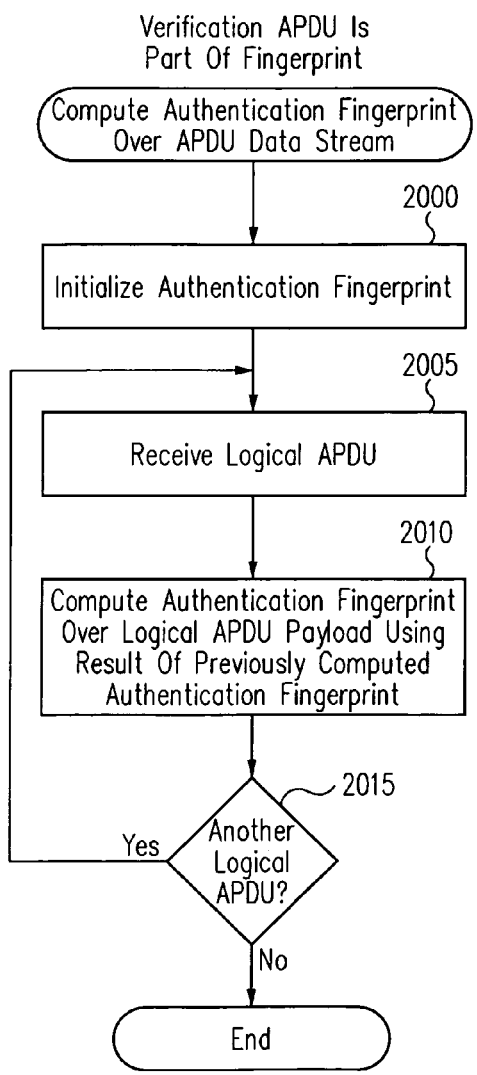
FIG. 20A is a flow diagram that illustrates a method for computing an authentication fingerprint over an APDU data stream where verification APDUs are included in the fingerprint in accordance with one embodiment of the present invention.
Figure 20B:
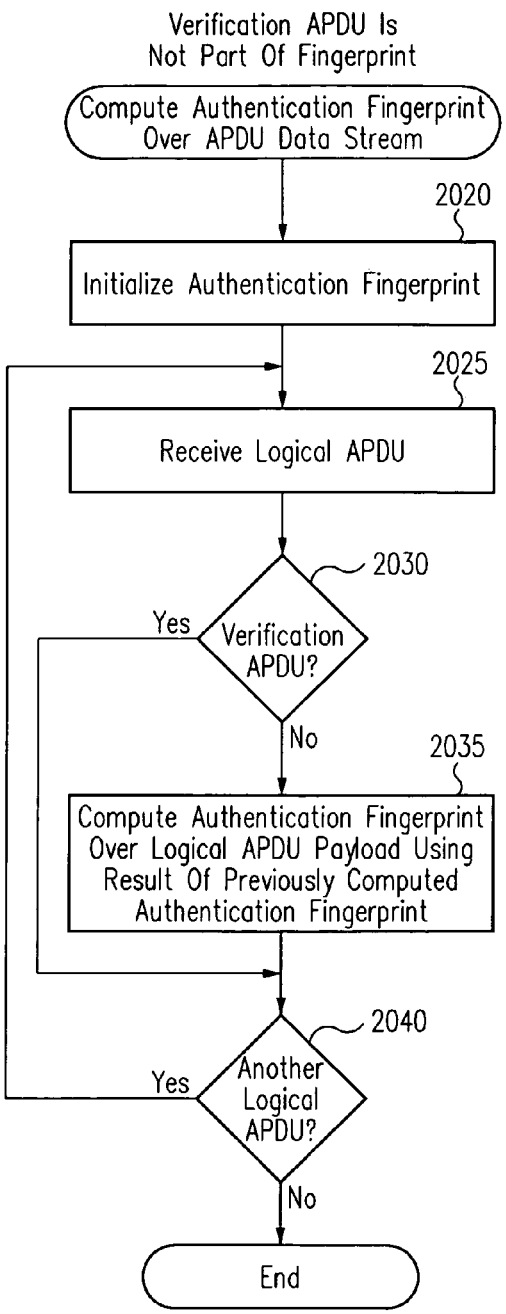
FIG. 20B is a flow diagram that illustrates a method for computing an authentication fingerprint over an APDU data stream where verification APDUs are excluded from the fingerprint in accordance with one embodiment of the present invention.

FIGS. 20A and 20B are flow diagrams that illustrate methods for computing an authentication fingerprint over an APDU data stream in accordance with embodiments of the present invention. FIGS. 20A and 20B provide more detail for reference numeral 1108 of FIG. 11. FIG. 20A illustrates computing an authentication fingerprint when verification APDUs are used to determine the authentication fingerprint. FIG. 20B illustrates computing an authentication fingerprint when verification APDUs are not used to determine the authentication fingerprint. The process illustrated by FIGS. 20A and 20B are the same processes used by a loading terminal (reference numerals 1128 and 1130 of FIG. 11) and by a target smart card (reference numeral 1142 of FIG. 11) to compute an authentication fingerprint, as described below.

Turning now to FIG. 20, a flow diagram that illustrates a method for computing an authentication fingerprint over an APDU data stream in accordance with one embodiment of the present invention is presented. Referring to FIG. 20A, at 200 an authentication fingerprint is initialized. At 2005, a logical APDU is received. At 2010, the fingerprint is computed over the logical APDU payload. The fingerprint computation uses the result of the previously computed fingerprint. At 2015, a determination is made regarding whether another logical APDU remains to be processed. Processing of additional APDUs continues at 2005.

Referring to FIG. 20B, at 2020 an authentication fingerprint is initialized. At 2025, a logical APDU is received. At 2030, a determination is made regarding whether the APDU is a verification APDU. If the APDU is not a verification APDU, the fingerprint is computed over the logical APDU payload at 2035. The fingerprint computation uses the result of the previously computed fingerprint. At 2040, a determination is made regarding whether another logical APDU remains to be processed. Processing of additional APDUs continues at 2025.

Loading Terminal

Figure 21:
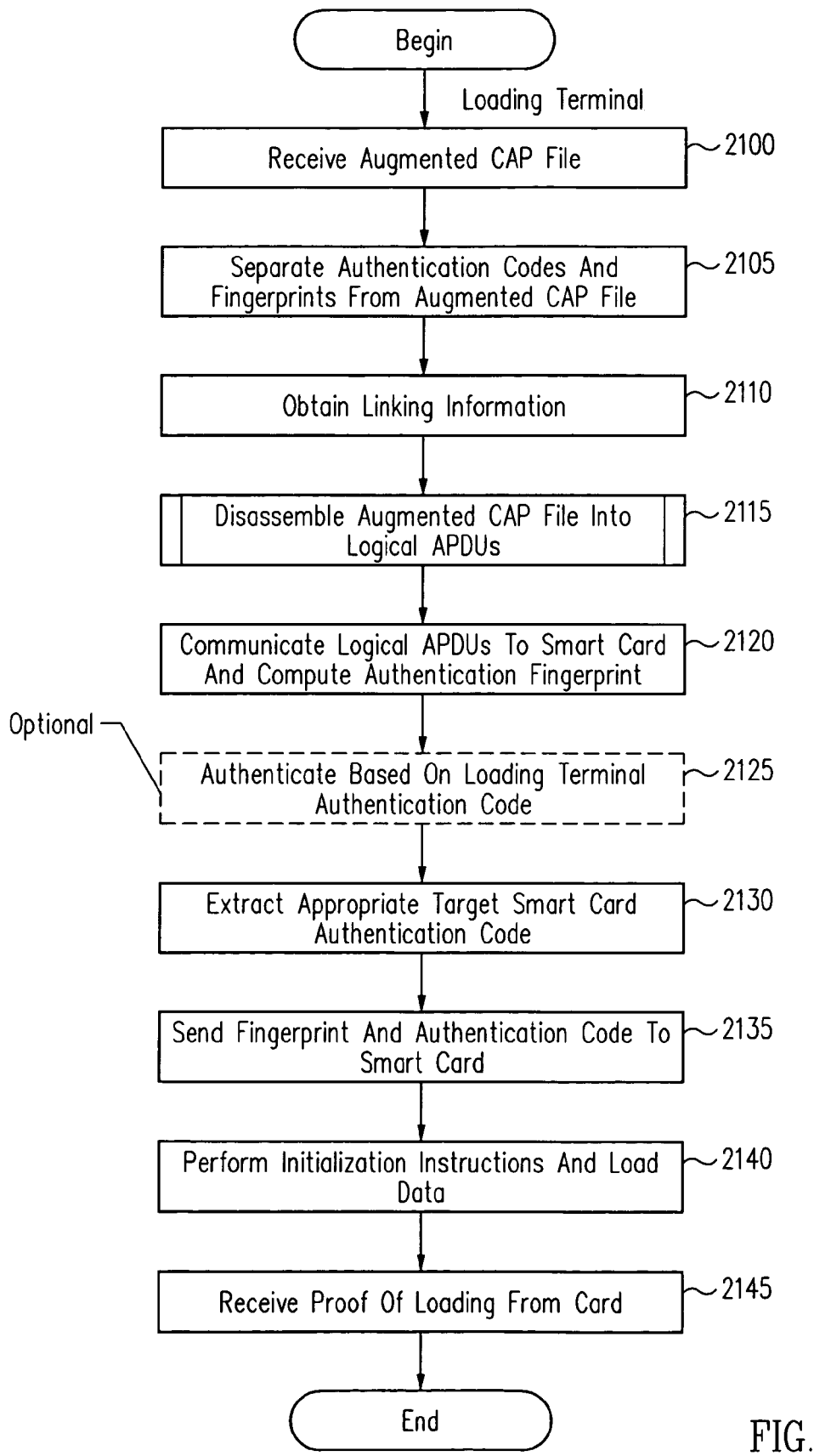
FIG. 21 is a flow diagram that illustrates a method for communicating program data from a host computer to a loading terminal from the perspective of a loading terminal in accordance with one embodiment of the present invention.

Turning now to FIG. 21, a flow diagram that illustrates a method for communicating program data from a host computer to a loading terminal from the perspective of a loading terminal in accordance with one embodiment of the present invention is presented. FIG. 21 provides additional detail for reference numerals 1030–1045 of FIG. 10 and reference numerals 1118–1136 of FIG. 11. At 2100, an augmented CAP file is received. At 2105, any authentication codes and fingerprints are separated from the augmented CAP file. At 2110, linking information is obtained. The linking information comprises information needed to link methods, such as the card's present callable routines and how to reference them. The linking information may be obtained from an external source. By way of example, a loading terminal may communicate via the Web with a central repository having knowledge of a particular target smart card's linking information. As a further example of obtaining linking information from an external source, a loading terminal may obtain the information from the target smart card itself.

Still referring to FIG. 21, at 2115 the augmented CAP file is disassembled into one or more logical APDUs. At 2120, the one or more logical APDUs are communicated to a smart card and an authentication fingerprint is computed over the APDU payload. The process in 2115 and 2120 is similar to processes 1205 and 1210 of FIG. 12 performed by the host computer as described above, as well as the processes 2905 of FIG. 29 and 3005 of FIG. 30 performed by the target smart card as described below. The similarity of the processes guarantees that if the APDU payload remains the same, the same authentication fingerprint will be generated regardless of the entity performing the computation. Conversely, if the APDU payload changes between when each entity performs the computation, a different fingerprint will be generated, signaling a change in the payload.

Still referring to FIG. 21, process 2125 applies when a CAP file optionally includes an authentication fingerprint. If the CAP file includes an authentication fingerprint, a determination is made regarding whether the fingerprint extracted from the augmented CAP file in 2105 matches the fingerprint computed at 2120. If the fingerprints match, at 2130 a target smart card authentication code appropriate for the particular target smart card is extracted from the CAP file. At 2135, the fingerprint, authentication code, or both, are sent to the target smart card. At 2140, initialization instructions are performed and the resultant data is loaded. At 2145, a proof of loading is received from the smart card. According to one embodiment of the present invention, the proof of loading comprises the storage commitment fingerprint.

As illustrated in FIG. 21, the loading terminal disassembles an augmented CAP file into logical APDUs (2115) and then computes an authentication fingerprint over the logical APDU payload upon transmitting the logical APDUs to the target smart card (2120). Alternatively, the computation of the authentication fingerprint may be interleaved with the disassembly process (2115). As a further alternative, both the transmission of APDUs to the target smart card and the computation of the authentication fingerprint may be interleaved with the disassembly process (2115).

As mentioned previously, the augmented CAP file received by a loading terminal may include verification data. The loading terminal may also receive a CAP file without verification data, compute verification data, create one or more APDUs containing the data and send the one or more APDUs to the target smart card. The determination regarding whether to include verification data in the authentication fingerprint computation is based on whether the CAP file received by the loading terminal includes verification data, and on whether the target smart card requires verification data. If the received CAP file includes verification data, the authentication fingerprint is additionally computed over the verification data. If the received CAP file does not include verification data, the authentication fingerprint is not computed over verification data, regardless of whether the loading terminal produces verification data that is sent to the target smart card.

Figure 22:
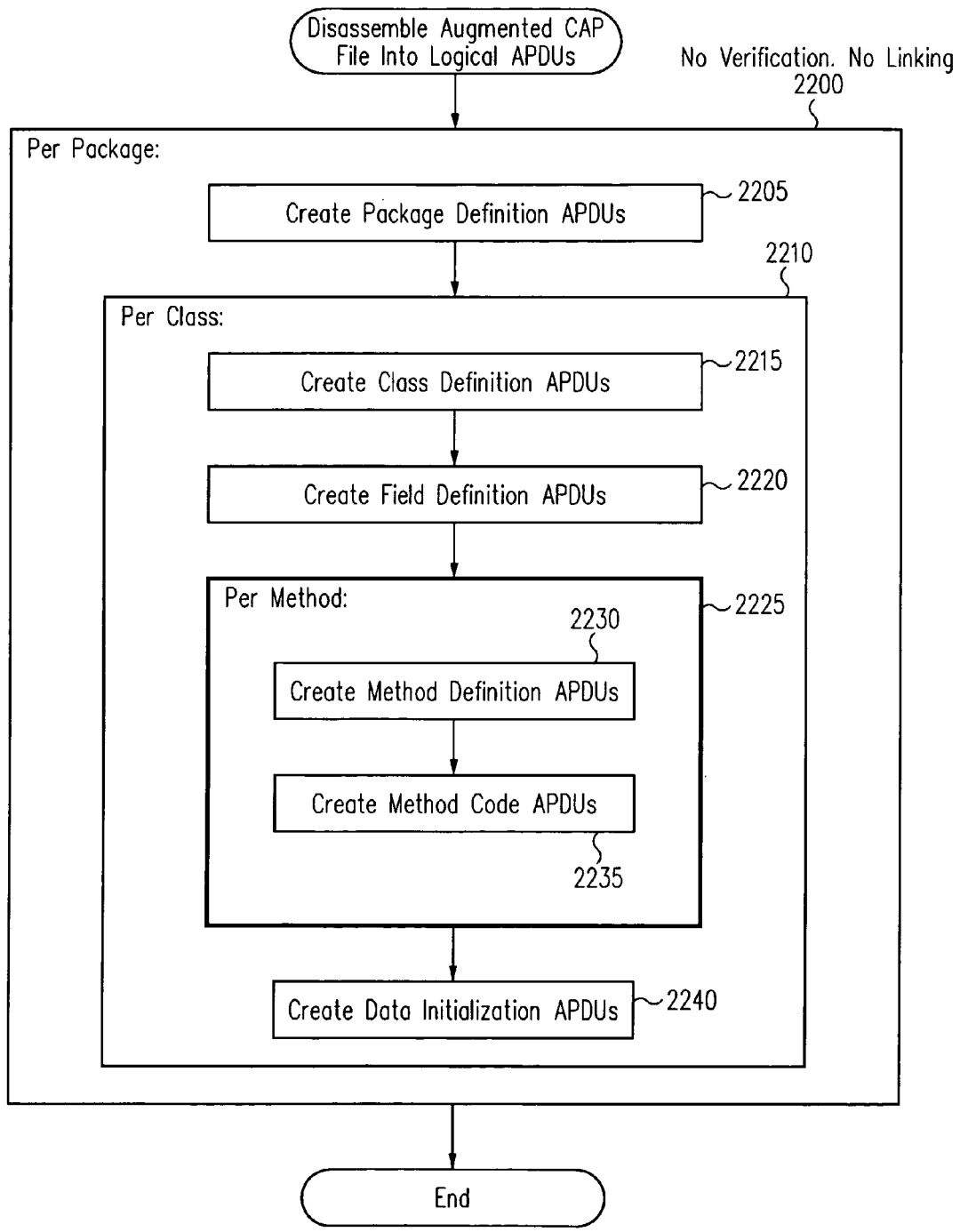
FIG. 22 is a flow diagram that illustrates a method for disassembling an augmented CAP file into one or more logical APDUs in accordance with one embodiment of the present invention.
Figure 23:
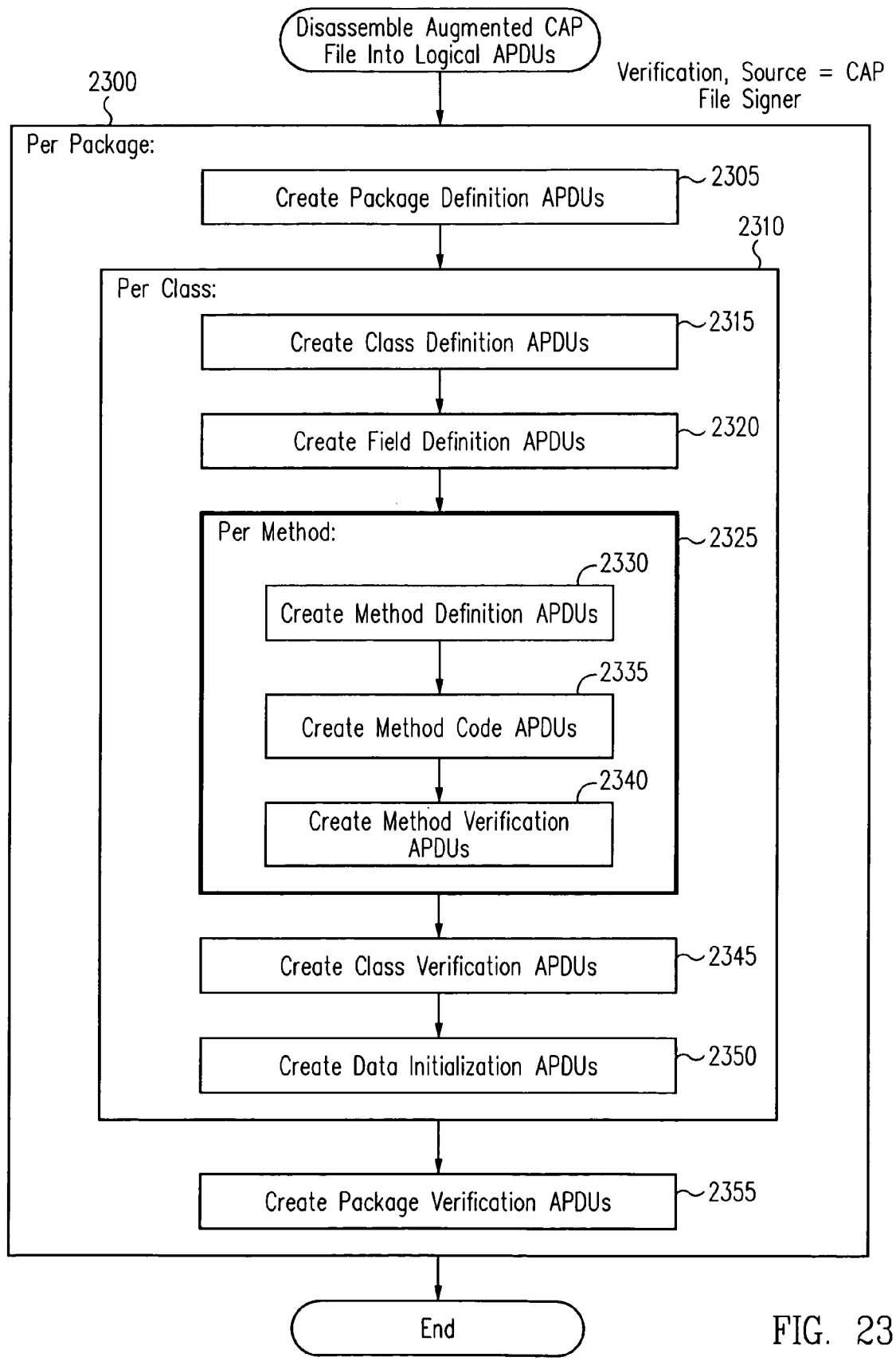
FIG. 23 is a flow diagram that illustrates a method for disassembling an augmented CAP file including verification data into one or more logical APDUs including APDUs comprising verification data in accordance with one embodiment of the present invention.
Figure 24:
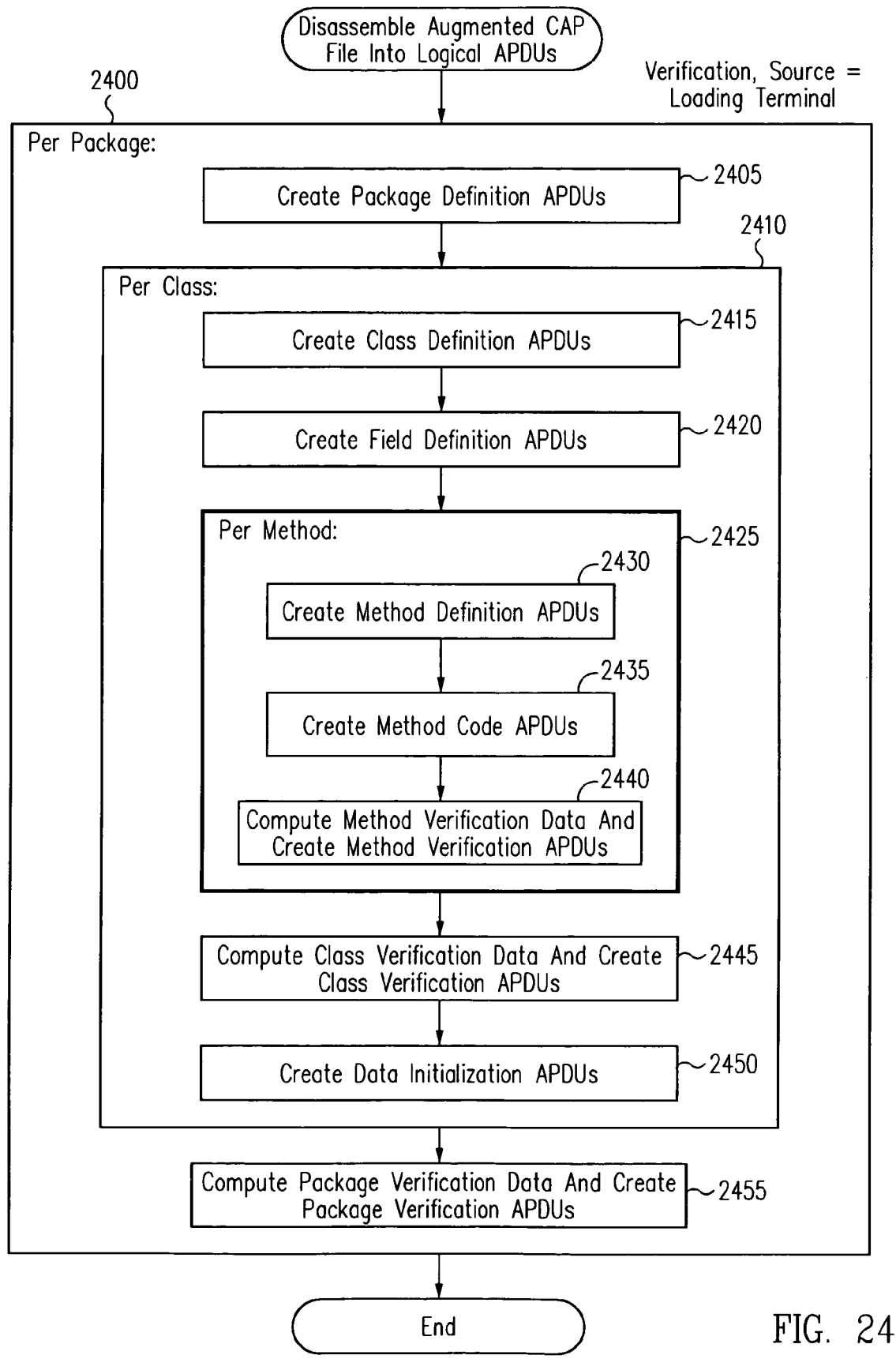
FIG. 24 is a flow diagram that illustrates a method for disassembling an augmented CAP file not including verification data into one or more logical APDUs including APDUs comprising verification data in accordance with one embodiment of the present invention.
Figure 25:
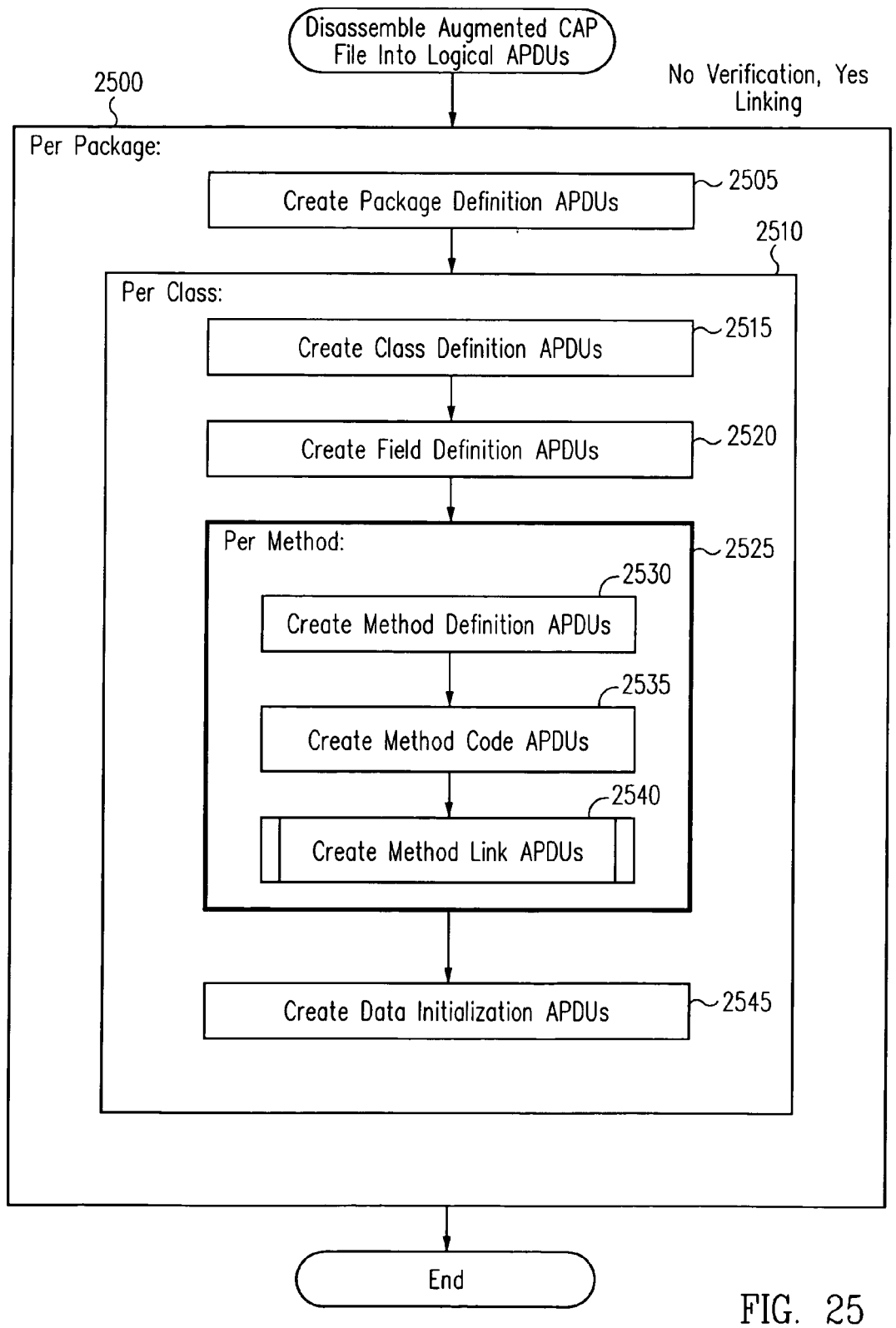
FIG. 25 is a flow diagram that illustrates a method for disassembling an augmented CAP file into one or more logical APDUs including APDUs comprising link data in accordance with one embodiment of the present invention.
Figure 26:
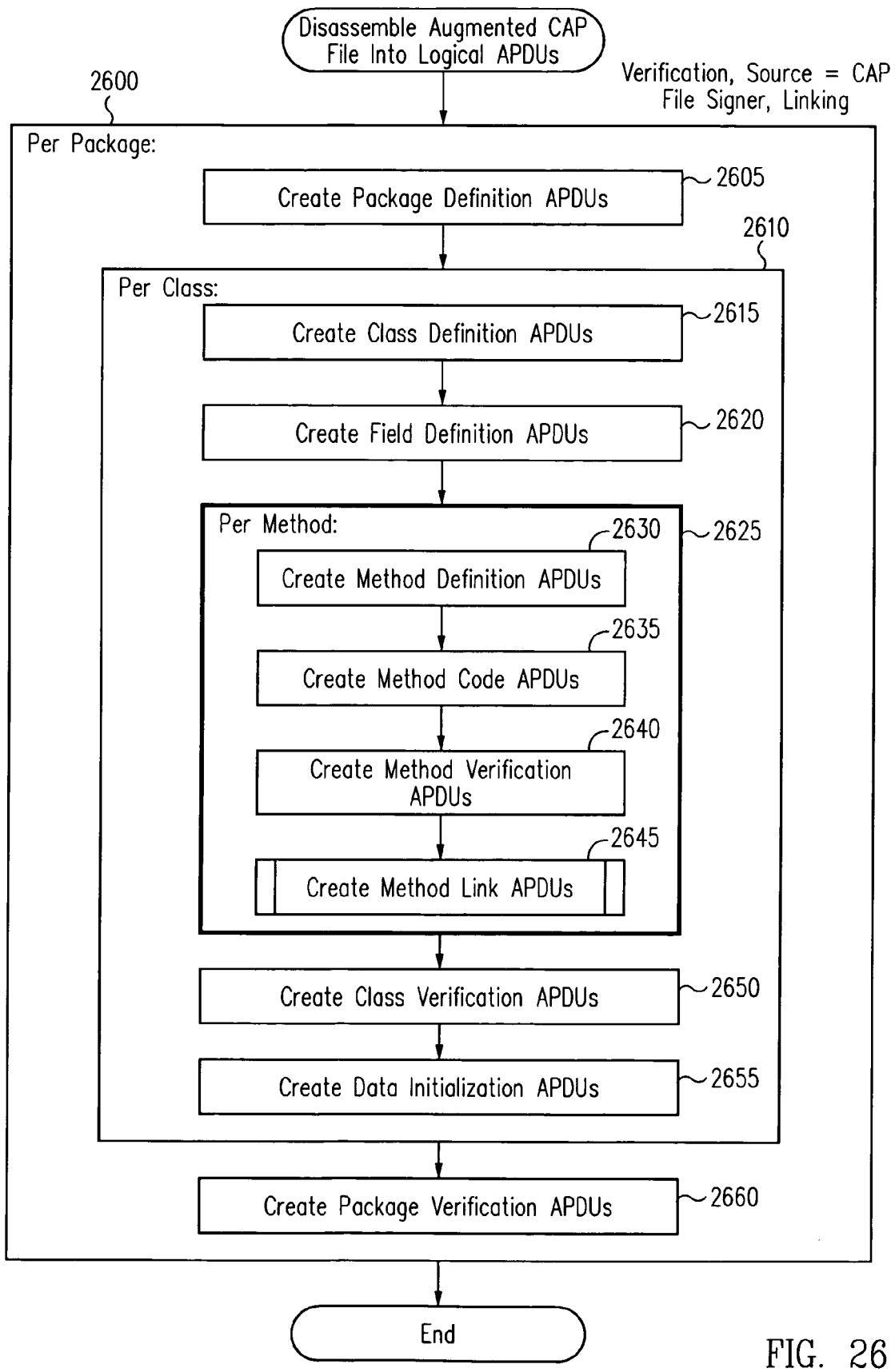
FIG. 26 is a flow diagram that illustrates a method for disassembling an augmented CAP file including verification data into one or more logical APDUs including APDUs comprising verification data and APDUs comprising link data in accordance with one embodiment of the present invention.
Figure 27:
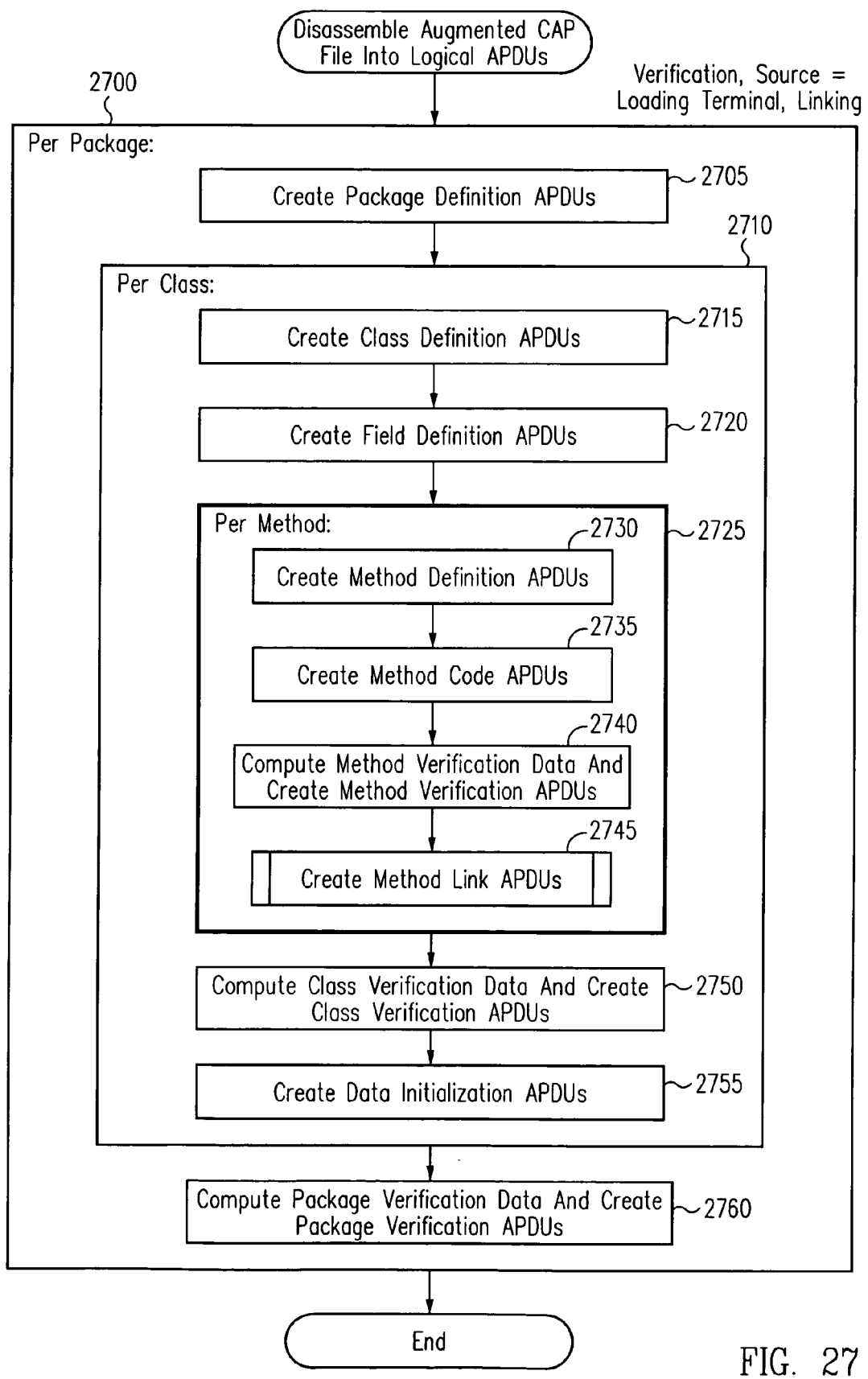
FIG. 27 is a flow diagram that illustrates a method for disassembling an augmented CAP file not including verification data into one or more logical APDUs including APDUs comprising verification data and APDUs comprising link data in accordance with one embodiment of the present invention.

The loading terminal may also receive a CAP file, compute link data, create one or more APDUs containing the data and send the one or more APDUs to the target smart card. FIGS. 22–27 illustrate methods for disassembling an augmented CAP file into one or more logical APDUs from the perspective of a loading terminal in accordance with embodiments of the present invention. FIGS. 22–27 provide more detail for reference numeral 2115 of FIG. 21. As mentioned previously, the program elements of the CAP file to be disassembled may be ordered for optimized verification and linking (reference numeral 1121 of FIG. 11) prior to the disassembling processes illustrated in FIGS. 22–27. FIG. 22 illustrates disassembling an augmented CAP file into one or more logical APDUs. FIG. 23 illustrates disassembling an augmented CAP file including verification data into one or more logical APDUs including APDUs comprising verification data. FIG. 24 illustrates disassembling an augmented CAP file not including verification data into one or more logical APDUs including APDUs comprising verification data. FIG. 25 illustrates disassembling an augmented CAP file into one or more logical APDUs including APDUs comprising link data. FIG. 26 illustrates disassembling an augmented CAP file including verification data into one or more logical APDUs including APDUs comprising verification data and APDUs comprising link data. FIG. 27 illustrates disassembling an augmented CAP file not including verification data into one or more logical APDUs including APDUs comprising verification data and APDUs comprising link data.

Turning now to FIG. 22, a flow diagram that illustrates a method for disassembling an augmented CAP file into one or more logical APDUs in accordance with one embodiment of the present invention is presented. FIG. 22 is similar to the process performed by the host computer as illustrated in FIG. 18. The process illustrated within box 2200 is performed per package. At 2205, one or more package definition APDUs comprising package definition data are created for a package. The process illustrated within box 2210 is performed per class. At 2215, one or more class definition APDUs comprising class definition data are created for a class. At 2220, one or more field definition APDUs comprising field definition data are created for the class. The process illustrated within box 2225 is performed per method. At 2230, one or more method definition APDUs comprising method definition data are created for a method. At 2235, one or more code APDUs comprising the method code are created for the method. At 2240, one or more data initialization APDUs are created.

Turning now to FIG. 23, a flow diagram that illustrates a method for disassembling an augmented CAP file including verification data into one or more logical APDUs including APDUs comprising verification data in accordance with one embodiment of the present invention is presented. FIG. 23 is similar to the process performed by the host computer as illustrated in FIG. 19. The process illustrated within box 2300 is performed per package. At 2305, one or more package definition APDUs comprising package definition data are created for a package. The process illustrated within box 2310 is performed per class. At 2315, one or more class definition APDUs comprising class definition data are created for a class. At 2320, one or more field definition APDUs comprising field definition data are created for the class. The process illustrated within box 2325 is performed per method. At 2330, one or more method definition APDUs comprising method definition data are created for a method. At 2335, one or more code APDUs comprising the method code are created for the method. At 2340, one or more method verification APDUs comprising method verification data are created for a method. At 2345, one or more class verification APDUs comprising class verification data are created for a class. At 2350, one or more data initialization APDUs are created. At 2355, one or more package verification APDUs comprising package verification data are created for a package.

Turning now to FIG. 24, a flow diagram that illustrates a method for disassembling an augmented CAP file not including verification data into one or more logical APDUs including APDUs comprising verification data in accordance with one embodiment of the present invention is presented. FIG. 24 is similar to FIG. 23, except that in FIG. 24, verification data is computed (2440, 2445, 2455), whereas in FIG. 23, verification data used to create one or more verification APDUs (2340, 2345, 2355) is extracted from the augmented CAP file. The process illustrated within box 2400 is performed per package. At 2405, one or more package definition APDUs comprising package definition data are created for a package. The process illustrated within box 2410 is performed per class. At 2415, one or more class definition APDUs comprising class definition data are created for a class. At 2420, one or more field definition APDUs comprising field definition data are created for the class. The process illustrated within box 2425 is performed per method. At 2430, one or more method definition APDUs comprising method definition data are created for a method. At 2435, one or more code APDUs comprising the method code are created for the method. At 2440, method verification data is computed and one or more method verification APDUs comprising method verification data are created for a method. At 2445, class verification data is computed and one or more class verification APDUs comprising class verification data are created for a class. At 2450, one or more data initialization APDUs are created. At 2455, package verification data is computed and one or more package verification APDUs comprising package verification data are created for a package.

Turning now to FIG. 25, a flow diagram that illustrates a method for disassembling an augmented CAP file into logical one or more APDUs including APDUs comprising link data in accordance with one embodiment of the present invention is presented. FIG. 25 is similar to FIG. 22, except that per-method link APDUs are created (2540) in FIG. 25. The process illustrated within box 2500 is performed per package. At 2505, one or more package definition APDUs comprising package definition data are created for a package. The process illustrated within box 2510 is performed per class. At 2515, one or more class definition APDUs comprising class definition data are created for a class. At 2520, one or more field definition APDUs comprising field definition data are created for the class. The process illustrated within box 2525 is performed per method. At 2530, one or more method definition APDUs comprising method definition data are created for a method. At 2535, one or more code APDUs comprising the method code are created for the method. At 2540, per-method link APDUs are created. At 2545, one or more data initialization APDUs are created.

Turning now to FIG. 26, a flow diagram that illustrates a method for disassembling an augmented CAP file including verification data into one or more logical APDUs including APDUs comprising verification data and APDUs comprising link data in accordance with one embodiment of the present invention is presented. FIG. 26 represents the combination of FIGS. 23 and 25. The process illustrated within box 2600 is performed per package. At 2605, one or more package definition APDUs comprising package definition data are created for a package. The process illustrated within box 2610 is performed per class. At 2615, one or more class definition APDUs comprising class definition data are created for a class. At 2620, one or more field definition APDUs comprising field definition data are created for the class. The process illustrated within box 2625 is performed per method. At 2630, one or more method definition APDUs comprising method definition data are created for a method. At 2635, one or more code APDUs comprising the method code are created for the method. At 2640, one or more method verification APDUs comprising method verification data are created for a method. At 2645, per-method link APDUs are created. At 2650, one or more class verification APDUs comprising class verification data are created for a class. At 2655, one or more data initialization APDUs are created. At 2660, one or more package verification APDUs comprising package verification data are created for a package.

Turning now to FIG. 27, a flow diagram that illustrates a method for disassembling an augmented CAP file not including verification data into one or more logical APDUs including APDUs comprising verification data and APDUs comprising link data in accordance with one embodiment of the present invention is presented. FIG. 27 represents the combination of FIGS. 24 and 25. The process illustrated within box 2700 is performed per package. At 2705, one or more package definition APDUs comprising package definition data are created for a package. The process illustrated within box 2710 is performed per class. At 2715, one or more class definition APDUs comprising class definition data are created for a class. At 2720, one or more field definition APDUs comprising field definition data are created for the class. The process illustrated within box 2725 is performed per method. At 2730, one or more method definition APDUs comprising method definition data are created for a method. At 2735, one or more code APDUs comprising the method code are created for the method. At 2740, method verification data is computed and one or more method verification APDUs comprising method verification data are created for a method. At 2745, per-method link APDUs are created. At 2750, class verification data is computed and one or more class verification APDUs comprising class verification data are created for a class. At 2755, one or more data initialization APDUs are created. At 2760, package verification data is computed and one or more package verification APDUs comprising package verification data are created for a package.

Figure 28:
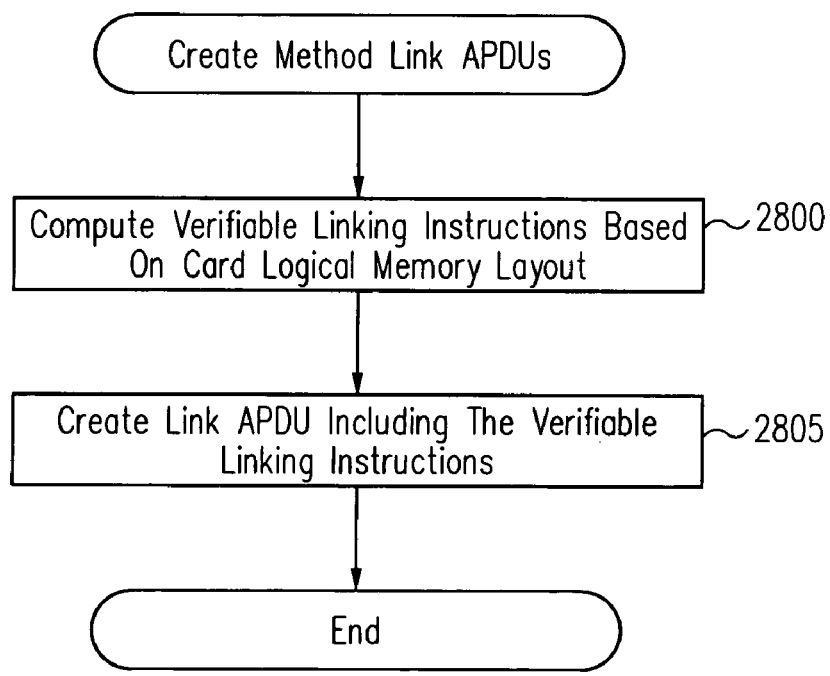
FIG. 28 is a flow diagram that illustrates a method for creating one or more method link APDUs in accordance with one embodiment of the present invention.

Turning now to FIG. 28, a flow diagram that illustrates a method for creating one or more method link APDUs in accordance with one embodiment of the present invention is presented. FIG. 28 provides more detail for reference numeral 2540 of FIG. 25, reference numeral 2645 of FIG. 26 and reference numeral 2745 of FIG. 27. At 2800, verifiable linking instructions are computed based on logical memory layout and information from the card. The loading terminal may have previously obtained this information as described above with respect to reference numeral 2110 of FIG. 21. At 2805, a link APDU that includes the verifiable linking instructions is created.

Smart Card

Figure 29:
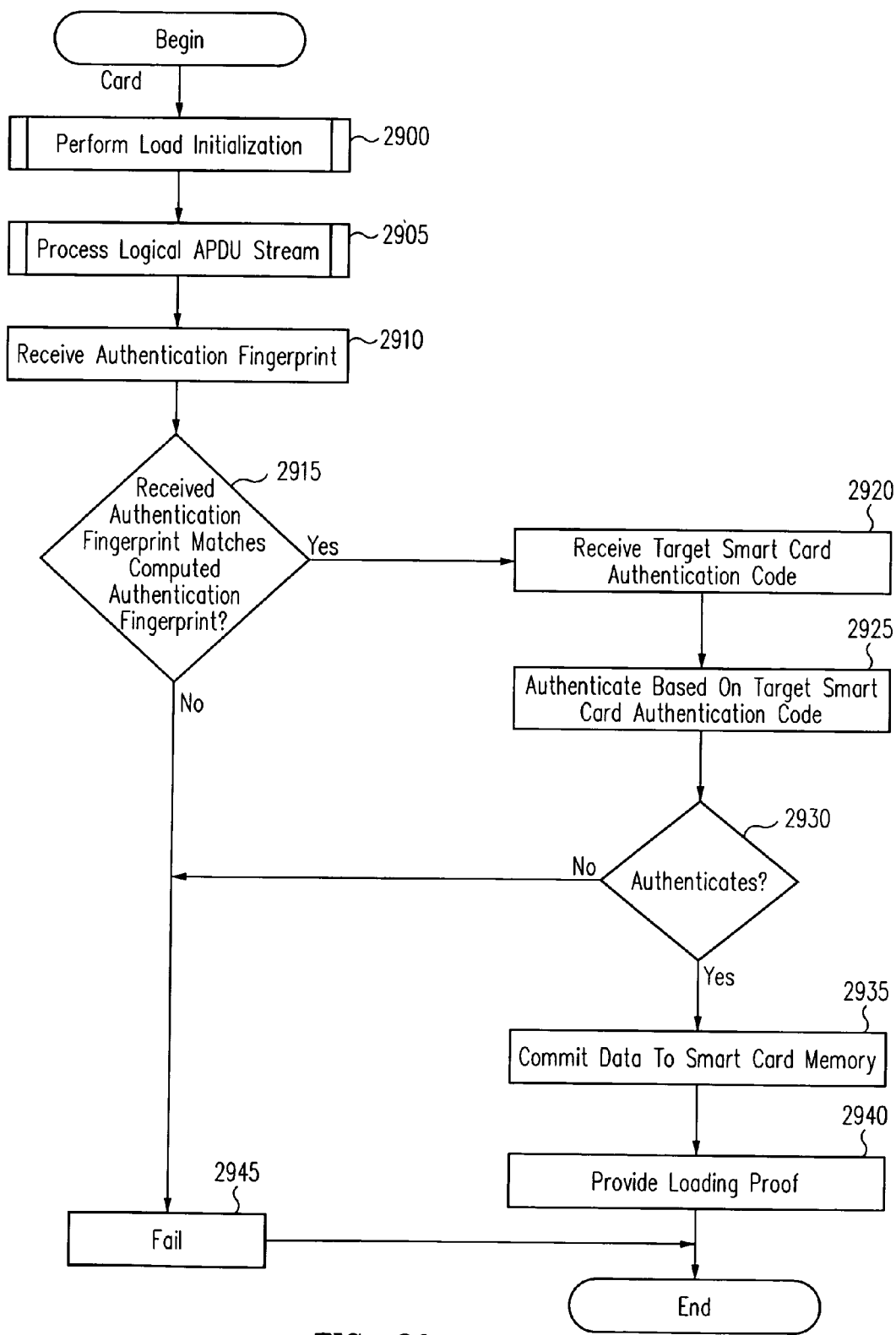
FIG. 29 is a flow diagram that illustrates a method for communicating program data from a loading terminal to a smart card from the perspective of a smart card in accordance with one embodiment of the present invention.

Turning now to FIG. 29, a flow diagram that illustrates a method for communicating program data from a loading terminal to a smart card from the perspective of a smart card in accordance with one embodiment of the present invention is presented. FIG. 29 provides additional detail for reference numerals 1050–1065 of FIG. 10 and reference numerals 1140–1150 of FIG. 11. At 2900, load initialization is performed. At 2905, one or more logical APDUs are processed to prepare the data in their data fields for loading. The processing comprises computing an authentication fingerprint. At 2910, an authentication fingerprint APDU is received. Alternatively, the authentication fingerprint may be received as part of load initialization (2600), or as part of processing APDUs (2605).

Still referring to FIG. 29, at 2915 a determination is made regarding whether the received authentication fingerprint matches the authentication fingerprint computed at 2905. If the received authentication fingerprint does not match the computed authentication fingerprint, a failure indication is made at 2945. If the received authentication fingerprint matches the computed authentication fingerprint, a target smart card authentication code is received at 2920 and authentication is performed based on the target smart card authentication code at 2925. At 2930, a determination is made regarding whether the authentication was successful. If the authentication was unsuccessful, a failure indication is made at 2945. If the authentication was successful, the program data is committed to the smart card memory at 2935 and a loading proof is provided at 2940. The program data may be committed to the smart card memory by associating the program data with a storage commitment fingerprint computed over the finally stored program data. According to one embodiment of the present invention, the loading proof comprises the storage commitment fingerprint. According to another embodiment of the present invention, the loading proof comprises an authentication code based at least in part on the storage commitment fingerprint.

Figure 30:
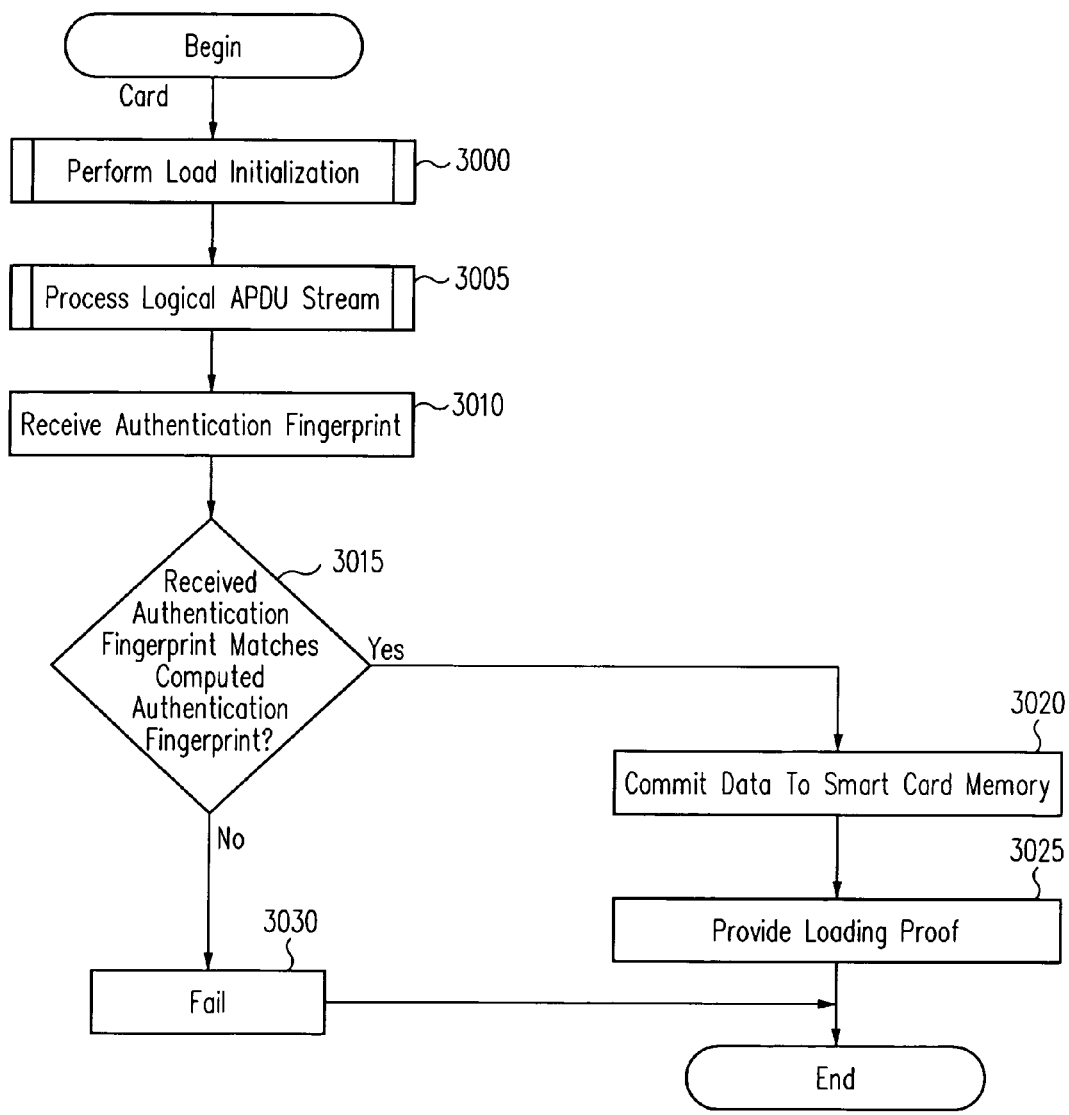
FIG. 30 is a flow diagram that illustrates a method for communicating program data from a loading terminal to a smart card from the perspective of a smart card using an authentication fingerprint that is a HMAC in accordance with one embodiment of the present invention.

Turning now to FIG. 30, a flow diagram that illustrates a method for communicating program data from a loading terminal to a smart card from the perspective of a smart card using an authentication fingerprint that is a HMAC in accordance with one embodiment of the present invention is presented. FIG. 30 is similar to FIG. 29, except that determinations 2930 and 2915 in FIG. 29 are equivalent to determination 3015 in FIG. 30. Since a HMAC is both a fingerprint and a message authentication code, the program data may be committed to the smart card memory when the received authentication fingerprint matches the computed authentication fingerprint. At 3000, load initialization is performed. At 3005, one or more logical APDUs are processed to prepare the data in their data fields for loading. The processing comprises computing an authentication fingerprint. At 3010, an authentication fingerprint APDU is received. Alternatively, the authentication fingerprint may be received as part of load initialization (2600), or as part of processing APDUs (2605).

Still referring to FIG. 30, at 3015 a determination is made regarding whether the received authentication fingerprint matches the authentication fingerprint computed at 3005. If the received authentication fingerprint does not match the computed authentication fingerprint, a failure indication is made at 3030. If the received authentication fingerprint matches the computed authentication fingerprint, the program data is committed to the smart card memory at 3020 and a loading proof is provided at 3025. The program data may be committed to the smart card memory by associating the program data with a storage commitment fingerprint computed over the finally stored program data. According to one embodiment of the present invention, the loading proof comprises the storage commitment fingerprint. According to another embodiment of the present invention, the loading proof comprises an authentication code based at least in part on the storage commitment fingerprint.

Figure 31:
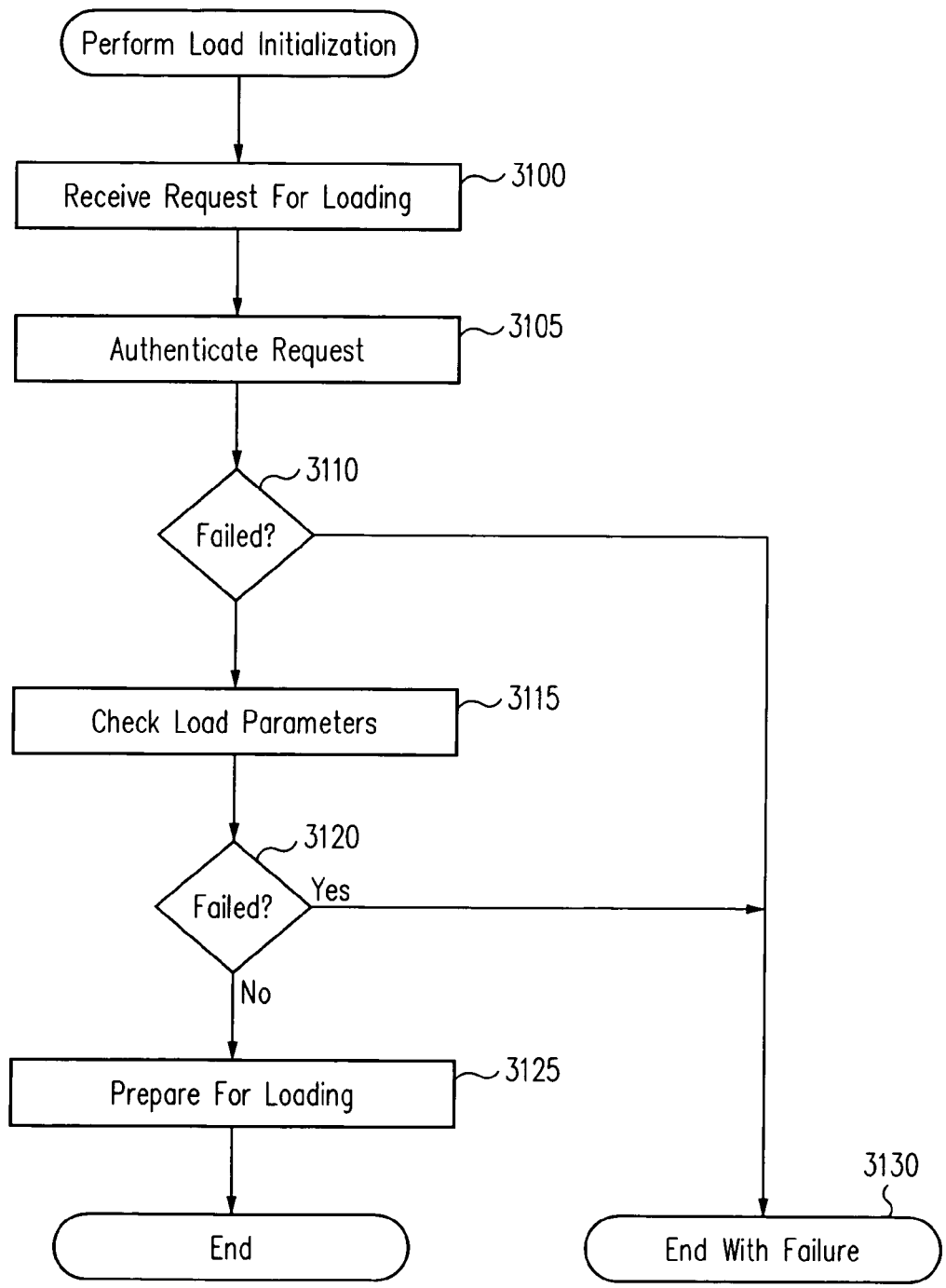
FIG. 31 is a flow diagram that illustrates a method for performing load initialization in accordance with one embodiment of the present invention.

Turning now to FIG. 31, a flow diagram that illustrates a method for performing load initialization in accordance with one embodiment of the present invention is presented. FIG. 31 provides more detail for reference numeral 2900 of FIG. 29 and reference numeral 3000 of FIG. 30. At 3100, a request for loading is received. At 3105, the request is authenticated to determine whether the loading process should proceed. At 3110, a determination is made regarding whether the authentication in 3105 was successful. If the authentication was not successful, the process ends with failure at 3130. If the authentication was successful, at 3115 load parameters are checked to determine whether the load is capable of succeeding, based on known characteristics of the card and the program data to be loaded. By way of example, if the card has less memory than what is required by the program data to be loaded, an indication that the load will fail is made. Additionally, if the program data to be loaded requires classes that are not presently on the card and are not part of the program data to be loaded, an indication that the load will fail is made. At 3120, a determination is made regarding whether the load is capable of succeeding based upon the result of process 3115. If the load is capable of succeeding, preparations for loading are made at 3125. Exemplary preparations include initializing one or more authentication fingerprints and one or more storage commitment fingerprints. If the load is not capable of succeeding, the loading process ends with failure at 3130.

Alternatively, the order of processes 3105 and 3115 may be switched so that process 3115 is performed before process 3105. However, load initialization ends with failure 3130 if either of processes 3105 and 3115 fails.

Figure 32:
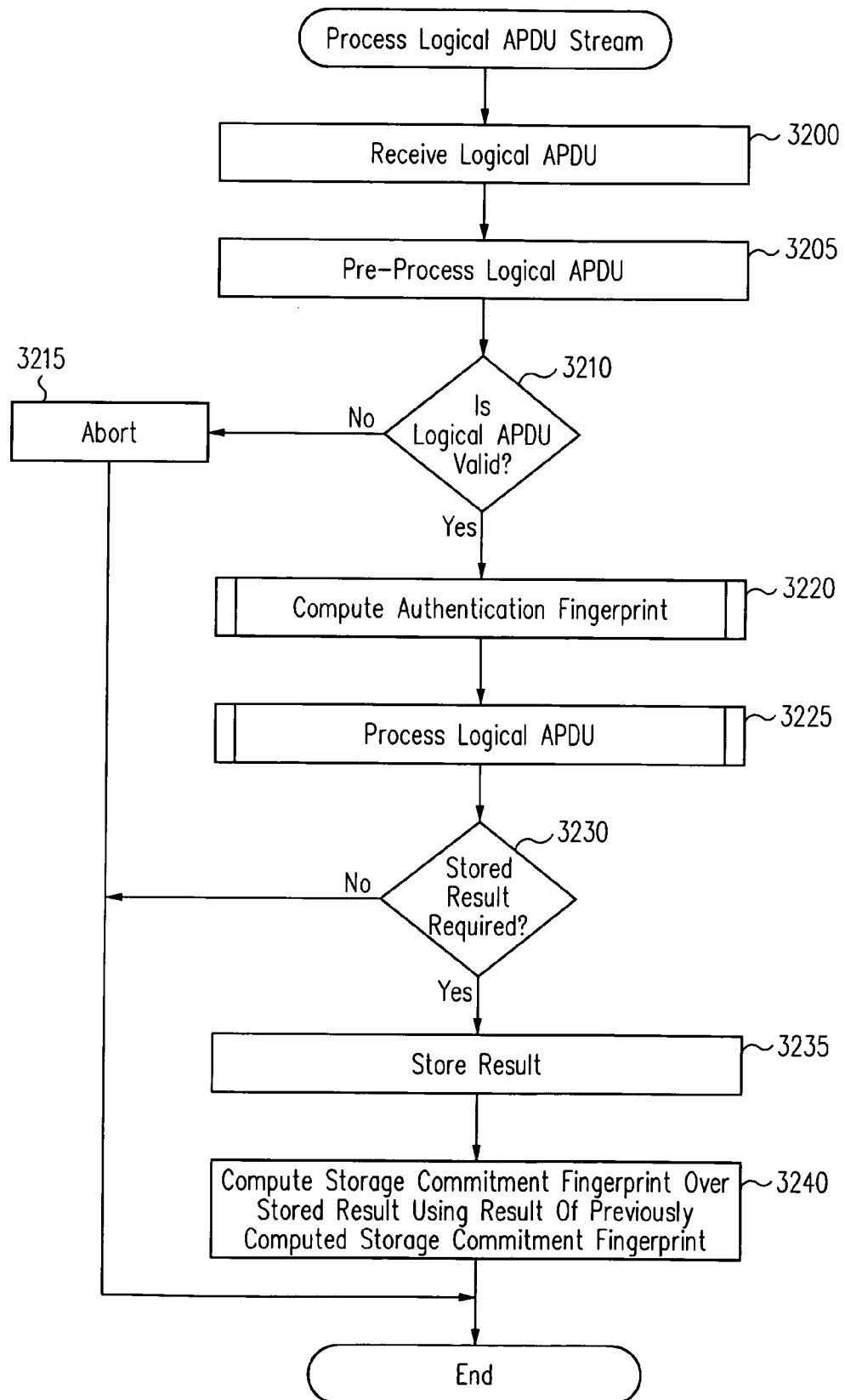
FIG. 32 is a flow diagram that illustrates a method for processing a logical APDU stream in accordance with one embodiment of the present invention.

Turning now to FIG. 32, a flow diagram that illustrates a method for processing an APDU stream in accordance with one embodiment of the present invention is presented. FIG. 32 provides more detail for reference numeral 2905 of FIG. 29 and reference numeral 3005 of FIG. 30. At 3200, a logical APDU is received. At 3205, the logical APDU is pre-processed. The pre-processing may include, by way of example, finalizing processing of the previous program unit if the current APDU is the first APDU of another program unit. The preprocessing may also include, by way of example, decryption. The result of the pre-processing is an indication of whether the logical APDU is valid. At 3210, a determination is made regarding whether the logical APDU is valid. If the logical APDU is invalid, loading is aborted at 3215. If the logical APDU is valid, an authentication fingerprint is computed at 3210 and the received logical APDU is processed at 3225 to prepare the data in the logical APDU data field for storage. The processing may include, by way of example, resolving references to other program units. At 3230, a determination is made regarding whether a stored result is required. Some APDUs may not require persistent storage. By way of example, an APDU that merely includes information about a preceding or succeeding APDU may not require persistent storage. If a stored result is required, the result is stored at 3225. At 3240, a storage commitment fingerprint is computed over the stored result using the result of the previously computed storage commitment fingerprint.

Figure 33:
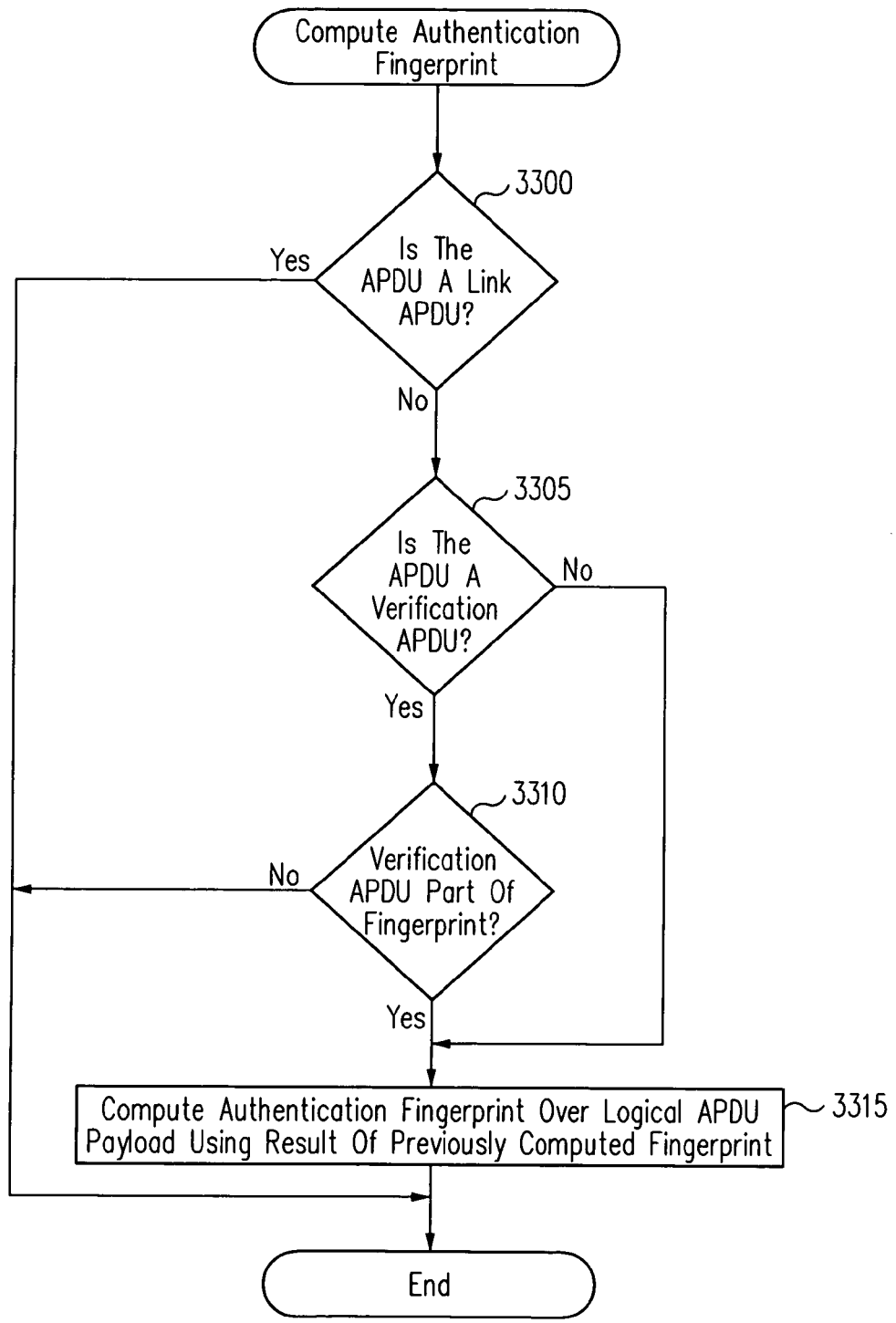
FIG. 33 is a flow diagram that illustrates a method for computing an authentication fingerprint in accordance with one embodiment of the present invention.

Turning now to FIG. 33, a flow diagram that illustrates a method for computing an authentication fingerprint in accordance with one embodiment of the present invention is presented. FIG. 33 provides more detail for reference numeral 3220 of FIG. 32. At 3300, a determination is made regarding whether the APDU is a link APDU. If the APDU is not a link APDU, at 3305 a determination is made regarding whether the APDU is a verification APDU. If the APDU is a verification APDU, at 3310 a determination is made regarding whether verification APDUs are part of the authentication fingerprint. If the APDU is not a link APDU or a verification APDU, or if the APDU is a verification APDU and verification APDUs are part of the authentication fingerprint, at 3315 the authentication fingerprint is computed over the logical APDU payload using the result of the previously computed authentication fingerprint.

As illustrated in FIG. 32, the receipt of logical APDUs (3200) is interleaved with the computation of an authentication fingerprint (3220) and computation of a storage commitment fingerprint (3240). Alternatively, the smart card may receive one or more logical APDUs and then compute an authentication fingerprint and storage commitment fingerprint over the one or more received APDUs.

Figure 34:
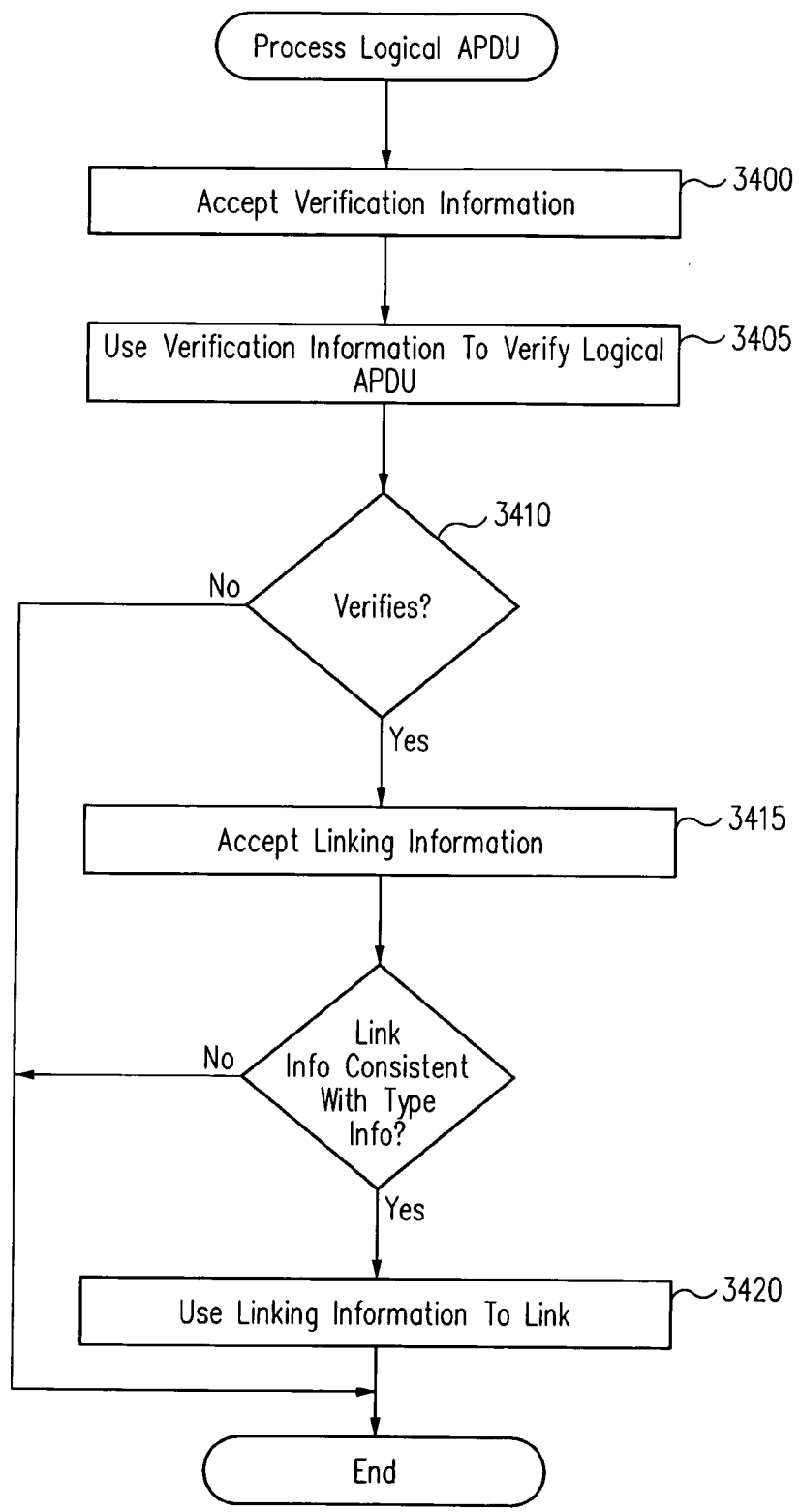
FIG. 34 is a flow diagram that illustrates a method for processing a logical APDU in accordance with one embodiment of the present invention.

Turning now to FIG. 34, a flow diagram that illustrates a method for processing a logical APDU in accordance with one embodiment of the present invention is presented. FIG. 34 provides more detail for reference numeral 3225 of FIG. 32. At 3400, verification information is accepted. At 3405, the verification information is used to verify a logical APDU. At 3410, a determination is made regarding whether the logical APDU was successfully verified. If the logical APDU was successfully verified, linking information is accepted at 3415 and at 3420, the linking information is used to link.

Virtual Method Jump Table

Figure 7:
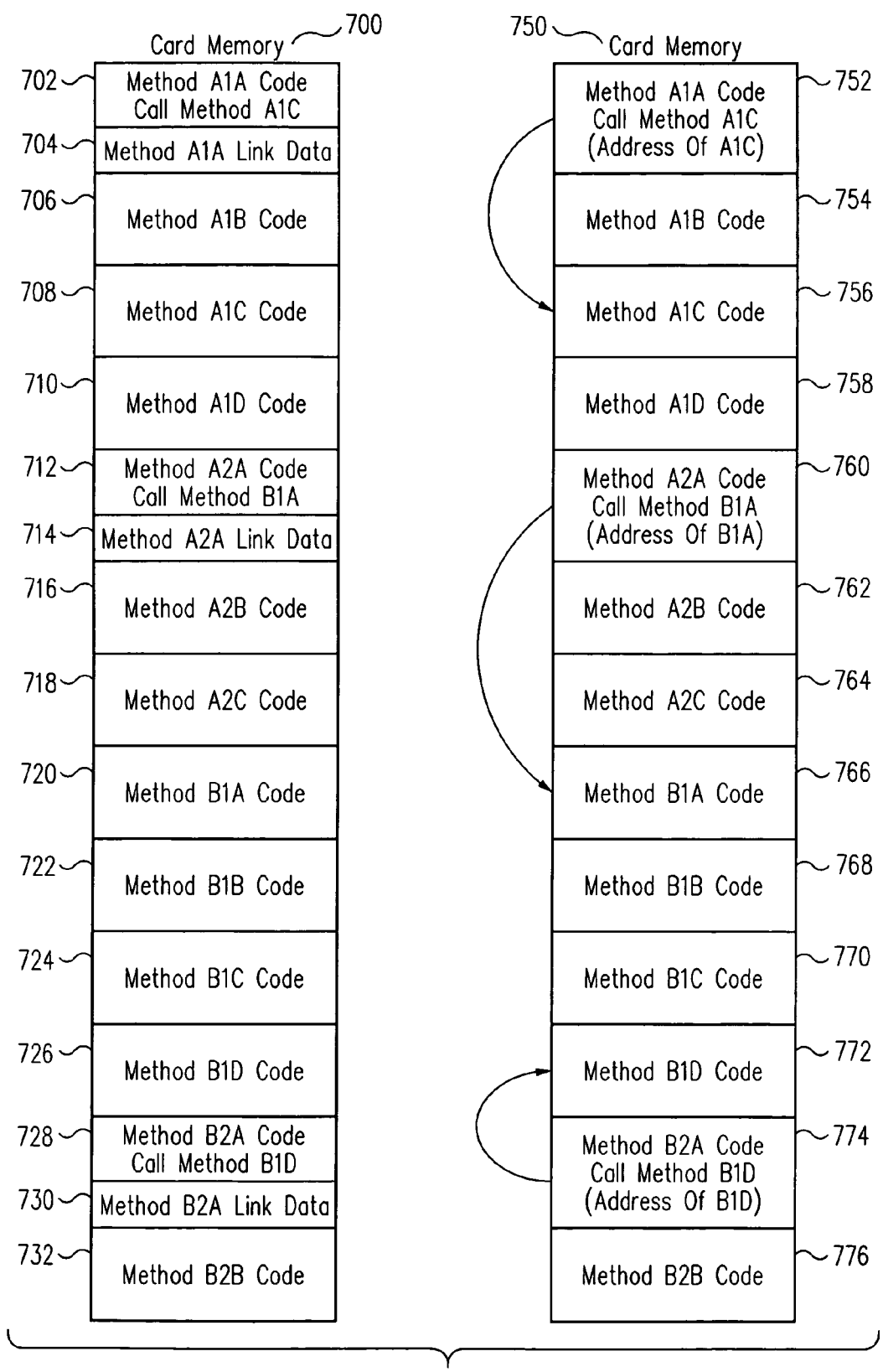
FIG. 7 is a block diagram that illustrates modifying a stored program having link data to resolve static references.

The data structures as described with respect to FIG. 7 illustrate linking to static methods, or methods having a single call address. Object-oriented languages such as the Java™ language support virtual methods, or methods that may have multiple copies. In the Java™ language, a virtual method may be declared in a class and a subclass of the class may override or replace the virtual method with its own instance of the virtual method. An instance of the subclass will reference the version of the method overridden in the subclass, while an instance of the class will reference the virtual method declared in the class.

According to one embodiment of the present invention, the capability to link virtual methods is provided by creating a jump table for each virtual method that is overridden at least once. The jump table includes the address of each instance of a virtual method. Object constructors are rewritten to accept a "type" parameter, constructor calls are rewritten to provide type information, and virtual method program calls are rewritten to include an indication of the current type of the called object. The indication of the current type is used as an index into the corresponding virtual method jump table, where the address of the appropriate virtual method code is obtained. This is explained in more detail below with reference to FIGS. 35–37.

Figure 35:
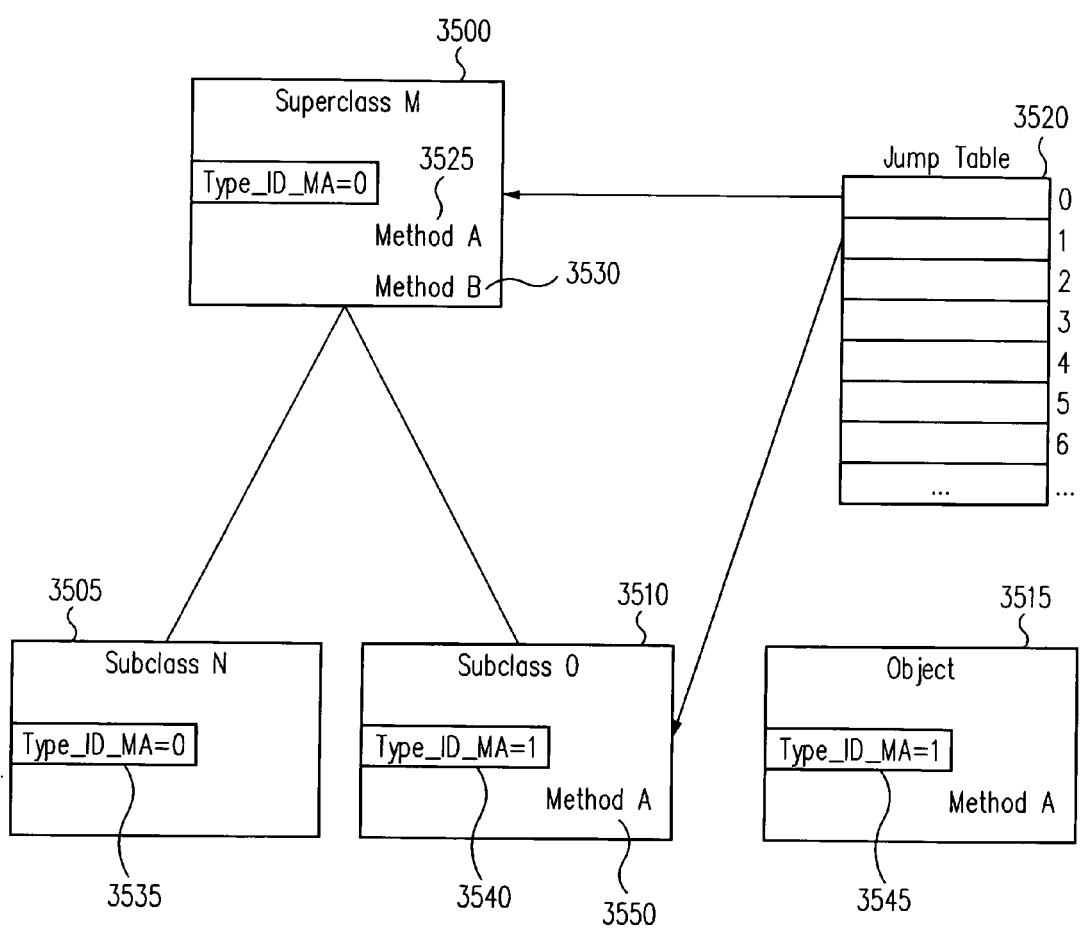
FIG. 35 is a block diagram that illustrates data structures for linking a program including virtual methods in accordance with one embodiment of the present invention.

Turning now to FIG. 35, data structures for linking a program including virtual methods in accordance with one embodiment of the present invention is presented. As shown in FIG. 35, subclass N (3505) extends class M (3500) and does not override method A (3525) or B (3530). Subclass O (3510) extends class M (3500) and overrides method A (3525). Any calls to method O.A (3550) actually calls method O.A (3550), not method M.A (3525). Jump table 3320 is indexed by a value of a type identifier in the class instance data. Each entry of jump table 3520 includes the address of the virtual method instance corresponding to the index, for each virtual method in a class having at least one instance. Every call to method M.A (3525) that has been overridden includes a type identifier. The type identifier is used as an index in the jump table 3320 to obtain the address of the code corresponding to the virtual method instance. The calls in subclass N (3505) and subclass O (3510) are rewritten to call with the type identifier. The calls may be rewritten by a host computer or a loading terminal before loading the program on a smart card, such as when an augmented CAP file is produced. Alternatively, the calls may be rewritten by a loading terminal. The target smart card may also rewrite the calls after the program data has been loaded. The type identifier is obtained from a "current type of the object" field 3345 in the called object 3515.

Searching for the appropriate virtual method instance is thus made more deterministic by giving each subtype and each method a type identifier. Using the example illustrated in FIG. 35, when class "M" (3500) or class "N" (3505) objects are instantiated, both objects are instantiated with the type identifier having a value of zero. When the "O" (3510) object is instantiated, the type identifier associated with the instance is the value one. When object "O" (3510) calls the virtual method, the type identifier is used as an index into the jump table 3520 to determine which virtual method instance to call, thus obviating the need to perform an exhaustive search for the appropriate virtual method instance.

Figure 36:
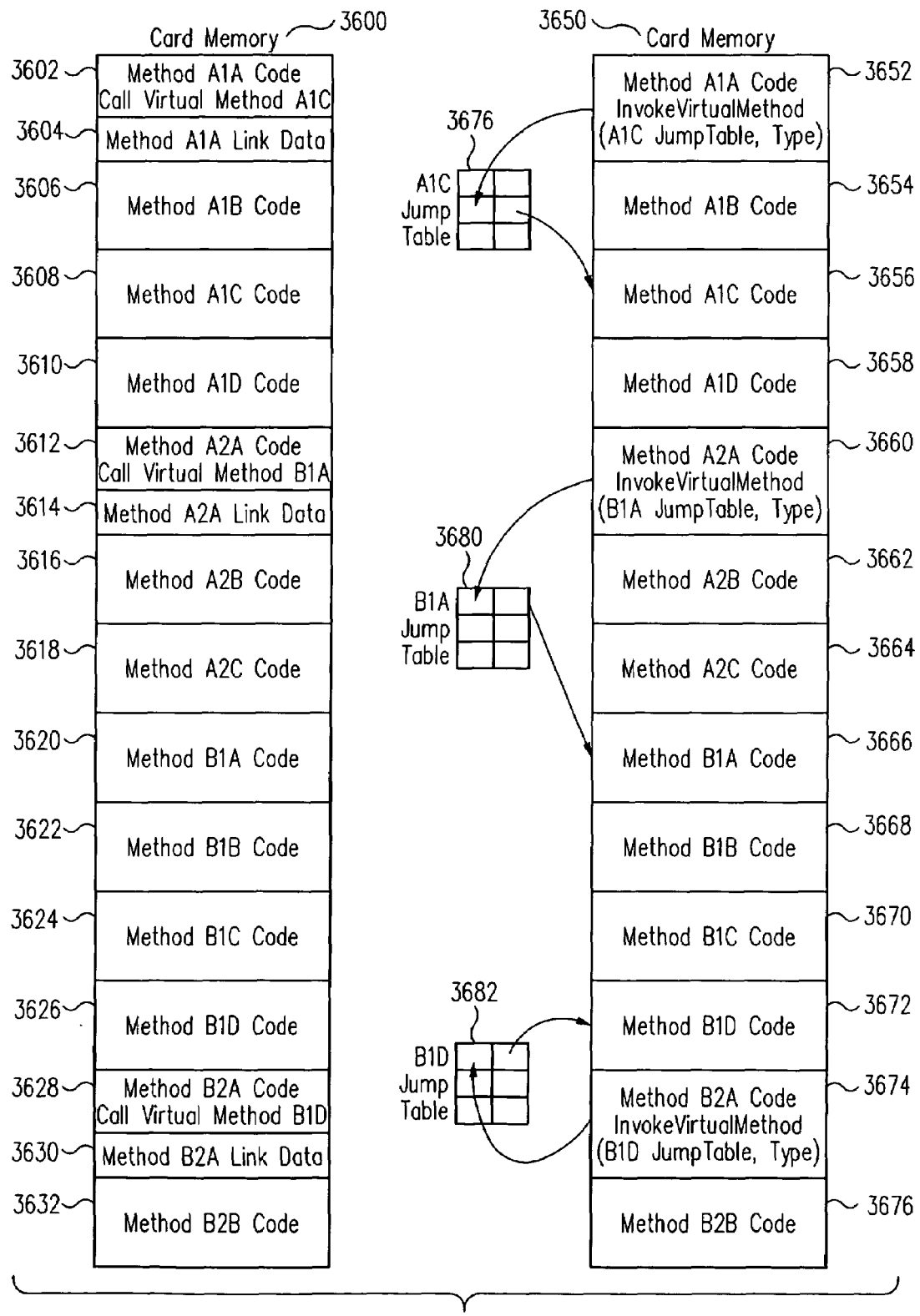
FIG. 36 is a block diagram that illustrates modifying a stored program having link data to resolve dynamic references in accordance with one embodiment of the present invention.

Turning now to FIG. 36, a block diagram that illustrates modifying a stored program having link data to resolve dynamic references in accordance with one embodiment of the present invention is presented. FIG. 36 is similar to FIG. 7, except that FIG. 36 includes a jump table (3676, 3680, 3682) for each virtual method having at least one virtual method instance. Referring to card memory 3600, code for methods A1A (3602), A2A (3612) and B2A (3628) include calls to virtual methods AIC (3608), B1A (3620) and B1D (3626), respectively. Referring to modified card memory 3650, code for methods A1A (3652), A2A (3660) and B2A (3674) has been modified to refer to the jump table associated with the called virtual method (3676, 3680, 3682) and a type indicator of the called object.

Figure 37:
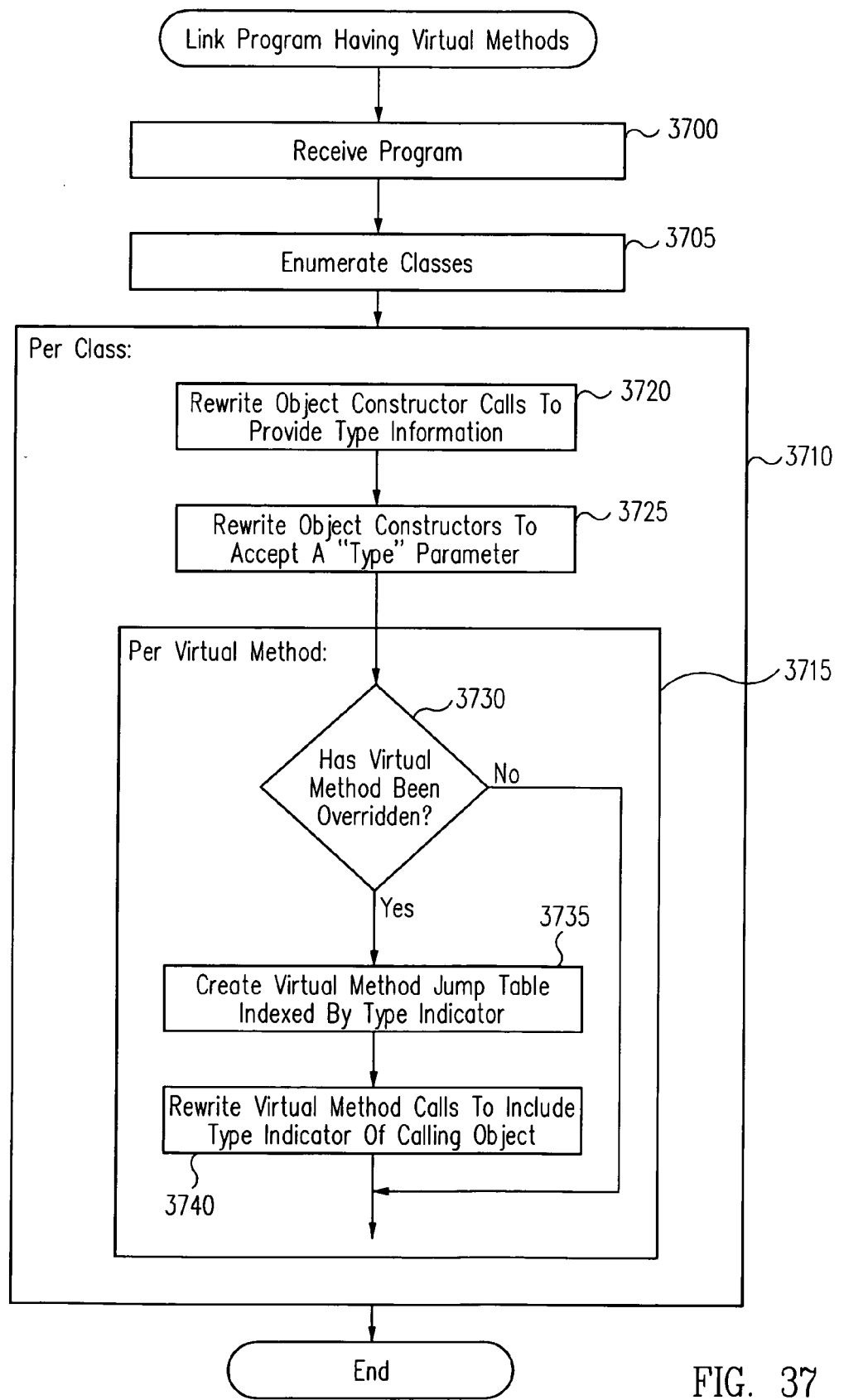
FIG. 37 is a flow diagram that illustrates modifying a stored program having link data to resolve dynamic references in accordance with one embodiment of the present invention.

Turning now to FIG. 37, a flow diagram that illustrates modifying a stored program having link data to resolve dynamic references in accordance with one embodiment of the present invention is presented. At 3700, a program is received. At 3705, classes in the program are enumerated. Box 3710 is performed per class. At 3720, object constructor calls are rewritten to provide type information. At 3725, object constructors are rewritten to accept a "type" parameter. Box 3715 is performed per virtual method in a class. At 3720, a determination is made regarding whether the virtual method has been overridden with an instance of the virtual method. If the virtual method has been overridden, at 3725 a virtual method jump table for the virtual method having at least one virtual method instance is created. At 3730, program calls to the virtual method are rewritten to refer to the jump table associated with the called virtual method and a type indicator of the called object. If the virtual method has not been overridden, the virtual method may be linked in the same manner as a static method.

According to another embodiment of the present invention, a call to a virtual method that has been overridden at least once is replaced with a call instruction that uses the type indicator of the called object as an index into a table positioned in the instruction stream inline with the call instruction.

Program Unit Storage Commitment Fingerprint

According to embodiments of the present invention, a program unit storage commitment fingerprint is associated with a program unit. The program unit storage commitment fingerprint may be used to indicate commitment of the program unit. In other words, the program unit storage commitment fingerprint may be used to indicate the program unit has been finally loaded onto the target smart card. The program unit storage commitment fingerprint may also be used to indicate whether the program unit data has been tampered with or is otherwise unfit for execution. The program unit storage commitment fingerprint is computed over the program unit data and associated with the program unit at the time the program unit is finally stored in a persistent mutable memory and ready for use. The program unit storage commitment fingerprint may be stored in an area of memory contiguous with the associated program data. Alternatively, a reference to the program unit commitment fingerprint may be stored with the associated program data. As a further alternative, program units may be stored in a tabular form, with each entry including a storage unit and the corresponding fingerprint. Those of ordinary skill in the art will recognize other techniques for associating program units with commitment fingerprints are possible.

Upon use of the program unit, the program unit storage commitment fingerprint initially associated with the program unit is matched against the result of computing a storage commitment fingerprint over the program unit data. A mismatch indicates the program unit data has been tampered with or is otherwise unfit for execution.

A program unit may comprise any logical program structure. Using Java™ technology as an example, a program unit may comprise a package, a class, a method or any combination thereof. Additionally, a program unit may be stored in noncontiguous memory.

According to one embodiment of the present invention, "use" of a program unit comprises executing the program unit. According to another embodiment of the present invention, "use" of a program unit comprises creating an instantiation of another program unit based at least in part on the program unit. Using Java™ technology as an example, "use" of a program unit may comprise object instantiation. According to another embodiment of the present invention, "use" of a program unit comprises reading the program unit data.

Hierarchical Program Unit Storage Commitment Fingerprint

According to embodiments of the present invention, a storage commitment fingerprint of a higher level program unit may be based at least in part on at least one storage commitment fingerprint of a lower level program unit. This is illustrated below with respect to FIG. 38.

Figure 38:
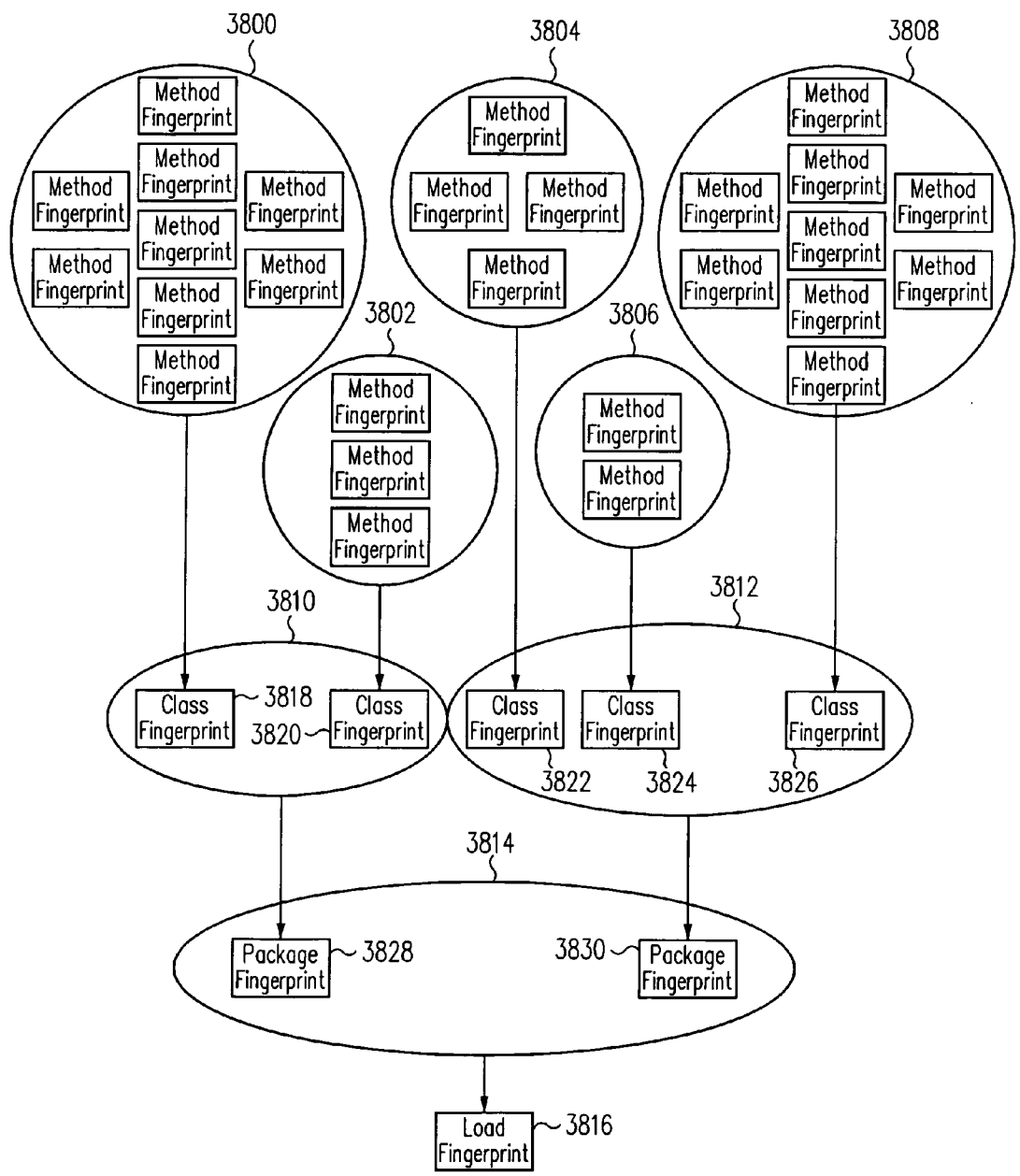
FIG. 38 is a block diagram that illustrates a hierarchy of program unit commitment fingerprints in accordance with one embodiment of the present invention.

Turning now to FIG. 38, a block diagram that illustrates a hierarchy of program unit storage commitment fingerprints in accordance with one embodiment of the present invention is presented. Reference numerals 3800–3808 represent classes, reference numerals 3810–3812 represent packages and reference numeral 3814 represents a load comprising one or more packages. Class storage commitment fingerprints 3818–3826 are formed by computing a fingerprint over class-level data in classes 3800–3808, respectively, and the collection of method storage commitment fingerprints in classes 3800–3808, respectively. Package storage commitment fingerprints 3828–3830,are formed by computing a fingerprint over package-level data in packages 3810–3812, respectively, and the collection of class storage commitment fingerprints in packages 3810–3812, respectively. Load storage commitment fingerprint 3816 is formed by computing a fingerprint over the collection of package storage commitment fingerprints in load 3814.

Alternatively, one or more storage commitment fingerprints of a higher level program unit may be based on the data of a lower level program unit. Using Java™ technology as an example, a class storage commitment fingerprint may be based over class-level data and method-level data for methods belonging to the class.

Figure 39:
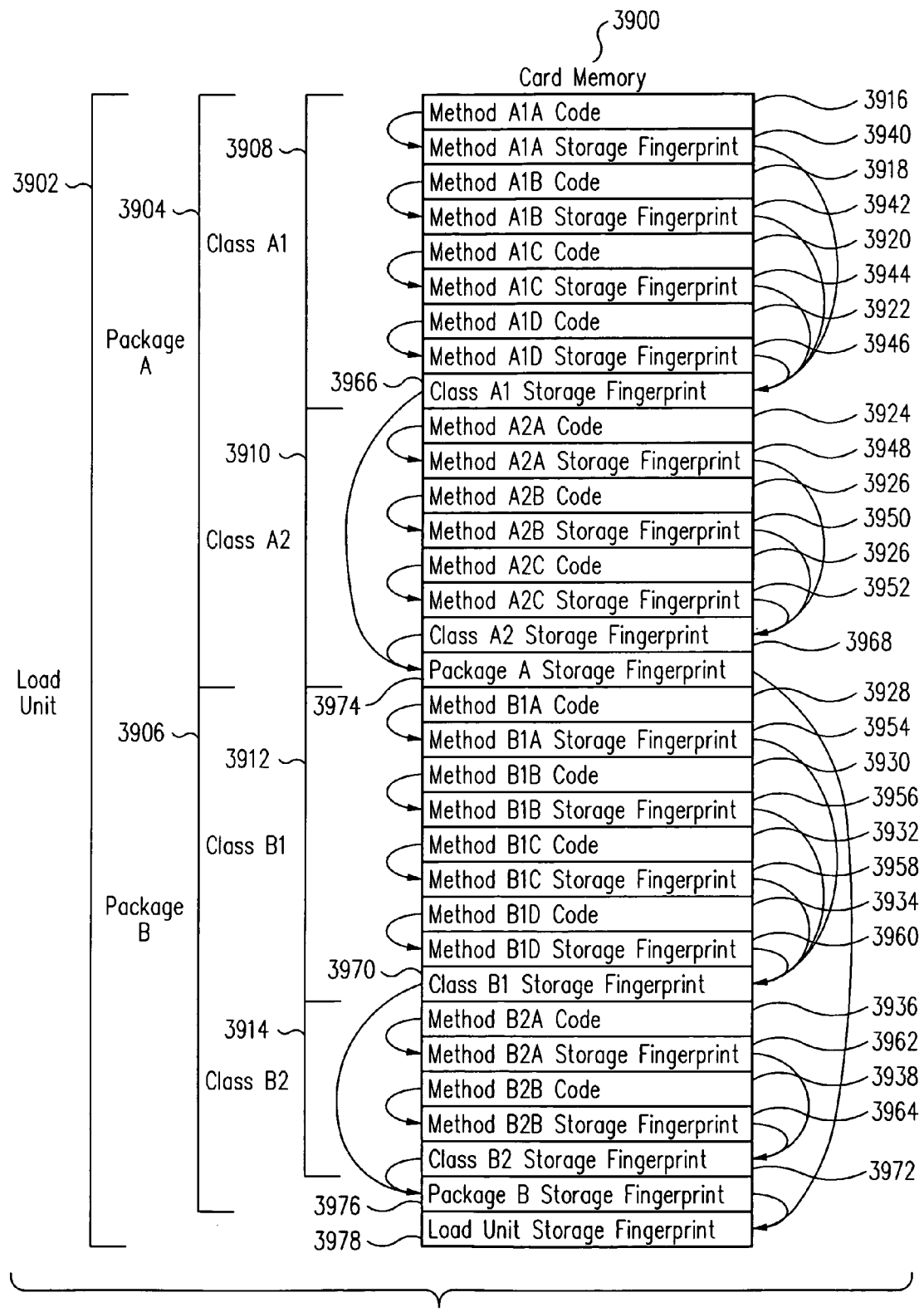
FIG. 39 is a block diagram that illustrates a data structure including program code and program unit commitment fingerprints in accordance with one embodiment of the present invention.

Turning now to FIG. 39, a block diagram that illustrates a data structure including program code and program unit storage commitment fingerprints in accordance with one embodiment of the present invention is presented. Card memory 3900 comprises a storage area for a load unit 3902 that comprises package "A" 3904 and package "B" 3906. Packages 3904 and 3906 comprise classes 3908–3910 and 3912–3914, respectively. Classes 3908, 3910, 3912 and 3914 comprise methods 3916–3922, 3924–3926, 3928–3934 and 3936–3938, respectively. Method storage commitment fingerprints 3940–3964 are computed over method code 3916–3938, respectively. Class storage commitment fingerprints 3966, 3968, 3970 and 3972 are computed over method storage commitment fingerprints 3940–3946, 3948–3950, 3954–3960 and 3962–3964, respectively. Class storage commitment fingerprints 3966, 3968, 3970 and 3972 may also be computed over any field definitions and initialized static data that is part of the respective class. Package storage commitment fingerprints 3974 and 3976 are computed over class storage commitment fingerprints 3966–3968 and 3970–3972, respectively. Load unit storage commitment fingerprint 3978 is computed over package storage commitment fingerprints 3974 and 3976.

Figure 40:
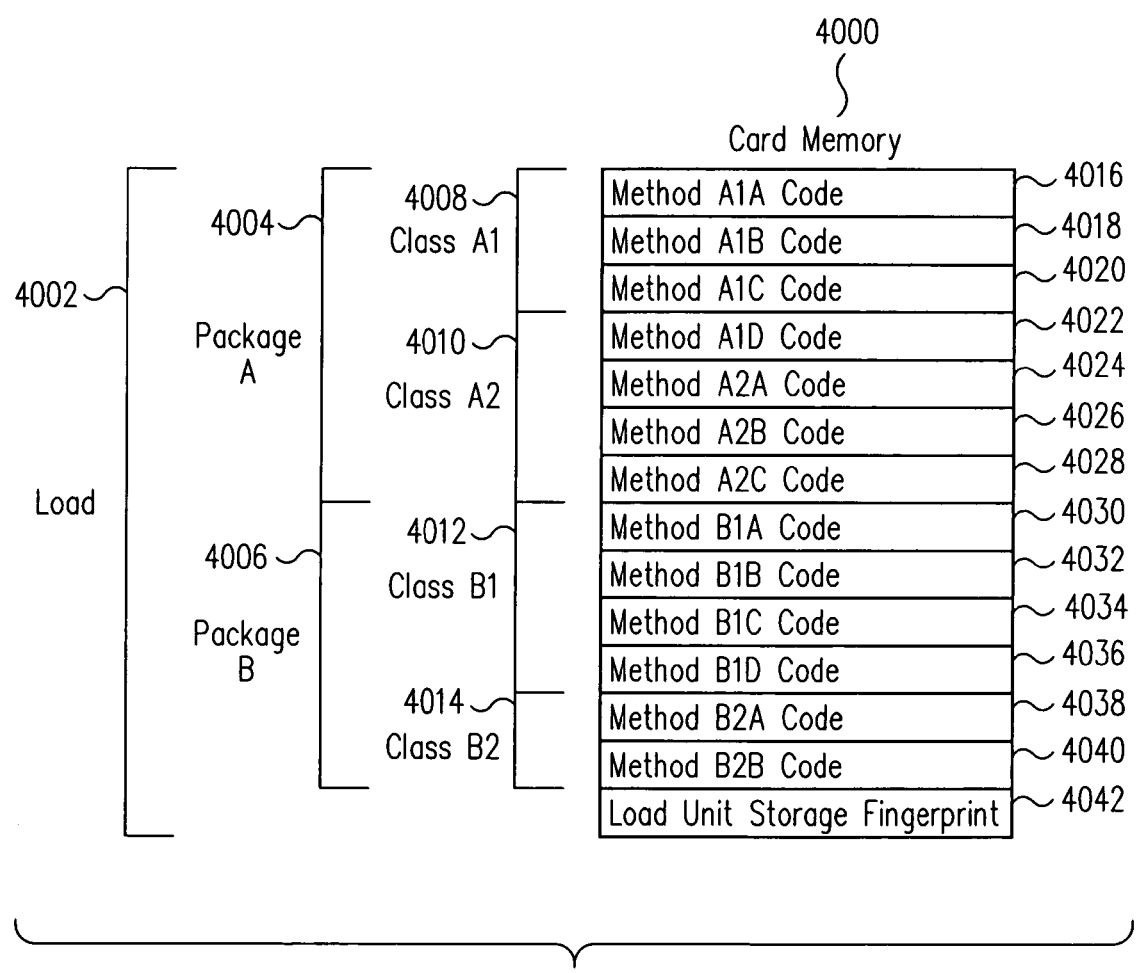
FIG. 40 is a block diagram that illustrates a data structure including program code and a load storage commitment fingerprint in accordance with one embodiment of the present invention.

Turning now to FIG. 40, a block diagram that illustrates a data structure including program code and a load storage commitment fingerprint in accordance with one embodiment of the present invention is presented. FIG. 40 is similar to FIG. 39, except FIG. 40 does not include class storage commitment fingerprints or package storage commitment fingerprints. Load unit storage commitment fingerprint 4042 is computed over stored method code 4016–3840 in packages "A" 4004 and package "B" 4006.

Runtime Integrity Checks

Figure 41:
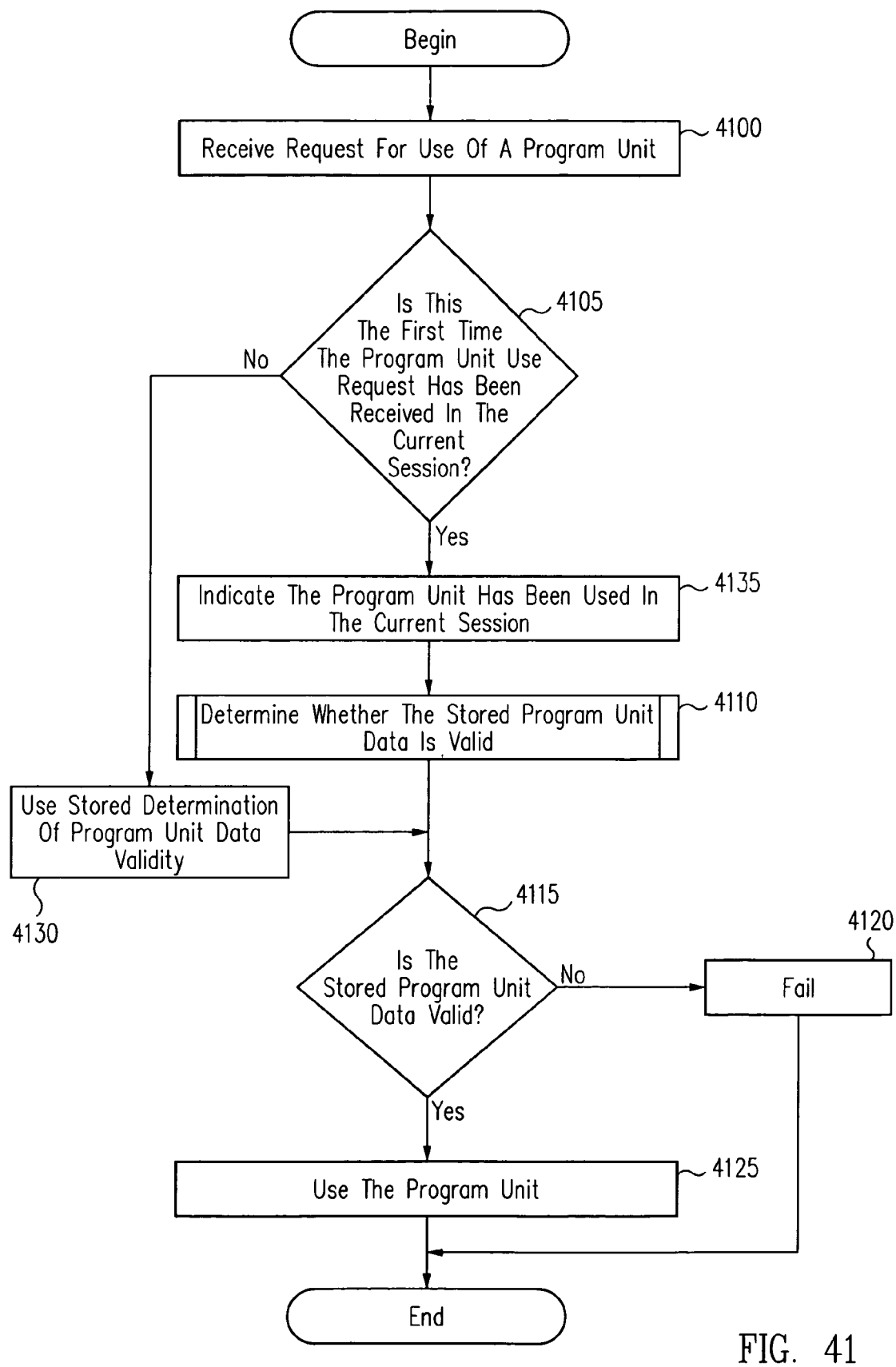
FIG. 41 is a flow diagram that illustrates a method for using a program unit commitment fingerprint to determine whether a program unit may be used, in accordance with one embodiment of the present invention.
Figure 42:
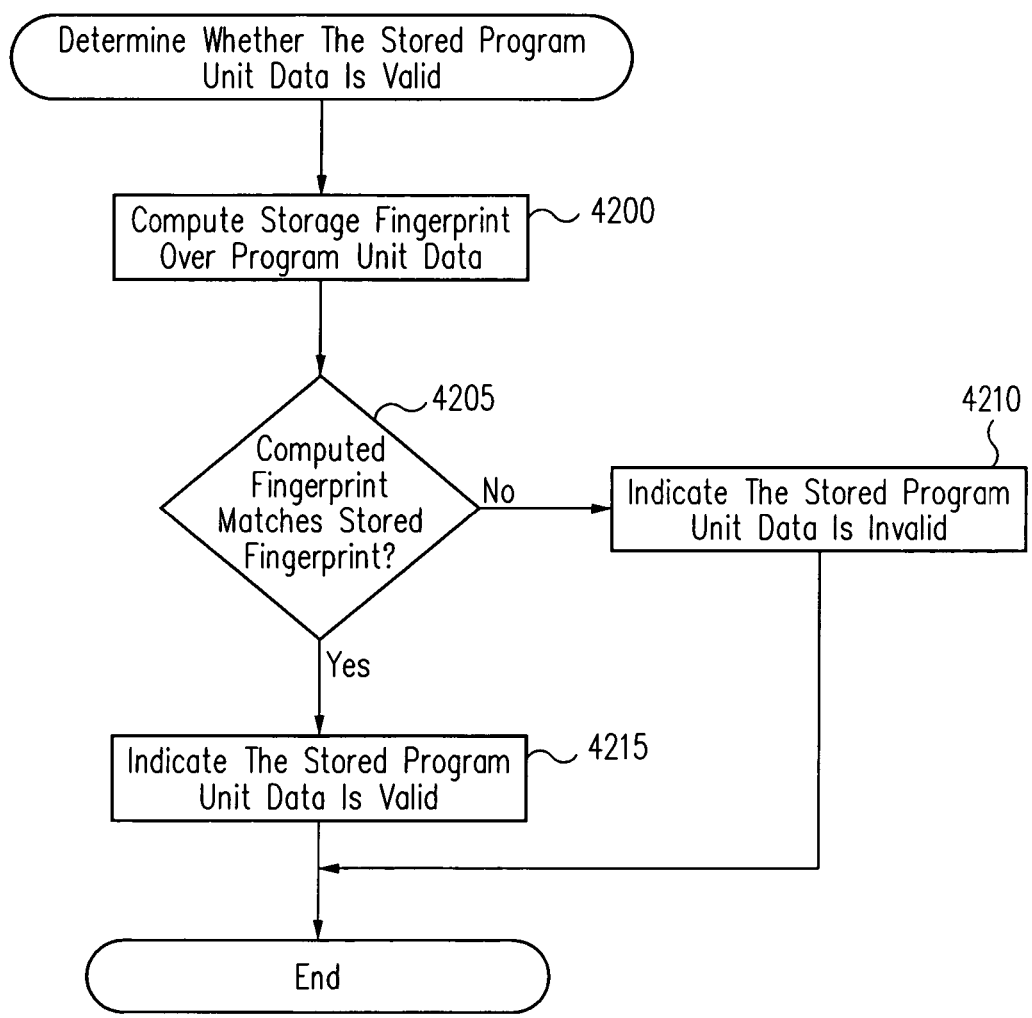
FIG. 42 is a flow diagram that illustrates a method for determining whether stored program unit data is valid in accordance with one embodiment of the present invention.
Figure 43:
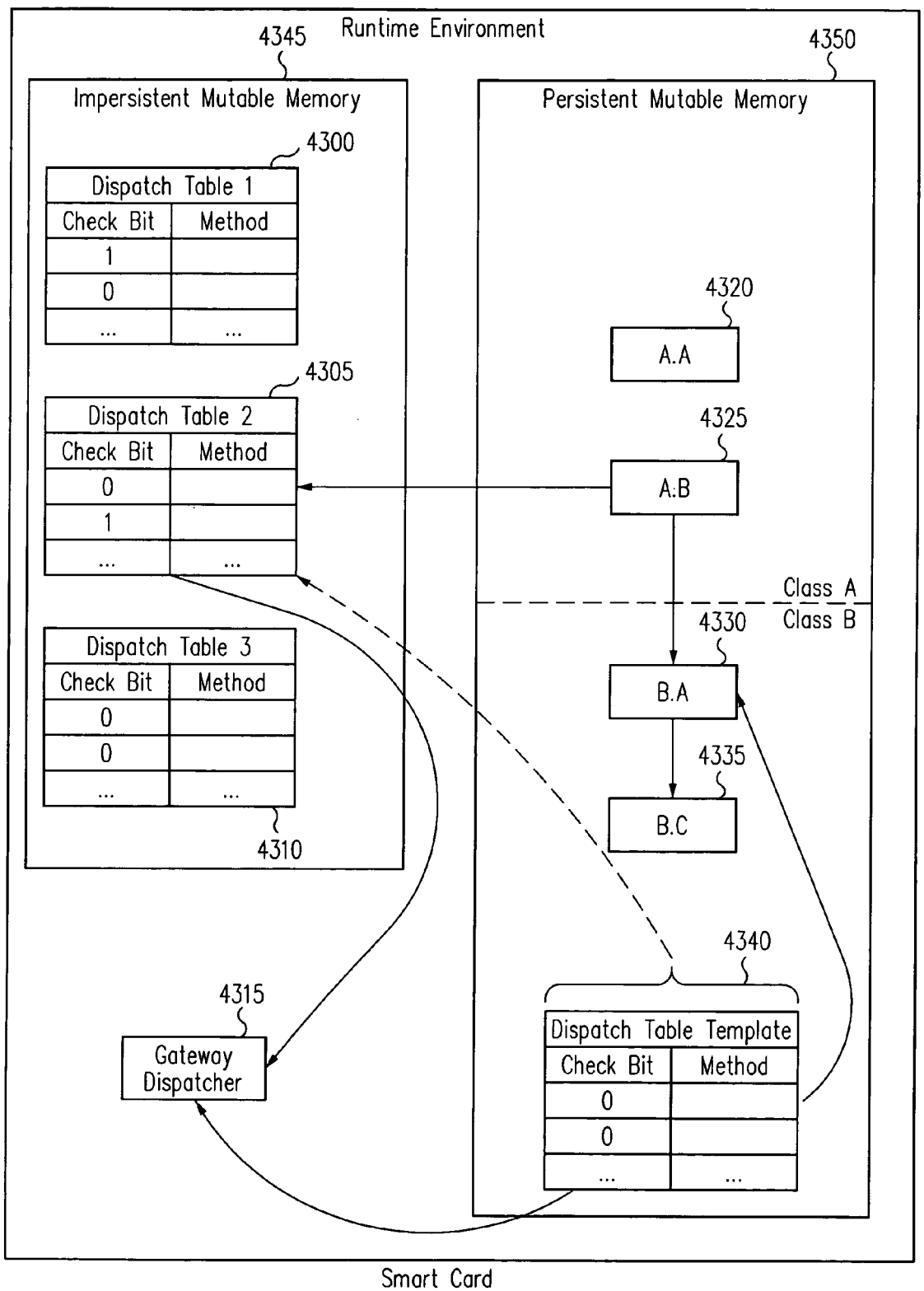
FIG. 43 is a block diagram that illustrates a smart card configured to ensure a called method has been verified prior to execution in accordance with one embodiment of the present invention.
Figure 44:
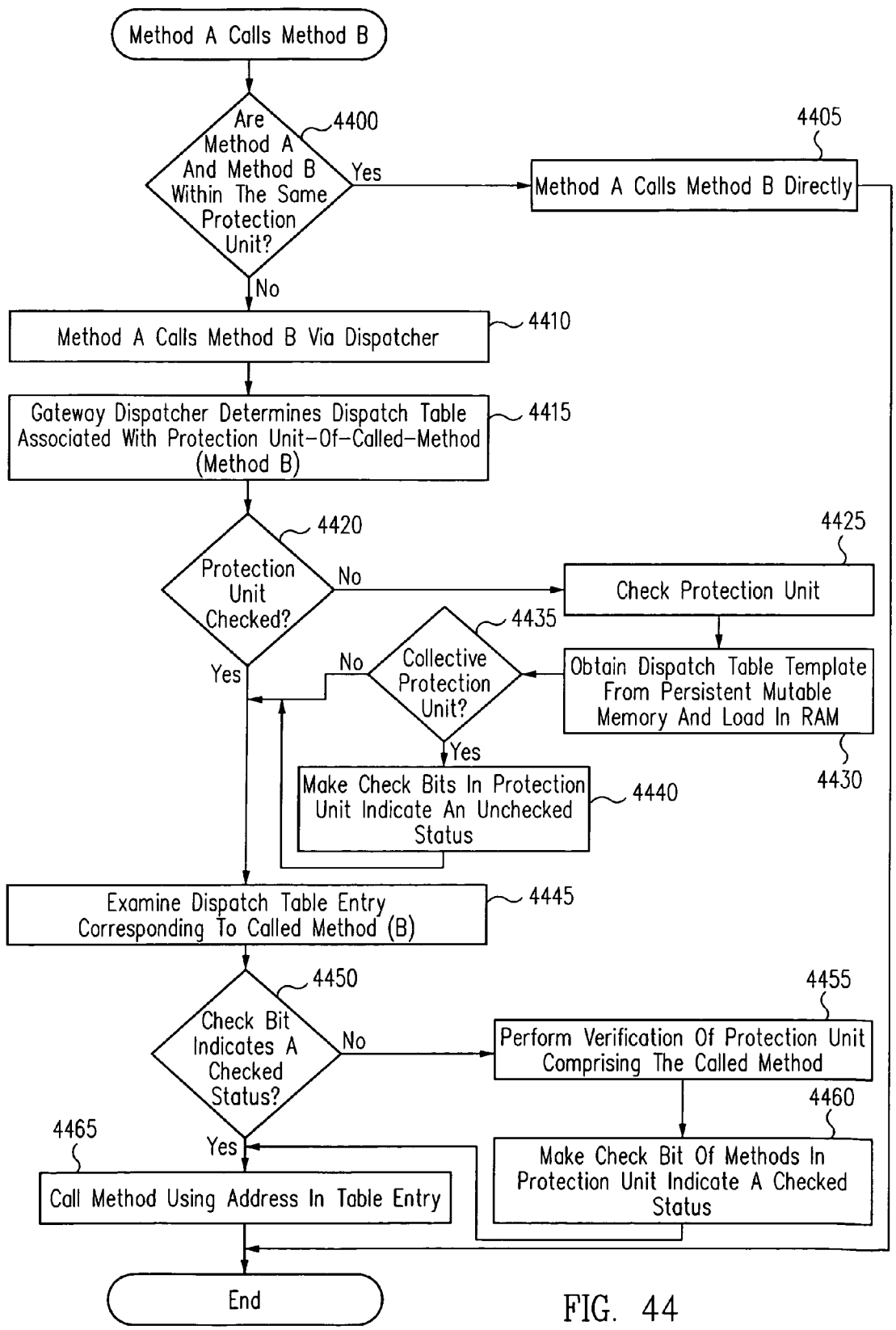
FIG. 44 is a flow diagram that illustrates a method for ensuring a called method has been verified prior to execution in accordance with one embodiment of the present invention.

According to embodiments of the present invention, a program unit commitment fingerprint is used to check the integrity of a program unit at runtime. FIGS. 41 and 42 illustrate the general case for this runtime integrity checking. FIGS. 43 and 44 illustrate embodiments of the present invention that use a dispatching mechanism to implement runtime integrity checking.

FIG. 41 is a flow diagram that illustrates a method for using a program unit commitment fingerprint to determine whether a program unit may be used, in accordance with one embodiment of the present invention. At 4100, a request for use of a program unit is received. According to one embodiment of the present invention, the "use" comprises creating an instantiation based at least in part on the program unit. According to another embodiment of the present invention, the "use" comprises executing the program unit code. According to another embodiment of the present invention, the "use" comprises reading the program unit data.

According to embodiments of the present invention, a program unit may be a program, a package, a class, a method an instance variable or a class variable. However, the illustration of a program unit with respect to Java™ technology is not intended to be limiting in any way. Those of ordinary skill in the art will recognize that a program may be partitioned in many ways.

Still referring to FIG. 41, at 4105 a determination is made regarding whether it is the first time the program unit use request has been received in the current session. If it is not the first time the program unit use request has been received in the current session, a stored determination of program unit data validity is used at 4130. If this is the first time the program unit use request has been received in the current session, at 4135 an indication that the program unit has been used in the current session is made. At 4110, a determination is made regarding whether the stored program unit data is valid. The result of this determination is checked at 4115. If the stored program unit data is not valid, a failure indication is made at 4120. If the stored program unit data is valid, the program unit is used at 4125.

According to another embodiment of the present invention, the validity of a stored program unit is determined upon receiving a request for use of the program unit, without regard to whether a previous use request for the same program unit was received in the current session.

According to one embodiment of the present invention, a fingerprint device is configured to compute authentication fingerprints, program storage commitment fingerprints, or both. According to another embodiment of the present invention, a fingerprint device comprises a computation unit that computes the storage commitment fingerprint. The computation unit is linked to memory dedicated to storing committed data. The computation unit may be integrated with a memory device comprising the memory. Alternatively, the computation unit may be a standalone device in communication with a memory device comprising the memory. According to one embodiment of the present invention, the computation unit is configured to automatically and incrementally compute the fingerprint for the memory upon detecting a write operation to the memory.

According to another embodiment of the present invention, the computation unit is configured to automatically and incrementally compute the fingerprint for the memory before use of data in the memory, such as upon detecting a read operation for the memory. By way of example, upon receiving a read request for data stored at memory addresses specified by a memory range, the computation unit computes a fingerprint over the data stored at the memory addresses specified by the memory range.

Turning now to FIG. 42, a flow diagram that illustrates a method for determining whether stored program unit data is valid in accordance with one embodiment of the present invention is presented. FIG. 42 provides more detail for reference numeral 4110 of FIG. 41. At 4200, a fingerprint is computed over the program unit data. At 4205, a determination is made regarding whether the computed fingerprint matches a stored fingerprint. If the computed fingerprint does not match the stored fingerprint, at 4210 an indication that the stored program unit data is invalid is made. If the computed fingerprint matches the stored fingerprint, at 4215 an indication that the stored program unit data is valid is made.

Dispatch Table

In the context of the present invention, the term "gateway dispatcher" is defined as a program unit configured to determine whether the executable code of a called method is valid before calling the method. A gateway dispatcher may be part of a virtual machine or a lower level routine.

According to embodiments of the present invention, links to called routines may be hard-coded. According to alternative embodiments of the present invention, a dispatch table associated with a protection unit includes an entry for methods protected by the protection unit. A caller of a method in a protection unit calls the method by referring to the protection unit and an index in the table. The reference determines whether the executable code of a called method is valid (has been verified) before calling the method. A gateway dispatcher verifies the protection unit if the protection unit dispatch table has been loaded but the protection unit has not been verified. The gateway dispatcher loads the dispatch table and verifies the protection unit if the protection unit dispatch table has not been loaded. This is explained in more detail below with reference to FIGS. 43 and 44.

Turning now to FIG. 43, a block diagram that illustrates a smart card configured to ensure a called method has been verified prior to execution in accordance with one embodiment of the present invention is presented. FIG. 43 illustrates a data structure for implementing the "use program unit" process discussed previously with respect to reference numeral 4125 of FIG. 41. According to one embodiment of the present invention, entry points to a class or package are precomputed at load time. The entry points trigger a test to determine whether the method being called has been verified. Calls are linked to those entry points by rewriting code containing calls to the methods.

As shown in FIG. 43, there is a dispatch table entry for every callable routine in a protection unit. Each entry includes a check bit and a routine address. Once initialized, methods or routines within a protection unit can call each other. Methods that call outside a protection unit do so via a dispatch table (4300, 4305, 4310). If the check bit of the dispatch table entry corresponding to the called routine indicates a checked status, the routine address of the dispatch table entry is used to call the routine. If check bit indicates an unchecked status, verification of the code is performed. Storing the dispatch tables (4300, 4305, 4310) in an impersistent mutable memory such as a RAM 4345 and associating the value zero with an unchecked status guarantees the check bit indicates an unchecked status upon initialization. In other words, verification of program code is guaranteed to be session-based because the contents of RAM 4345 are destroyed after each session and the next session will start with the check bit indicating an unchecked status.

Having one check bit per entry allows the tables to be contiguous; referencing an entry requires just the base address of the table and an offset. Additionally, each entry includes a check bit because the corresponding routine may be the first routine within a protection unit to be called.

According to one embodiment of the present invention, the check bit comprises the most significant bit and the method address comprises the least significant bits of a dispatch table entry. If the gateway dispatcher reads check bit value that indicates an unchecked status, the least-significant bits of the dispatch table entry are used to call the routine. This mechanism obviates the need for a second memory access to obtain the method address.

According to another embodiment of the present invention, each table has a per-table check bit that indicates whether the table has been validly initialized. Each table entry comprises a method address.

According to one embodiment of the present invention, protection units are per package. According to another embodiment of the present invention, protection units are per class. According to another embodiment of the present invention, protection units are per method.

According to another embodiment of the present invention, the program units protected by a protection unit corresponds with the program units included in a storage commitment fingerprint. By way of example, if storage commitment fingerprints are computed over methods in a class, protection units are per class. As a further example, if storage commitment fingerprints are computed over classes in a package, protection units are per package.

The address of the next RAM-based dispatch table, as well as the current number and size of dispatch tables for other load units are examples of the type of information the card can provide for the link process mentioned above with respect to reference numeral 2110 of FIG. 21.

According to embodiments of the present invention, program code is rewritten to replace calls to routines outside a protection unit with calls to a gateway dispatcher. According to one embodiment of the present invention, the code is rewritten at conversion time, when a CAP file is created. According to another embodiment of the present invention, the code is rewritten at CAP file disassembly time. According to another embodiment of the present invention, the code is rewritten at load time, or at link time in the target smart card.

When a call is made to a routine outside a protection unit, it must be determined whether the called region is checked as well. The gateway dispatcher inspects the table that belongs to the called method to determine whether it may jump directly to the routine, or whether the called routine must be verified first. In the example illustrated in FIG. 43, a check bit value of zero is used to indicate an unchecked status. In this case, a value of zero may indicate the entry is corrupted. It may also indicate the entry is valid but that the code has not been verified. Thus, if the check bit has a value that indicates an unchecked status, the dispatch table template is obtained from a persistent mutable memory such as EEPROM, and the called routine is verified. This is shown in more detail below with reference to FIG. 44.

Turning now to FIG. 44, a flow diagram that illustrates a method for ensuring a called method has been verified prior to execution in accordance with one embodiment of the present invention is presented. FIG. 44 presumes that program code has been rewritten such that calls between protection units have been replaced with calls to a gateway dispatcher. FIG. 44 also presumes that a dispatch table template that points to the actual method for each of the entries is placed in EEPROM during the linking process. FIG. 44 also presumes that upon reset or upon the first use of any entry in a dispatch table, the dispatch table template is copied to a preallocated space in an impersistent mutable memory such as RAM.

In the context of the present invention, a protection unit is collective if the unit of use is not the same as the unit of protection. By way of example, if the unit of use is a method and the unit of protection is a method, the protection unit is not collective. But if the unit of use is a method and the unit of protection is a class, the protection unit is collective.

Still referring to FIG. 44, at 4400 a determination is made regarding whether a calling method and a called method are within the same protection unit. This determination is made as part of the code rewriting process. If the two methods are within the same protection unit, the calling method calls the called method directly at 4405. If the two methods are not within the same protection unit, the code rewriting process replaces the call to the called routine (B) with a call to the gateway dispatcher. If the code has been rewritten in this way, at 4410 the calling method calls a gateway dispatcher. At 4415, the gateway dispatcher determines the dispatch table associated with the protection unit of the called method. At 4420, a determination is made regarding whether protection unit has been checked. If the protection unit has not been checked, it is checked at 4425. At 4430, the dispatch table corresponding to the protection unit is obtained from a persistent mutable memory such as EEPROM and loaded into an impersistent mutable memory such as RAM. At 4435, a determination is made regarding whether the protection unit is collective. If the protection unit is collective, at 4440 the check bits in the protection unit are made to indicate an unchecked status. Once the protection unit has been checked, at 4445 the dispatch table entry corresponding to the called method is examined. At 4450, a determination is made regarding whether the check bit of the table entry has a value that indicates a checked status. If the check bit has a value that indicates a checked status, at 4465 the called method is called using the address in the table entry. If the check bit value indicates an unchecked status, verification of the protection unit comprising the method is performed at 4455 and the check bit of methods in the protection unit are made to indicate a checked status at 4460. At 4465, the called method is called using the address in the table entry.

The illustration of embodiments of the present invention with respect to Java Card™ technology is for purposes of illustration and is not intended to be limiting in any way. Any program file comprising program data may be used in place of a CAP file comprising structured program data. By way of example, an archive file such as a Java™ archive (JAR) file may be used. Additionally, any communication protocol that defines a protocol data unit may be used in place of the APDU protocol. Additionally, program data for programs written in languages other than the Java™ language may be used. Moreover, the target device need not be a smart card. The target device may be any device capable of receiving protocol data units and executing a program based at least in part on the received data.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for program verification, the method comprising:
   receiving a program unit;
   determining data types used by said program unit;
   creating a first mapping for said data types, said first mapping comprises a bitmap, each bit in said bitmap representing a data type used by said program unit; and
   using said first mapping to represent type information in verification information for said program unit, said verification information comprising the data type of at least one entry on an operand stack or in a register file during simulated execution of said program unit.

2. The method of claim 1 wherein said first mapping represents all data types used by said program unit.

3. The method of claim 1 wherein said first mapping represents a subset of data types used by said program unit.

4. The method of claim 1 wherein said first mapping represents most-used data types of said program unit.

5. The method of claim 1 wherein said first mapping is exclusive of data types represented by a second mapping representing data types used by a higher-level program unit.

6. The method of claim 1 wherein said program comprises a Java™ program.

7. The method of claim 6 wherein said program unit comprises one of a package, a class, a method, an instance variable and a class variable.

8. A method for program verification, the method comprising:
- step for receiving a program unit;
- step for determining data types used by said program unit;
- step for creating a first mapping for said data types, said first mapping comprises a bitmap, each bit in said bitmap representing a data type used by said program unit; and
- step for using said first mapping to represent type information in verification information for said program unit, said verification information comprising the data type of at least one entry on an operand stack or in a register file during simulated execution of said program unit.

9. The method of claim 8 wherein said first mapping represents all data types used by said program unit.

10. The method of claim 8 wherein said first mapping represents a subset of data types used by said program unit.

11. The method of claim 8 wherein said first mapping represents most-used data types of said program unit.

12. The method of claim 8 wherein said first mapping is exclusive of data types represented by a second mapping representing data types used by a higher-level program unit.

13. The method of claim 8 wherein said program comprises a Java™ program.

14. The method of claim 13 wherein said program unit comprises one of a package, a class, a method, an instance variable and a class variable.

15. A program storage device readable by a machine, embodying a program of instructions executable by the machine to perform a method for program verification, the method comprising:
- receiving a program unit;
- determining data types used by said program unit;
- creating a first mapping for said data types, said first mapping comprises a bitmap, each bit in said bitmap representing a data type used by said program unit; and
- using said first mapping to represent type information in verification information for said program unit, said verification information comprising the data type of at least one entry on an operand stack or in a register file during simulated execution of said program unit.

16. The program storage device of claim 15 wherein said first mapping represents all data types used by said program unit.

17. The program storage device of claim 15 wherein said first mapping represents a subset of data types used by said program unit.

18. The program storage device of claim 15 wherein said first mapping represents most-used data types of said program unit.

19. The program storage device of claim 15 wherein said first mapping is exclusive of data types represented by a second mapping representing data types used by a higher-level program unit.

20. The program storage device of claim 15 wherein said program comprises a Java™ program.

21. The program storage device of claim 20 wherein said program unit comprises one of a package, a class, a method, an instance variable and a class variable.

22. An apparatus for program verification, the apparatus comprising:
- means for receiving a program unit;
- means for determining data types used by said program unit;
- means for creating a first mapping for said data types, said first mapping comprises a bitmap, each bit in said bitmap representing a data type used by said program unit; and
- means for using said first mapping to represent type information in verification information for said program unit, said verification information comprising the data type of at least one entry on an operand stack or in a register file during simulated execution of said program unit.

23. The apparatus of claim 22 wherein said first mapping represents all data types used by said program unit.

24. The apparatus of claim 22 wherein said first mapping represents a subset of data types used by said program unit.

25. The apparatus of claim 22 wherein said first mapping represents most-used data types of said program unit.

26. The apparatus of claim 22 wherein said first mapping is exclusive of data types represented by a second mapping representing data types used by a higher-level program unit.

27. The apparatus of claim 22 wherein said program comprises a Java™ program.

28. The apparatus of claim 27 wherein said program unit comprises one of a package, a class, a method, an instance variable and a class variable.

29. An apparatus for communicating program verification, comprising:
- a memory for storing a program comprising a plurality of program units; and
- a processor configured to:
  - receive a program unit;
  - determine data types used by said program unit;
  - create a first mapping for said data types, said first mapping comprises a bitmap, each bit in said bitmap representing a data type used by said program unit; and
  - use said first mapping to represent type information in verification information for said program unit, said verification information comprising the data type of at least one entry on an operand stack or in a register file during simulated execution of said program unit.

30. The apparatus of claim 29 wherein said first mapping represents all data types used by said program unit.

31. The apparatus of claim 29 wherein said first mapping represents a subset of data types used by said program unit.

32. The apparatus of claim 29 wherein said first mapping represents most-used data types of said program unit.

33. The apparatus of claim 29 wherein said first mapping is exclusive of data types represented by a second mapping representing data types used by a higher-level program unit.

34. The apparatus of claim 29 wherein said program comprises a Java™ program.

35. The apparatus of claim 34 wherein said program unit comprises one of a package, a class, a method, an instance variable and a class variable.

36. A memory for storing data for access by an application program being executed on a data processing system, comprising:
- a data structure stored in said memory, said data structure including information used by said program to verify a program unit, said data structure comprising a type mapped representation of data types used by said program unit during simulated execution of said program unit, said type map comprises a bitmap, each bit in said bitmap representing a data type used by said program unit.

37. The memory of claim 36 wherein said representation represents all data types used by said program unit.

38. The memory of claim 36 wherein said representation represents a subset of data types used by said program unit.

39. The memory of claim 36 wherein said representation represents most-used data types of said program unit.

40. The memory of claim 36 wherein said representation is exclusive of data types represented by another type mapped representation representing data types used by a higher-level program unit.

41. The memory of claim 36 wherein said program comprises a Java™ program.

42. The memory of claim 41 wherein said program unit comprises one of a package, a class, a method, an instance variable and a class variable.

* * * * *